US012362859B2

(12) United States Patent
Lim et al.

(10) Patent No.: US 12,362,859 B2
(45) Date of Patent: Jul. 15, 2025

(54) METHOD AND APPARATUS FOR TRANSMITTING AND RECEIVING UPLINK PHASE TRACKING REFERENCE SIGNAL FOR NETWORK COOPERATIVE COMMUNICATION SYSTEM

(71) Applicant: Samsung Electronics Co., Ltd., Suwon-si (KR)

(72) Inventors: Seongmok Lim, Suwon-si (KR); Taehyoung Kim, Suwon-si (KR); Youngrok Jang, Suwon-si (KR); Heedon Gha, Suwon-si (KR); Taehan Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 333 days.

(21) Appl. No.: 17/575,516

(22) Filed: Jan. 13, 2022

(65) Prior Publication Data

US 2022/0239410 A1    Jul. 28, 2022

(30) Foreign Application Priority Data

Jan. 15, 2021 (KR) .................. 10-2021-0006369

(51) Int. Cl.
*H04L 1/08* (2006.01)
*H04L 5/00* (2006.01)
(Continued)

(52) U.S. Cl.
CPC .............. *H04L 1/08* (2013.01); *H04L 5/0023* (2013.01); *H04L 5/0035* (2013.01);
(Continued)

(58) Field of Classification Search
None
See application file for complete search history.

(56) References Cited

U.S. PATENT DOCUMENTS

2020/0412503 A1   12/2020 Huang
2021/0044467 A1*   2/2021 Xi ..................... H04L 5/0007
(Continued)

FOREIGN PATENT DOCUMENTS

| KR | 10-2019-0108153 A | | 9/2019 | |
|---|---|---|---|---|
| KR | 10-2020-0094546 | * | 7/2020 | |
| WO | WO-2021209979 A1 | * | 10/2021 | ........... H04L 5/0048 |

OTHER PUBLICATIONS

U.S. Appl. No. 63/011,707, filed Apr. 17, 2020 (Year: 2020).*
International Search Report and Written Opinion of the International Searching Authority in connection with International Application No. PCT/KR2022/000676 issued Apr. 21, 2022, 10 pages.
Vivo, "Further discussion on enhancement of MTRP operation," 3GPP TSG RAN WG1 #103-e R1-2007645, e-Meeting, Oct. 26-Nov. 13, 2020, 16 pages.

(Continued)

*Primary Examiner* — Jay L Vogel

(57) ABSTRACT

According to present disclosure, there is provided a method for repetitive transmitting physical uplink shared channel (PUSCH) to a multiple transmission and reception point (mTRP) performed by a user equipment (UE). The method comprises receiving, from a base station, downlink control information (DCI) including phase tracking reference signal (PTRS)—demodulation reference signal (DMRS) association information; based on the PTRS-DMRS association information, determining PTRS port for each sounding reference signal (SRS) resource set among a plurality of SRS resource set; and based on the determined PTRS port, transmitting PTRS.

20 Claims, 29 Drawing Sheets

(51) Int. Cl.
  *H04W 56/00* (2009.01)
  *H04W 72/0446* (2023.01)
  *H04W 72/0453* (2023.01)
  *H04W 72/1268* (2023.01)
  *H04W 72/23* (2023.01)

(52) U.S. Cl.
  CPC .......... *H04L 5/0048* (2013.01); *H04L 5/0051* (2013.01); *H04W 56/0035* (2013.01); *H04W 72/0446* (2013.01); *H04W 72/0453* (2013.01); *H04W 72/1268* (2013.01); *H04W 72/23* (2023.01)

(56) References Cited

U.S. PATENT DOCUMENTS

| | | |
|---|---|---|
| 2021/0184811 A1 | 6/2021 | Lee et al. |
| 2023/0232415 A1* | 7/2023 | Kim .................... H04W 72/232 370/329 |
| 2023/0261836 A1* | 8/2023 | Liu ....................... H04L 5/0051 370/329 |

OTHER PUBLICATIONS

Moderator (vivo), "Summary of enhanced UL configured grant transmission for URLLC," 3GPP TSG RAN WG1 #100bis, R1-2002804, e-Meeting, Apr. 20-30, 2020, 25 pages.

3GPP TS 38.212 V16.4.0 (Dec. 2020) Technical Specification; 3rd Generation Partnership Project; Technical Specification Group Radio Access Network; NR; Multiplexing and channel coding (Release 16); 152 pages.

Supplementary European Search Report dated Jun. 3, 2024, in connection with European Patent Application No. 22739732.0, 4 pages.

Vivo, "Discussion on the remaining details on PT-RS," 3GPP TSG RAN WG1 Meeting AH 1801, Vancouver, Canada, Jan. 2018, R1-1800191, 6 pages.

Vivo, "Remaining issues on PT-RS," 3GPP TSG RAN WG1 Meeting #92bis, Sanya, China, Apr. 2018, R1-1803824, 9 pages.

Communication under Rule 71(3) EPC dated Feb. 28, 2025, in connection with European Patent Application No. 22739732.0, 152 pages.

* cited by examiner

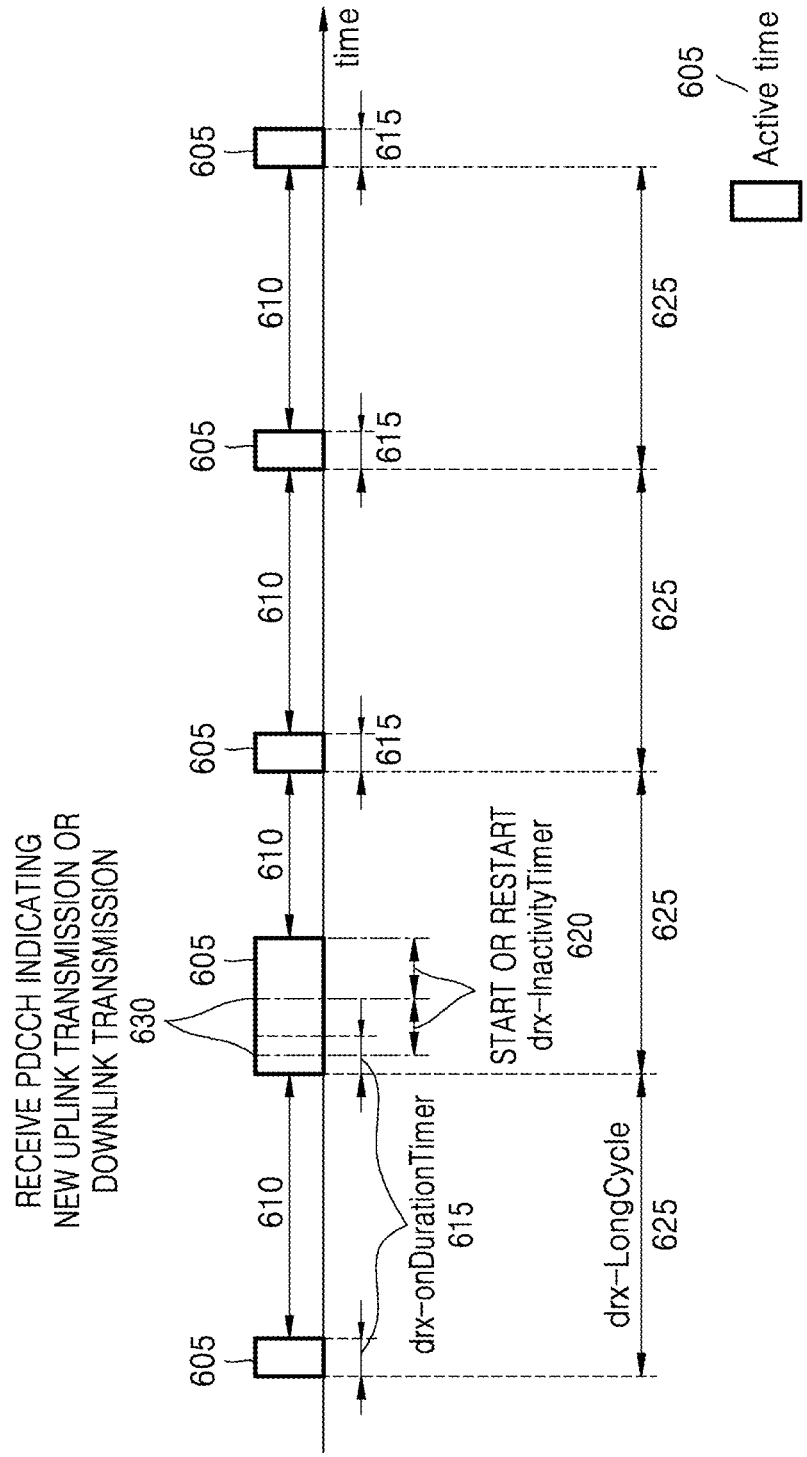

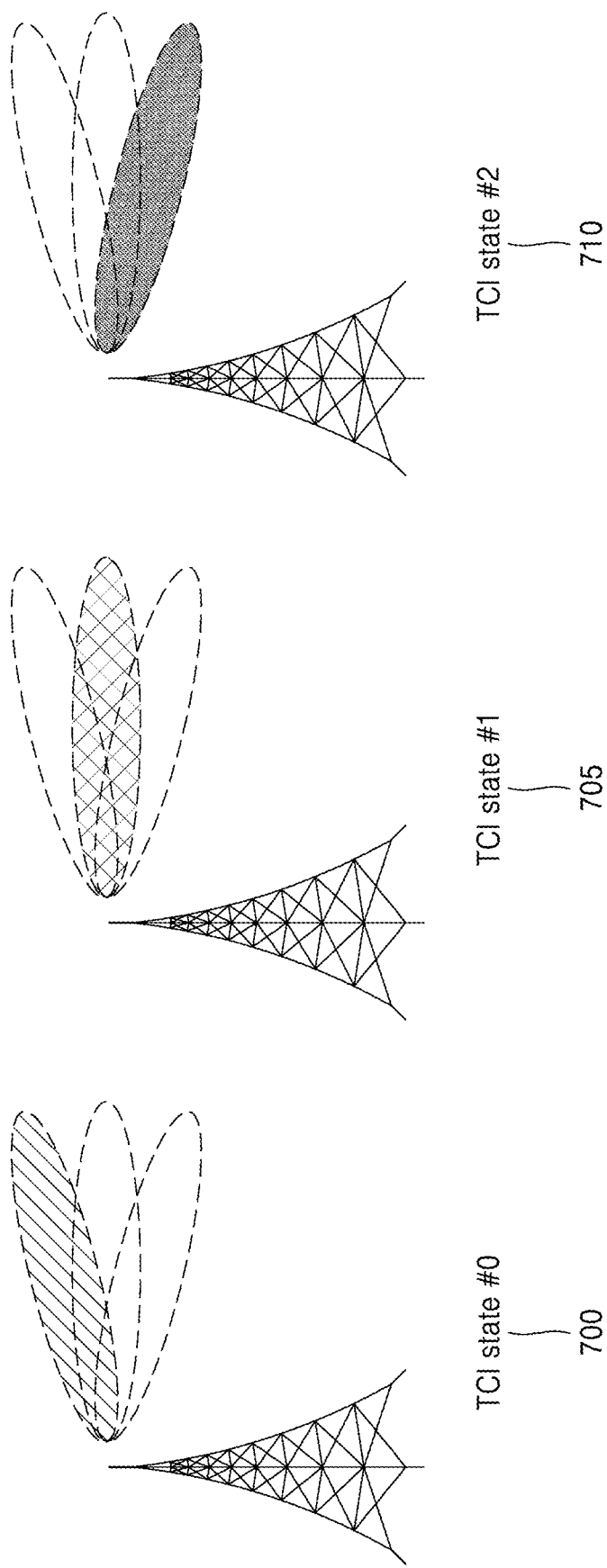

METHOD AND APPARATUS FOR TRANSMITTING AND RECEIVING UPLINK PHASE TRACKING REFERENCE SIGNAL FOR NETWORK COOPERATIVE COMMUNICATION SYSTEM

CROSS-REFERENCE TO RELATED APPLICATION

This application is based on and claims priority under 35 U.S.C. § 119 to Korean Patent Application No. 10-2021-0006369, filed on Jan. 15, 2021, in the Korean Intellectual Property Office, the disclosure of which is incorporated by reference herein in its entirety.

BACKGROUND

1. Field

The disclosure relates to a method and apparatus for transmitting and receiving an uplink phase tracking reference signal in a network cooperative communication system.

2. Description of the Related Art

To meet the increase in demand with respect to wireless data traffic after the commercialization of $4^{th}$ generation (4G) communication systems, considerable efforts have been made to develop pre-$5^{th}$ generation (5G) communication systems or 5G communication systems. This is one reason why 5G communication systems or pre-5G communication systems are called beyond 4G network communication systems or post long-term evolution (LTE) systems. In order to achieve a high data rate, 5G communication systems are being developed to be implemented in a super-high frequency band (millimeter wave (mmWave)), e.g., a band of 60 GHz. In order to reduce a path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA) and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

In this regard, various attempts have been made to apply the 5G communication system (or new radio (NR)) to an IoT network. For example, technologies related to sensor networks, M2M communication, MTC, etc., are being implemented by using 5G communication technology including beam-forming, MIMO, array antennas, etc. The application of a cloud radio access network (RAN) as a big data processing technology as described above may be an example of convergence of 5G communication technology and IoT technology.

As described above, various services may be provided due to the development of wireless communication systems, and thus there is need for methods of smoothly providing such services.

SUMMARY

Provided are an apparatus and method for effectively providing a service in a mobile communication system.

According to an embodiment of the disclosure, there is provided a method a method for repetitive transmitting physical uplink shared channel (PUSCH) to a multiple transmission and reception point (mTRP) performed by a user equipment (UE), the method comprising: receiving, from a base station, downlink control information (DCI) including phase tracking reference signal (PTRS)—demodulation reference signal (DMRS) association information, based on the PTRS-DMRS association information, determining PTRS port for each sounding reference signal (SRS) resource set among a plurality of SRS resource set, and based on the determined PTRS port, transmitting PTRS.

In one embodiment, the phase tracking reference signal (PTRS)—demodulation reference signal (DMRS) association information comprises a most significant bit indicating the association between PTRS port and DMRS port for a first TRP among the mTRP, and a least significant bit (LSB) indicating the association between PTRS port and DMRS port for a second TRP among the mTRP.

In one embodiment, in case that a maximum number of PTRS ports is 1, the PTRS-DMRS association information indicates the PTRS port is associated with a maximum number of DMRS ports is 2.

In one embodiment, in case that a maximum number of PTRS ports is 2, the PTRS-DMRS association information indicates each DMRS port is associated with the same PTRS port.

In one embodiment, the DCI comprises at least one SRS resource indicator (SRI), the method further comprises: based on the at least one SRI, determining a number of PTRS ports for SRS resource.

In one embodiment, the DCI comprises at least one transmission precoding matrix indicator (TPMI), the method further comprises: based on the at least one TPMI, determining a number of PTRS ports for SRS resource.

In one embodiment, the PTRS-DMRS association information comprises table information indicating association between the PTRS port and DMRS port.

In one embodiment, the PTRS-DMRS association information comprises table information indicating association between the PTRS port and DMRS port, and the PTRS port for each SRS resource set is determined based on the table information and the number of PTRS port for SRS resource.

In one embodiment, the DCI comprises additional PTRS-DMRS association information.

In one embodiment, the method is for non-codebook based PUSCH repetitive transmission.

In one embodiment, the method is for codebook based PUSCH repetitive transmission.

According to an embodiment of the disclosure, there is provided a user equipment (UE) for repetitive transmitting physical uplink shared channel (PUSCH) to a multiple transmission and reception point (mTRP), the UE comprising: a memory, a transceiver, and at least one processor coupled with the memory and transceiver and configured to: receive, from a base station, downlink control information (DCI) including phase tracking reference signal (PTRS)—demodulation reference signal (DMRS) association information, based on the PTRS-DMRS association information, determine PTRS port for each sounding reference signal (SRS) resource set among a plurality of SRS resource set, and based on the determined PTRS port, transmit PTRS.

In one embodiment, the phase tracking reference signal (PTRS)—demodulation reference signal (DMRS) association information comprises a most significant bit indicating the association between PTRS port and DMRS port for a first TRP among the mTRP, and a least significant bit (LSB) indicating the association between PTRS port and DMRS port for a second TRP among the mTRP.

In one embodiment, the DCI comprises at least one SRS resource indicator (SRI), the at least one processor further configured to: based on the at least one SRI, determine a number of PTRS ports for SRS resource.

In one embodiment, the DCI comprises at least one transmission precoding matrix indicator (TPMI), the at least one processor further configured to: based on the at least one TPMI, determine a number of PTRS ports for SRS resource.

Additional aspects will be set forth in part in the description which follows and, in part, will be apparent from the description, or may be learned by practice of the presented embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a diagram of an example of a discontinuous reception (DRX) operation in a wireless communication system according to an embodiment of the disclosure;

FIG. 7 illustrates a diagram of an example of base station beam assignment according to a transmission configuration indication (TCI) state configuration in a wireless communication system according to an embodiment of the disclosure;

DETAILED DESCRIPTION

Figure 1:
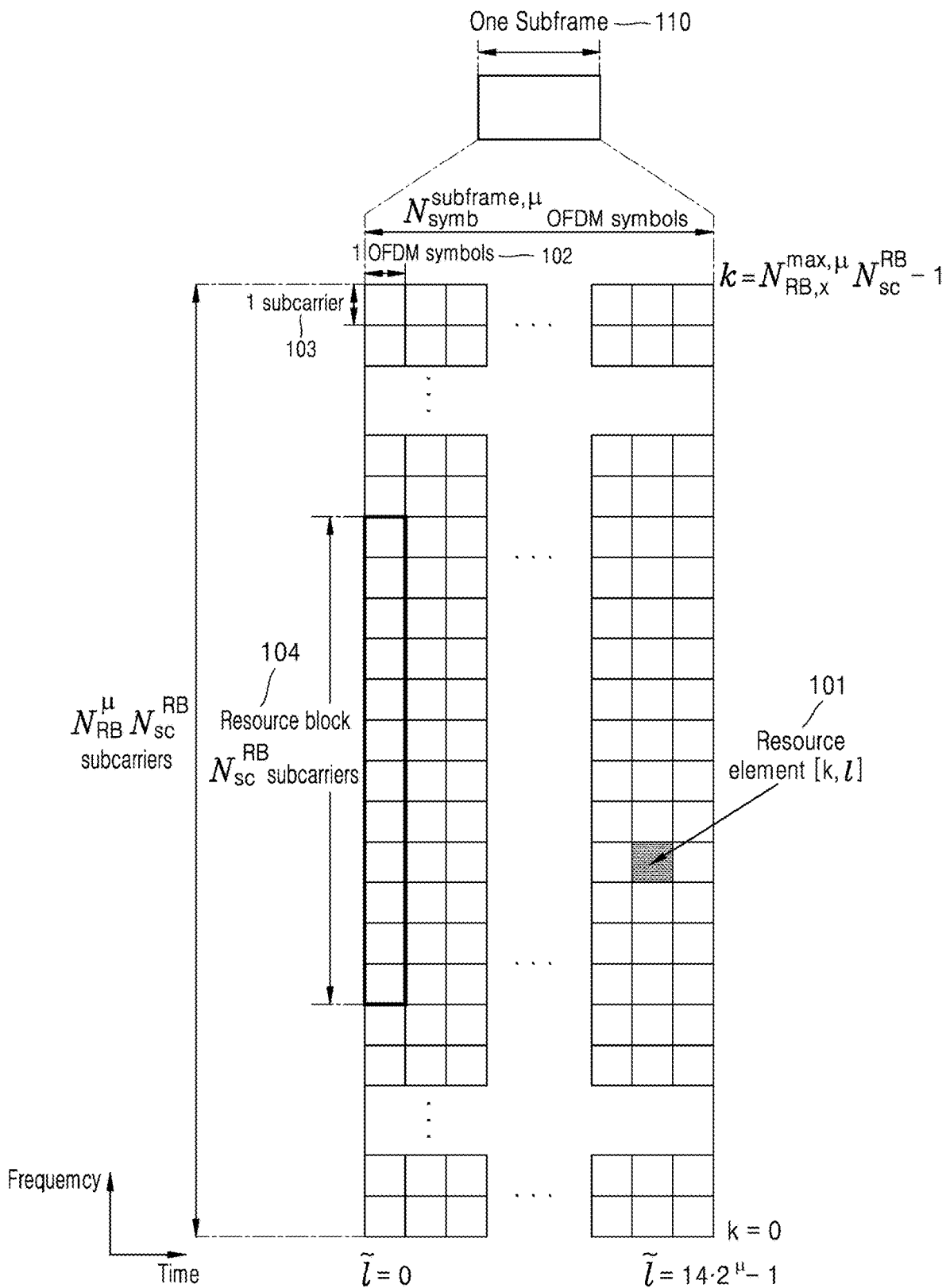
FIG. 1 illustrates a diagram of a basic structure of a time-frequency domain in a wireless communication system according to an embodiment of the disclosure.

FIGS. 1 through 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described with reference to accompanying drawings.

In describing the embodiments of the disclosure, descriptions of technical contents that are well known in the technical field to which the disclosure belongs and are not directly related to the disclosure will be omitted. By omitting the unnecessary description, the gist of the disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like reference numerals denote like elements.

Advantages and features of the disclosure and methods of accomplishing the same may be understood more readily by reference to the following detailed description of the embodiments of the disclosure and the accompanying drawings. In this regard, the embodiments of the disclosure may have different forms and should not be construed as being limited to the descriptions set forth herein. Rather, these embodiments of the disclosure are provided so that the disclosure will be thorough and complete and will fully convey the concept of the disclosure to one of ordinary skill in the art, and the disclosure will only be defined by the appended claims. Throughout the specification, like reference numerals denote like elements. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

In the disclosure, a layer (or a layer apparatus) may also be referred to as an entity.

Hereinafter, a base station is an entity that assigns resources of a terminal, and may be at least one of a gNode B (gNB), an eNode B (eNB), a Node B (NB), a base station (BS), a wireless access unit, a BS controller, or a node on a network. In the disclosure, a downlink (DL) is a wireless transmission path of a signal transmitted from a base station to a terminal, and an uplink (UL) is a wireless transmission path of a signal transmitted from a terminal to a base station. Also, hereinbelow, a long-term evolution (LTE) or long-term evolution advanced (LTE-A) system may be described as an example, but an embodiment of the disclosure may also be applied to other communication systems having a similar technical background or channel form. An example of the other communication may include a $5^{th}$ generation mobile communication technology (5G or new radio (NR)) developed after LTE-A, and hereinafter, 5G may have a concept including existing LTE, LTE-A, and another similar service. Also, it will be understood by one of ordinary skill in the art that the disclosure may be applied to other communication systems through some modifications without departing from the scope of the disclosure.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in some embodiments of the disclosure means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units," or may be divided into additional components and "units." Furthermore, the components and "units" may be embodied to reproduce one or more central processing units (CPUs) in a device or security multimedia card. Also, in some embodiments of the disclosure, the "unit" may include at least one processor.

Wireless communication systems have been developed from wireless communication systems providing voice centered services in the early stage toward broadband wireless communication systems providing high-speed, high-quality packet data services, like communication standards of high speed packet access (HSPA), long term evolution (LTE or evolved universal terrestrial radio access (E-UTRA)), LTE-advanced (LTE-A), and LTE-Pro of the 3GPP, high rate packet data (HRPD) and ultra mobile broadband (UMB) of 3GPP2, IEEE 802.16e or the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The UL refers to a radio link through which a terminal (a user equipment (UE) or a mobile station (MS)) transmits data or a control signal to a base station (BS) (e.g., eNode B), and the DL refers to a radio link through which a BS transmits data or a control signal to a terminal. In such a multiple access scheme, data or control information of each user is classified by generally assigning and managing the data or control information such that time-frequency resources for transmitting data or control information for each user do not overlap each other, that is, such that orthogonality is established.

As a future communication system after the LTE system, that is, a 5G communication system, has to be able to freely reflect various requirements of a user and a service provider, and thus, services satisfying various requirements at the same time need to be supported. The services considered for the 5G communication system include enhanced mobile broadband (eMBB), massive machine type communication (mMTC), ultra reliability low latency communication (hereinafter, URLLC), etc.

The eMBB aims to provide a higher data transfer rate than a data transfer rate supported by the LTE, LTE-A, or LTE-Pro system. For example, in the 5G communication system, the eMBB may be able to provide a peak data rate of 20 Gbps in a downlink and a peak data rate of 10 Gbps in an uplink from the viewpoint of one base station. In addition, the 5G communication system needs to provide the increased user perceived data rate of the terminal simultaneously with providing the peak data rate. In order to satisfy such requirements, improvement of various transmitting/receiving technologies including a further improved multiple-input and multiple-output (MIMO) transmission technology may be demanded. In addition, signals are transmitted using a transmission bandwidth of up to 20 MHz in a 2 GHz band used by the current LTE system, but the 5G communication system uses a bandwidth wider than 20 MHz in a frequency band of 3 to 6 GHz or more than 6 GHz, thereby satisfying a data rate required in the 5G communication system.

At the same time, the mMTC is being considered to support application services such as Internet of things (IoT) in the 5G communication system. The mMTC is required for an access support of a large-scale terminal in a cell, coverage enhancement of a terminal, improved battery time, and cost reduction of a terminal in order to efficiently provide the IoT. The IoT needs to be able to support a large number of terminals (e.g., 1,000,000 terminals/km$^2$) in a cell because it is attached to various sensors and various devices to provide communication functions. In addition, the terminals supporting the mMTC are more likely to be positioned in shaded areas not covered by a cell, such as the underground of a building due to nature of services, and thus, the terminal may require a wider coverage than other services provided by the 5G communication system. The terminals that support the mMTC may be configured as inexpensive terminals and require very long battery lifetime, such as 10 to 15 years, because it is difficult to frequently replace batteries of the terminals.

Lastly, the URLLC is a cellular-based wireless communication system used for a specific purpose (mission-critical). For example, a service used in remote control for a robot or machinery, industrial automation, unmanned aerial vehicle, remote health care, or emergency alert may be considered. Accordingly, communication provided by the URLLC may provide very low latency and very high reliability. For example, a service supporting the URLLC may satisfy air interface latency smaller than 0.5 milliseconds and at the same time, has a packet error rate of $10^{-5}$ or less. Accordingly, for URLLC-supportive services, the 5G communication system may be required to provide a transmit time interval (TTI) shorter than those for other services while securing reliable communication links by assigning a broad resource in a frequency band.

The three services, that is, eMBB, URLLC, and mMTC, of the 5G system may be multiplexed in one system and may be transmitted. In this case, the services may use different transmission and reception methods and transmission and reception parameters in order to meet their different requirements. Obviously, the 5G system are not limited by the above three services.

[NR Time-Frequency Resource]

Hereinafter, a frame structure of a 5G system will be described in detail with reference to accompanying drawings.

FIG. 1 illustrates a diagram of a basic structure of a time-frequency domain that is a radio resource region in which data or a control channel is transmitted in a wireless communication system according to an embodiment of the disclosure.

In FIG. 1, a horizontal axis represents a time domain and a vertical axis represents a frequency domain. In the time and frequency domains, a base unit of a resource is a resource element (RE) 101, and may be defined by one OFDM symbol 102 on a time axis and one subcarrier 103 on a frequency axis. In the frequency domain, $N_{SC}^{RB}$ (for example, 12) consecutive REs 101 may configure one resource block (RB) 104.

Figure 2:
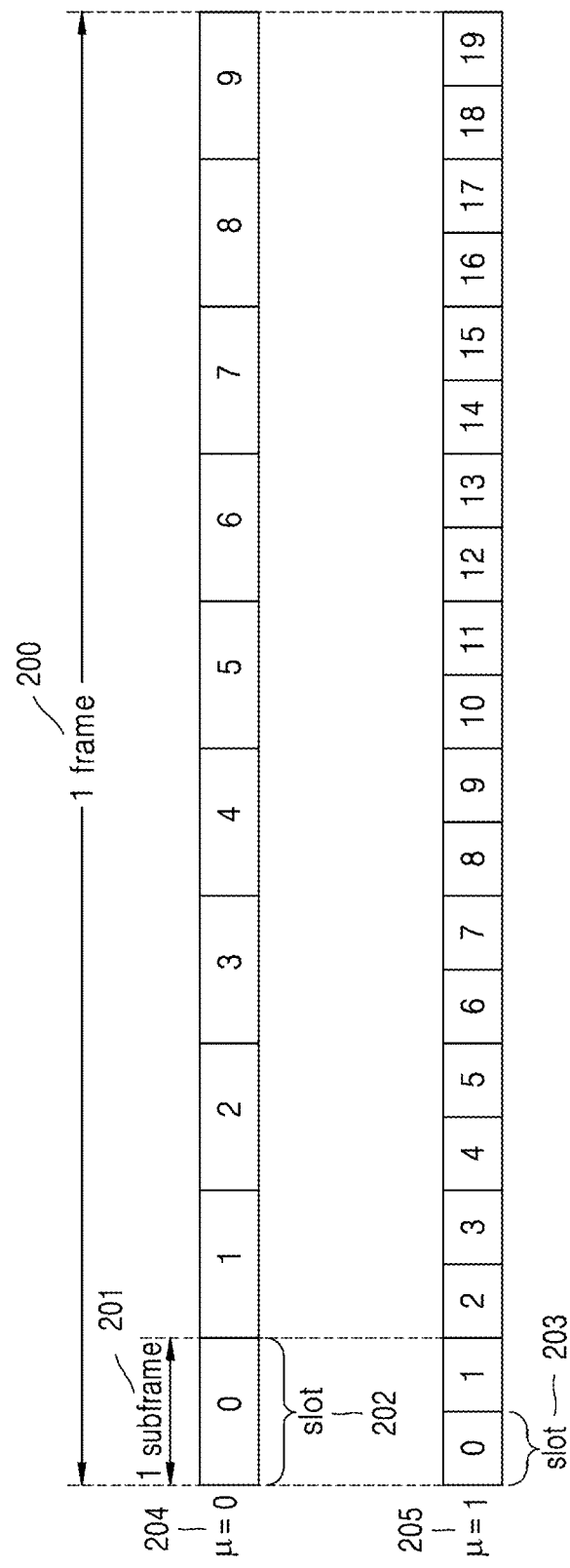
FIG. 2 illustrates s a diagram of a frame, subframe, and slot structure in a wireless communication system according to an embodiment of the disclosure.

FIG. 2 illustrates a diagram of a slot structure considered in a wireless communication system according to an embodiment of the disclosure.

FIG. 2 illustrates an example of structures of a frame 200, a subframe 201, and a slot 202. One frame 200 may be defined to be 10 ms. One subframe 201 may be defined to be 1 ms, and accordingly, one frame 200 may include total 10 subframes 201. One slot 202 or 203 may be slot defined by 14 OFDM symbols (i.e., the number $N_{symb}^{slot}$ of symbols per slot=14). One subframe 201 may include one or more slots 202 or 203, and the number of slots 202 or 203 per subframe 201 may vary depending on a configuration value $\mu$ for a subcarrier spacing. FIG. 2 illustrates a case 204 in which the configuration value $\mu$ for the subcarrier spacing is 0 and a case 205 in which the configuration value $\mu$ is 1. When $\mu=0$ as in the case 204, one subframe 201 may include one slot 202, and when $\mu=1$ as in the case 205, one subframe 201 may include two slots 203. In other words, the number $N_{slot}^{subframe,\mu}$ of slots per subframe may vary depending on the configuration value $\mu$ for the subcarrier spacing, and accordingly, the number $N_{slot}^{frame,\mu}$ of slots per frame may vary. $N_{slot}^{subframe,\mu}$ and $N_{slot}^{frame,\mu}$ according to each configuration value $\mu$ for the subcarrier spacing may be defined as in Table 1 below.

TABLE 1

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Bandwidth Part (BWP)]

Next, a BWP configuration in a 5G communication system will be described in detail with reference to the drawings.

Figure 3:
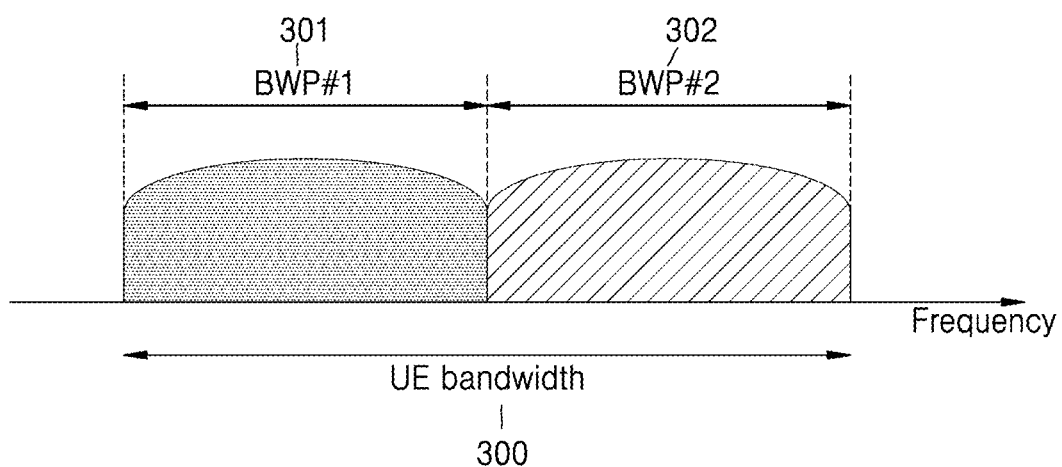
FIG. 3 illustrates a diagram of an example of a configuration of a bandwidth part in a wireless communication system according to an embodiment of the disclosure.

FIG. 3 illustrates a diagram of an example of a configuration of a BWP in a wireless communication system according to an embodiment of the disclosure.

FIG. 3 illustrates an example in which a UE bandwidth 300 is configured in two BWPs, that is, a BWP #1 301 and a BWP #2 302. A base station may configure one or a plurality of BWPs for a UE, and may configure the following pieces of information for each BWP.

TABLE 2

| | |
|---|---|
| BWP ::= | SEQUENCE { |
| bwp-Id | BWP-Id, |
| locationAndBandwidth | INTEGER (1..65536), |
| subcarrierSpacing | ENUMERATED {n0, n1, n2, n3, n4, n5}, |

TABLE 2-continued

| cyclicPrefix | ENUMERATED { extended } |

}

However, the disclosure is not limited to the above example, and in addition to the information configured as described above, various parameters related to a BWP may be configured for the UE. The information may be transmitted by the base station to the UE via higher layer signaling, for example, radio resource control (RRC) signaling. At least one BWP from among the configured one or plurality of BWPs may be activated. Whether to activate the configured BWP may be transmitted from the base station to the UE semi-statically via RRC signaling or dynamically via downlink control information (DCI).

According to some embodiments of the disclosure, an initial BWP for an initial access may be configured for the UE before an RRC connection by the base station through a master information block (MIB). More specifically, the UE may receive configuration information related to a control resource set (CORESET) and a search space, in which a physical downlink control channel (PDCCH) may be transmitted, the PDCCH being designed for the UE to receive system information (for example, remaining system information (RMSI) or system information block 1 (SIB1)) required for an initial access through an MIB in an initial access stage. The CORESET and search space that are configured through the MIB may be assumed to be identities (IDs) 0, respectively. The base station may notify the UE about configuration information, such as frequency assignment information, time assignment information, and numerology, for a specific CORESET (for example, a CORESET in which an ID is assumed to be 0) through the MIB. In addition, the base station may notify, through the MIB, the UE about configuration information related to a monitoring period and occasion for the specific CORESET, that is, configuration information related to a specific search space (for example, a search space in which an ID is assumed to be 0). The UE may consider a frequency domain configured to be the specific CORESET obtained from the MIB, as an initial BWP for the initial access. Here, the ID of the initial BWP may be considered to be 0.

A configuration for the BWP supported by 5G may be used for various purposes as below.

According to some embodiments of the disclosure, when a bandwidth supported by the UE is smaller than a system bandwidth, the base station may support the BWP by configuring the BWP to the UE. For example, the base station may configure a frequency location (configuration information 1) of the BWP to the UE such that the UE may transmit or receive data at a specific frequency location within the system bandwidth.

Also, according to some embodiments of the disclosure, the base station may configure a plurality of BWPs with respect to the UE for a purpose of supporting different numerologies. For example, to support data transmission/reception using both a subcarrier spacing of 15 kHz and a subcarrier spacing of 30 kHz for a UE, two BWPs respectively having the subcarrier spacings of 15 kHz and 30 kHz may be configured. Frequency division multiplexing may be performed on the different BWPs, and when data is to be transmitted/received in a specific subcarrier spacing, a BWP configured to have the corresponding subcarrier spacing may be activated.

According to some embodiments of the disclosure, the base station may configure BWPs, which have different sizes of bandwidths, with respect to the UE for a purpose of reducing power consumption of the UE. For example, when the UE supports a very wide bandwidth, for example, a bandwidth of 100 MHz, and always transmits/receives data via the corresponding bandwidth, very large power consumption may occur. In particular, it is very inefficient in terms of power consumption to monitor an unnecessary downlink control channel in a large bandwidth of 100 MHz in a situation where there is no traffic. Accordingly, the base station may configure a BWP of a relatively small bandwidth, for example, a BWP of 20 MHz, with respect to the UE for a purpose of reducing the power consumption of the UE. In a situation where there is no traffic, the UE may perform a monitoring operation in a BWP of 20 MHz, and when data is generated, the UE may transmit/receive the data through a BWP of 100 MHz according to an instruction of the base station.

In relation to a method of configuring the BWP, the UEs before RRC-connected may receive configuration information regarding an initial BWP through a master information block (MIB) in the initial access stage. More specifically, the UE may be configured with a CORESET from the MIB of a physical broadcast channel (PBCH). Here, the CORESET is for a downlink control channel through which DCI for scheduling an SIB may be transmitted. The bandwidth of the CORESET configured by the MIB may be considered as the initial BWP, and the UE may receive a physical downlink shared channel (PDSCH) through which the SIB is transmitted, through the configured initial BWP. The initial BWP may be used for other system information (OSI), paging, and random access, in addition to the reception of the SIB.

[SS/PBCH Block]

Next, a synchronization signal (SS)/PBCH block in 5G will be described.

The SS/PBCH block may denote a physical layer channel block including a primary SS (PSS), a secondary SS (SSS), and a PBCH.

In detail, the SS/PBCH block is as below:
PSS: a PSS is a signal serving as a criterion of downlink time/frequency synchronization, and provides partial information of a cell ID;
SSS: an SSS is a signal serving as a criterion of the downlink time/frequency synchronization, and provides the remaining cell ID information which is not provided by the PSS. Additionally, the SSS may serve as a reference signal for demodulation of a PBCH;
PBCH: a PBCH provides essential system information required for transmission/reception for a data channel and a control channel of the UE. The essential system information may include search space-related control information indicating radio resource mapping information of the control channel, and scheduling control information regarding a separate data channel through which system information is transmitted; and
SS/PBCH block: an SS/PBCH block is configured by a combination of the PSS, the SSS, and the PBCH. One or a plurality of SS/PBCH blocks may be transmitted within a time of 5 ms, and each of the transmitted SS/PBCH blocks may be identified by an index.

The UE may detect the PSS and the SSS in the initial access stage, and may decode the PBCH. The UE may obtain the MIB from the PBCH, and may be configured with, from the MIB, a CORESET #0 (may correspond to a CORESET having a CORESET index of 0). The UE may monitor the CORESET #0 under the assumption that the SS/PBCH block selected by the UE and a demodulation reference signal (DMRS) transmitted in the CORESET #0 are at a quasi-co-location (QCL). The UE may receive the system information through the downlink control information transmitted in CORESET #0. The UE may obtain random access channel (RACH)-related configuration information required for the initial access, from the received system information. The UE may transmit a physical RACH (PRACH) to the base station in consideration of the selected SS/PBCH index, and the base station that received the PRACH may obtain information regarding an index of the SS/PBCH block selected by the UE. Accordingly, the base station may identify which block among the SS/PBCH blocks the UE selected, and that the UE is monitoring the CORESET #0 associated with the block.

[PDCCH: Regarding DCI]

Next, DCI in a 5G system will be described in detail.

In the 5G system, scheduling information for uplink data (or physical uplink shared channel (PUSCH)) or downlink data (or PDSCH) is transmitted from the base station to the UE via DCI. The UE may monitor a fallback DCI format and a non-fallback DCI format for the PUSCH or the PDSCH. The fallback DCI format may include a fixed field predefined between the base station and the UE, and the non-fallback DCI format may include a configurable field.

The DCI may be transmitted through a PDCCH after a channel coding and modulating process. A cyclic redundancy check (CRC) is attached to a DCI message payload, and the CRC may be scrambled with a radio network temporary identifier (RNTI) corresponding to an identity of the UE. Different RNTIs may be used depending on a purpose of a DCI message, for example, UE-specific data transmission, a power control command, or a random access response. In other words, the RNTI is not explicitly transmitted, but is transmitted by being included in a CRC calculation process. Upon receiving the DCI message transmitted on the PDCCH, the UE may identify the CRC by using an assigned RNTI, and when a result of identifying the CRC is correct, the UE may determine that the corresponding message is transmitted to the UE.

For example, DCI for scheduling the PDSCH for system information (SI) may be scrambled with SI-RNTI. The DCI for scheduling the PDSCH for a random access response (RAR) message may be scrambled with an RA-RNTI. The DCI for scheduling the PDSCH for a paging message may be scrambled with a P-RNTI. The DCI notifying that a slot format indicator (SFI) may be scrambled with an SFI-RNTI. The DCI notifying that transmit power control (TPC) may be scrambled with a TPC-RNTI. The DCI for scheduling the UE-specific PDSCH or PUSCH may be scrambled with a cell RNTI (C-RNTI).

A DCI format 0_0 may be used as fallback DCI for scheduling the PUSCH and at this time, the CRC may be scrambled with the C-RNTI. The DCI format 0_0 of which the CRC is scrambled with the C-RNTI may include pieces of information as below.

TABLE 3

Identifier for DCI formats − [1] bit
Frequency domain resource assignment −
$\lceil \log_2(N_{RB}^{UL,BWP} (N_{RB}^{UL,BWP} + 1)/2) \rceil$s
Time domain resource assignment − X bits
Frequency hopping flag − 1 bit.
Modulation and coding scheme − 5 bits
New data indicator − 1 bit
Redundancy version − 2 bits
HARQ process number − 4 bits
TPC command for scheduled PUSCH − [2] bits
UL/SUL indicator − 0 or 1 bit A DCI format 0_1 may be used as non-fallback DCI for scheduling the PUSCH and at this time, the CRC may be scrambled with the C-RNTI. The DCI format 0_1 of which the CRC is scrambled with the C-RNTI may include pieces of information as below.

TABLE 4

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
For resource allocation type 0, $\lceil N_{RB}^{UL,BWP}/P \rceil$ bits
For resource allocation type 1,
$\lceil \log_2(N_{RB}^{UL,BWP}(N_{RB}^{UL,BWP} + 1)/2) \rceil$
Time domain resource assignment −1, 2, 3, or 4 bits
VRB-to-PRB mapping - 0 or 1 bit, only for resource allocation type 1.
0 bit if only resource allocation type 0 is configured;
1 bit otherwise.
Frequency hopping flag - 0 or 1 bit, only for resource allocation type 1.
0 bit if only resource allocation type 0 is configured;
1 bit otherwise.
Modulation and coding scheme - 5 bits
New data indicator - 1 bit
Redundancy version - 2 bits
HARQ process number - 4 bits
1st downlink assignment index - 1 or 2 bits
1 bit for semi-static HARQ-ACK codebook;
2 bits for dynamic HARQ-ACK codebook with single HARQ-ACK codebook.
2nd downlink assignment index - 0 or 2 bits
2 bits for dynamic HARQ-ACK codebook with two HARQ-ACK sub-codebooks;
0 bit otherwise.
TPC command for scheduled PUSCH - 2 bits SRS resource indicator −

$\lceil (\log)\_2(\Sigma\_(k=1)^\wedge (L\_(max\Sigma)) \blacksquare (\blacksquare(N\_"SRS"@K))(\dashv)) \square\square \rceil \log)\_2(N\_"SRS") \rceil$ bits $$\left\lceil \log_2 \left( \sum_{k=1}^{L_{max\Sigma}} \binom{N_{SRS}}{k} () \right) \square\square \right\rceil \text{ n-codebook based } PUSCH$$

transmission;

$\lceil \log_2(N_{SRS}) \rceil$ bits for codebook based PUSCH transmission.
Precoding information and number of layers -up to 6 bits
Antenna ports - up to 5 bits
SRS request - 2 bits
CSI request - 0, 1, 2, 3, 4, 5, or 6 bits
CBG transmission information - 0, 2, 4, 6, or 8 bits
PTRS-DMRS association - 0 or 2 bits.
beta_offset indicator - 0 or 2 bits
DMRS sequence initialization - 0 or 1 bit A DCI format 1_0 may be used as fallback DCI for scheduling the PDSCH and at this time, the CRC may be scrambled with the C-RNTI. The DCI format 1_0 of which the CRC is scrambled with the C-RNTI may include pieces of information as below.

TABLE 5

Identifier for DCI formats − [1] bit
Frequency domain resource assignment −
$\lceil \log_2(N_{RB}^{DL,BWP} (N_{RB}^{DL,BWP} + 1)/2) \rceil$ ]s
Time domain resource assignment − X bits
VRB-to-PRB mapping − 1 bit.
Modulation and coding scheme − 5 bits TABLE 5-continued New data indicator – 1 bit
Redundancy version – 2 bits
HARQ process number – 4 bits
Downlink assignment index – 2 bits
TPC command for scheduled PUCCH – [2] bits
PUCCH resource indicator – 3 bits
PDSCH-to-HARQ feedback timing indicator – [3] bits A DCI format 1_1 may be used as non-fallback DCI for scheduling the PDSCH and at this time, the CRC may be scrambled with the C-RNTI. The DCI format 1_1 of which the CRC is scrambled with the C-RNTI may include pieces of information as below.

TABLE 6

Carrier indicator – 0 or 3 bits
Identifier for DCI formats – [1] bits
Bandwidth part indicator – 0, 1 or 2 bits
Frequency domain resource assignment
For resource allocation type 0, $\lceil N_{RB}^{DL,BWP}/P \rceil$ bits
For resource allocation type 1,
$\lceil \log_2(N_{RB}^{DL,BWP}(N_{RB}^{DL,BWP} + 1)/2) \rceil$
Time domain resource assignment –1, 2, 3, or 4 bits
VRB-to-PRB mapping – 0 or 1 bit, only
for resource allocation type 1.
0 bit if only resource allocation type 0 is configured;
  1 bit otherwise.
    PRB bundling size indicator – 0 or 1 bit
    Rate matching indicator – 0, 1, or 2 bits
    ZP CSI-RS trigger – 0, 1, or 2 bits
For transport block 1:
    Modulation and coding scheme – 5 bits
    New data indicator – 1 bit
    Redundancy version – 2 bits
For transport block 2:
    Modulation and coding scheme – 5 bits
    New data indicator – 1 bit
    Redundancy version – 2 bits
    HARQ process number – 4 bits
    Downlink assignment index – 0 or 2 or 4 bits
    TPC command for scheduled PUCCH – 2 bits
    PUCCH resource indicator – 3 bits
    PDSCH-to-HARQ feedback timing indicator – 3 bits
    Antenna ports – 4, 5 or 6 bits
    Transmission configuration indication – 0 or 3 bits
    SRS request – 2 bits
    CBG transmission information – 0, 2, 4, 6, or 8 bits
    CBG flushing out information – 0 or 1 bit
    DMRS sequence initialization – 1 bit

[PDCCH: CORESET, REG, CCE, Search Space]

Hereinafter, a downlink control channel in a 5G communication system will be described in detail with reference to the drawings.

Figure 4:
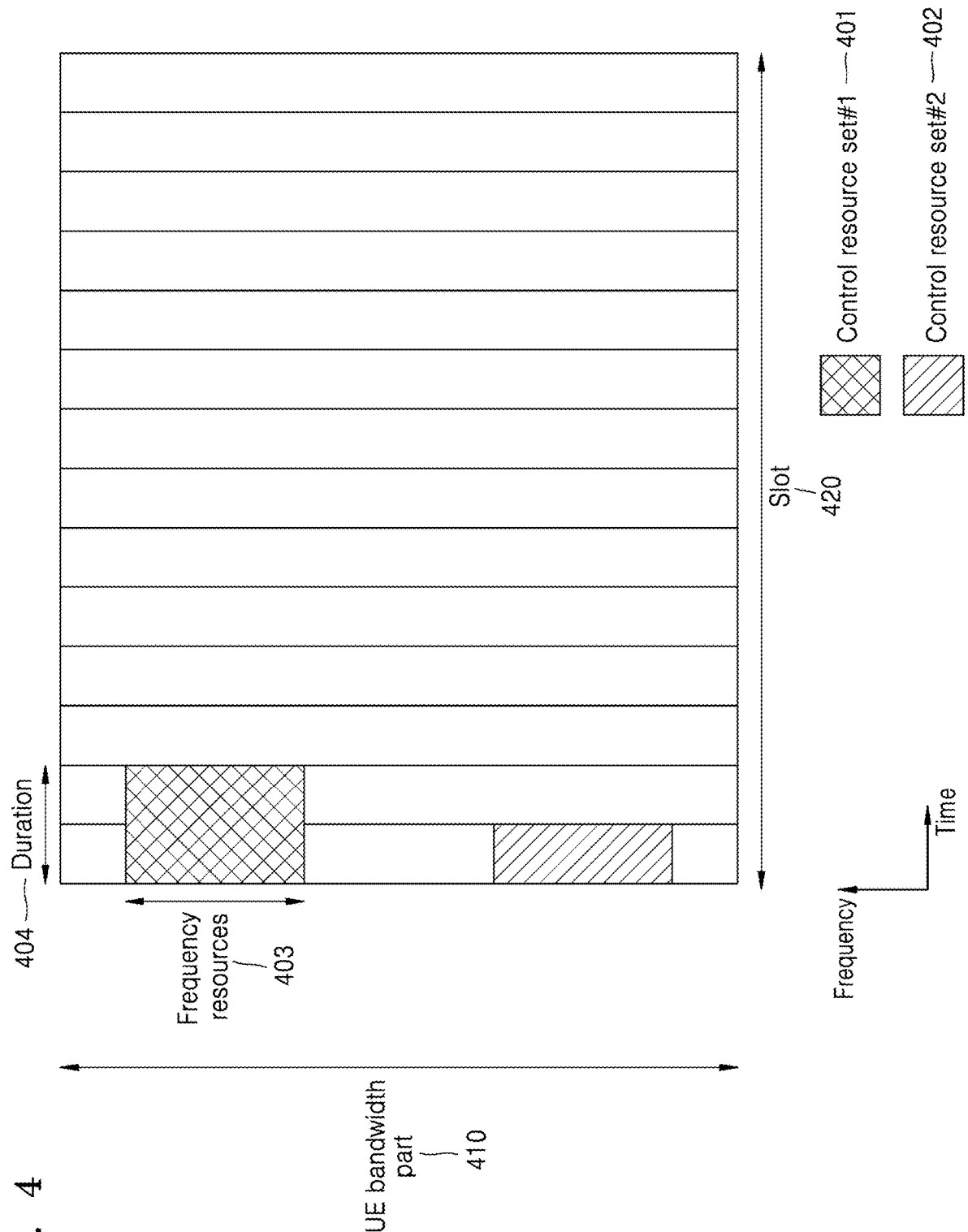
FIG. 4 illustrates a diagram of an example of a configuration of a control resource set (CORESET) of a downlink control channel in a wireless communication system according to an embodiment of the disclosure.

FIG. 4 illustrates a diagram of an example of a CORESET on which a downlink control channel is transmitted in a wireless communication system according to an embodiment of the disclosure. FIG. 4 shows an example in which a UE BWP 410 is configured on a frequency axis and two CORESETs (CORESET #1 401 and CORESET #2 402) are configured in one slot 420 on a time axis. The CORESETs #1 and #2 401 and 402 may be configured on a specific frequency resource 403 within the entire UE BWP 410 on the frequency axis. One or a plurality of OFDM symbols may be configured on the time axis and may be defined as a CORESET duration 404. With reference to the example illustrated in FIG. 4, the CORESET #1 401 is configured to have a CORESET duration of two symbols, and the CORESET #2 402 is configured to have a CORESET duration of one symbol.

In 5G described above, a CORESET may be configured with respect to a UE by a base station via higher layer signaling (for example, system information, MIB, or RRC signaling). The configuring of the CORESET with respect to the UE indicates providing information, such as a CORESET identity, a frequency location of the CORESET, and a symbol length of the CORESET. For example, the following pieces of information may be included.

TABLE 7

ControlResourceSet ::=       SEQUENCE {
    -- Corresponds to L1 parameter 'CORESET-ID'
    controlResourceSetId      ControlResourceSetId,
(CORESET Identifier (Identity))
    frequencyDomainResources  BIT STRING (SIZE (45)),
(Frequency Axis Resource Assignment Information)
    duration                  INTEGER (1..maxCoReSetDuration),
(Time Axis Resource Assignment Information)
    cce-REG-MappingType       CHOICE {
(CCE-to-REG Mapping Scheme)
        interleaved           SEQUENCE {
            reg-BundleSize    ENUMERATED {n2, n3, n6},
(REG Bundle Size)
            precoderGranularity  ENUMERATED
{sameAsREG-bundle, allContiguousRBs},
            interleaverSize   ENUMERATED {n2, n3, n6}
            (Interleaver Size)
            shiftIndex
            INTEGER(0..maxNrofPhysicalResourceBlocks-1)
            OPTIONAL
                (Interleaver Shift)
        },
        nonInterleaved        NULL
        },
        tci-StatesPDCCH       SEQUENCE(SIZE
(1..maxNrofTCI-StatesPDCCH)) OF TCI-StateId    OPTIONAL,
(QCL Configuration Information)
        tci-PresentInDCI      ENUMERATED {enabled}
                              OPTIONAL,  -- Need S
}

In Table 7, tci-StatesPDCCH (hereinafter, referred to as a transmission configuration indication (TCI) state) configuration information may include information about an index or indices of one or multiple SS/PBCH blocks having a QCL relationship with a DMRS transmitted on a corresponding CORESET, or information about an index of a channel state information reference signal (CSI-RS).

Figure 5A:
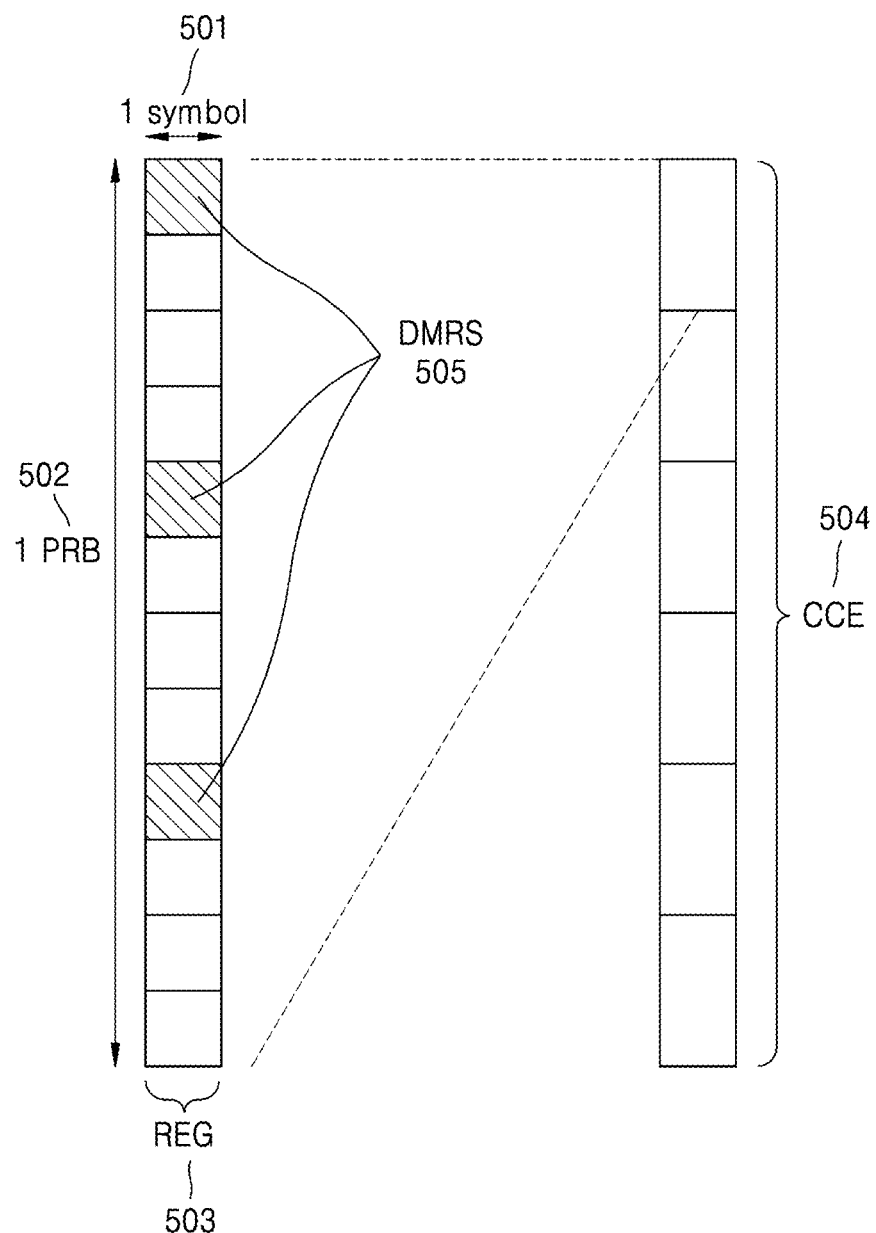
FIG. 5A illustrates a diagram of a structure of a downlink control channel in a wireless communication system according to an embodiment of the disclosure.

FIG. 5A illustrates a diagram of an example of a base unit of time and frequency resources configuring a downlink control channel, which may be used in a wireless communication system according to an embodiment of the disclosure. According to FIG. 5A, the base unit of the time and frequency resources configuring the control channel may be called a resource element group (REG) 503, and the REG 503 may be defined as one OFDM symbol 501 on a time axis and one physical resource block (PRB) 502 on a frequency axis, that is, may be defined as, 12 subcarriers. A base station connects and attaches REGs 503 to each other to configure a downlink control channel assignment unit.

As shown in FIG. 5A, when a base unit for the assignment of the downlink control channel in 5G is a control channel element (CCE) 504, one CCE 504 may be configured by a plurality of the REGs 503. For example, the REG 503 shown in FIG. 5A may be configured by 12 REs, and when one CCE 504 is configured by six REGs 503, the one CCE 504 may be configured by 72 REs. When a downlink CORESET is configured, the downlink CORESET may be configured by a plurality of CCEs 504, and a specific downlink control channel may be transmitted after being mapped to one or the plurality of CCEs 504, according to an aggregation level (AL) in the CORESET. The CCEs 504 in the CORESET are distinguished by numbers, and here, the numbers of CCEs 504 may be assigned according to a logical mapping scheme.

The base unit of the downlink control channel shown in FIG. 5A, i.e., the REG 503, may include REs to which DCI is mapped and a region to which a DMRS 505 that is a reference signal for decoding the REs, is mapped. As shown in FIG. 5A, three DMRSs 505 may be transmitted in one REG 503. The number of CCEs required to transmit a PDCCH may be 1, 2, 4, 8, or 16 depending on the AL, and the different numbers of CCEs may be used to implement link adaptation of the downlink control channel. For example, when AL=L, one downlink control channel may be transmitted via L CCEs. A UE needs to detect a signal while information about the downlink control channel is unknown, and thus a search space indicating a set of CCEs needs to be defined for blind decoding. The search space is a set of downlink control channel candidates including CCEs that are attempted to be decoded by the UE on a given AL. Here, the UE may have a plurality of search spaces because there are several ALs forming one group by using 1, 2, 4, 8, or 16 CCEs. A search space set may be defined as a set of search spaces in all configured ALs.

The search spaces may be classified into a common search space and a UE-specific search space. UEs of a certain group or all UEs may inquire into a common search space of a PDCCH to receive cell-common control information, such as a paging message or dynamic scheduling for system information. For example, PDSCH scheduling assignment information for transmission of an SIB including cell operator information may be received by inquiring into the common search space of the PDCCH. The common search space may be defined as a set of pre-promised CCEs because the certain group of UEs or all UEs need to receive the PDCCH. Scheduling assignment information for a UE-specific PDSCH or PUSCH may be received by inquiring into a UE-specific search space of the PDCCH. The UE-specific search space may be U-specifically defined through an identity of the UE and a function of various system parameters.

In the 5G, a parameter for a search space of the PDCCH may be configured to the UE by the base station via higher layer signaling (for example, SIB, MIB, or RRC signaling). For example, the base station may configure, with respect to the UE, the number of PDCCH candidates in each of the L ALs, a monitoring period for the search space, a monitoring occasion of a symbol unit within a slot for the search space, a search space type (common search space or UE-specific search space), a combination of a DCI format and RNTI to be monitored in the search space, and an index of a CORE-SET for monitoring the search space. For example, the following pieces of information may be included.

TABLE 8

```
SearchSpace ::=                            SEQUENCE {
    -- Identity of the search space. SearchSpaceId = 0 identifies the SearchSpace configured
via PBCH (MIB) or ServingCellConfigCommon.
        searchSpaceId                      SearchSpaceId,
        (Search Space Identifier)
        controlResourceSetId               ControlResourceSetId,
        (CORESET Identifier)
        monitoringSlotPeriodicityAndOffset  CHOICE {
        (Monitoring Slot Level Period)
            sl1                            NULL,
            sl2                            INTEGER (0..1),
            sl4                            INTEGER (0..3),
            sl5                            INTEGER (0..4),
            sl8                            INTEGER (0..7),
            sl10                           INTEGER (0..9),
            sl16                           INTEGER (0..15),
            sl20                           INTEGER (0..19)
        }
                        OPTIONAL,
    duration(Monitoring Duration) INTEGER (2..2559)
        monitoringSymbolsWithinSlot        BIT STRING (SIZE (14))
                        OPTIONAL,
        (Monitoring Symbol in Slot)
            nrofCandidates                 SEQUENCE {
            (Number of PDCCH Candidates for Each Aggregation Level)
                aggregationLevel1           ENUMERATED {n0, n1, n2, n3, n4, n5, n6,
n8},
                aggregationLevel2           ENUMERATED {n0, n1, n2, n3, n4, n5, n6,
n8}
                aggregationLevel4           ENUMERATED {n0, n1, n2, n3, n4, n5, n6,
n8}
                aggregationLevel8           ENUMERATED {n0, n1, n2, n3, n4, n5, n6,
n8}
                aggregationLevel16          ENUMERATED {n0, n1, n2, n3, n4, n5, n6,
n8}
        },
        searchSpaceType                    CHOICE {
        (Search Space Type)
            -- Configures this search space as common search space (CSS) and DCI formats to
monitor.
            common                         SEQUENCE {
            (Common Search Space)
        }
            ue-Specific                    SEQUENCE {
            (UE-Specific Search Space)
                -- Indicates whether the UE monitors in this USS for DCI formats 0-0 and 1-0 or
for formats 0-1 and 1-1.
```

TABLE 8-continued

| formats | ENUMERATED {formats0-0-And-1-0, formats0-1-And-1 -1}, |
|---|---|
| } | ... |

The base station may configure, with respect to the UE, one or a plurality of search space sets, according to configuration information. According to some embodiments of the disclosure, the base station may configure, with respect to the UE, a search space set 1 and a search space set 2. The search space set 1 may be configured such that a DCI format A scrambled with X-RNTI is monitored in the common search space, and the search space set 2 may be configured such that a DCI format B scrambled with Y-RNTI is monitored in the UE-specific search space.

According to the configuration information, there may be one or a plurality of search space sets in the common search space or the UE-specific search space. For example, a search space set #1 and a search space set #2 may be configured as the common search space, and a search space set #3 and a search space set #4 may be configured as the UE-specific search space.

In the common search space, a combination of a DCI format and RNTI, as below, may be monitored. However, the combination is not limited to the following examples:
DCI format 0_0/1_0 with CRC scrambled by C-RNTI, CS-RNTI, SP-CSI-RNTI, RA-RNTI, TC-RNTI, P-RNTI, SI-RNTI;
DCI format 2_0 with CRC scrambled by SFI-RNTI;
DCI format 2_1 with CRC scrambled by INT-RNTI;
DCI format 2_2 with CRC scrambled by TPC-PUSCH-RNTI, TPC-PUCCH-RNTI; and
DCI format 2_3 with CRC scrambled by TPC-SRS-RNTI.

In the UE-specific search space, a combination of a DCI format and RNTI below may be monitored. However, the combination is not limited to the following examples:
DCI format 0_0/1_0 with CRC scrambled by C-RNTI, CS-RNTI, TC-RNTI; and
DCI format 1_0/1_1 with CRC scrambled by C-RNTI, CS-RNTI, TC-RNTI.

The specified RNTIs may follow the following definitions and usages:
Cell RNTI (C-RNTI): For scheduling UE-specific PDSCH;
Temporary cell RNTI (TC-RNTI): For scheduling UE-specific PDSCH;
Configured scheduling RNTI (CS-RNTI): For scheduling quasi-statically configured UE-specific PDSCH;
Random access RNTI (RA-RNTI): For scheduling PDSCH during random access;
Paging RNTI (P-RNTI): For scheduling PDSCH on which paging is transmitted;
System information RNTI (SI-RNTI): For scheduling PDSCH on which system information is transmitted;
Interruption RNTI (INT-RNTI): For notifying about puncturing of PDSCH;
Transmit power control for PUSCH RNTI (TPC-PUSCH-RNTI): For indicating power control command for PUSCH;
Transmit power control for PUCCH RNTI (TPC-PUCCH-RNTI): For indicating power control command for PUCCH; and Transmit power control for SRS RNTI (TPC-SRS-RNTI): For indicating power control command for SRS.
The DCI formats specified above may follow definitions below.

TABLE 9

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In the 5G, a search space in an AL L in a CORESET p and a search space set s may be represented as Equation 1 below.

$$L \cdot \left\{ \left( Y_{p,n_{s,f}^\mu} + \left\lfloor \frac{m_{s,n_{CI}} \cdot N_{CCE,p}}{L \cdot M_{p,s,max}^{(L)}} \right\rfloor + n_{CI} \right) \mod \lfloor N_{CCE,p}/L \rfloor \right\} + i \quad \text{[Equation 1]}$$

L: AL
$n_{CI}$: Carrier Index
$N_{CCE,p}$: Total Number of CCEs present within CORESET p
nµs,f: Slot Index
$M^{(L)}_{p,s,max}$: Number of PDCCH Candidates of AL L
$m_{snCI}$=0, ..., $M^{(L)}_{p,s,max}$−1: Index of PDCCH candidate of AL L
i=0, ..., L−1
$Y_{p,n_{s,f}^\mu}$=($A_p \cdot Y_{p,n_{s,f}^\mu -1}$)modD, $Y_{p,-1}=n_{RNTI}\neq 0$, $A_0$=39827, $A_1$=39829, $A_2$=39839, D=65537
$n_{RNTI}$: UE Identifier
A value of Y_(p,nµ_{s,f}) may correspond to 0 in the common search space.
The value of Y_(p,nµ_{s,f}) may correspond to a value changing according to an identity (C-RNTI or ID configured to the UE by the base station) of the UE and a time index, in the UE-specific search space.

In the 5G, a plurality of search space sets may be configured by different parameters (e.g., parameters in Table 8), and thus a set of search space sets monitored by the UE may be changed at every time point. For example, when the search space set #1 is configured to have an X-slot period, the search space set #2 is configured to have a Y-slot period, and X is different from Y, the UE may monitor both the search space set #1 and the search space set #2 in a specific slot, or may monitor one of the search space set #1 and the search space set #2 in a specific slot.

[PDCCH: Span]
The UE may perform a UE capability report regarding a case where the UE has a plurality of PDCCH monitoring locations in a slot, for each subcarrier spacing, and at this time, may use a concept of span. The span denotes consecutive symbols for the UE to monitor the PDCCH in the slot, and each PDCCH monitoring location is within one span. The span may be represented as (X, Y), and here, X denotes the minimum number of symbols between first symbols of two consecutive spans, and Y denotes the number of consecutive symbols for monitoring the PDCCH in one span. Here, the UE may monitor the PDCCH in a section of the span from the first symbol to a Y symbol, in the span.

Figure 5B:
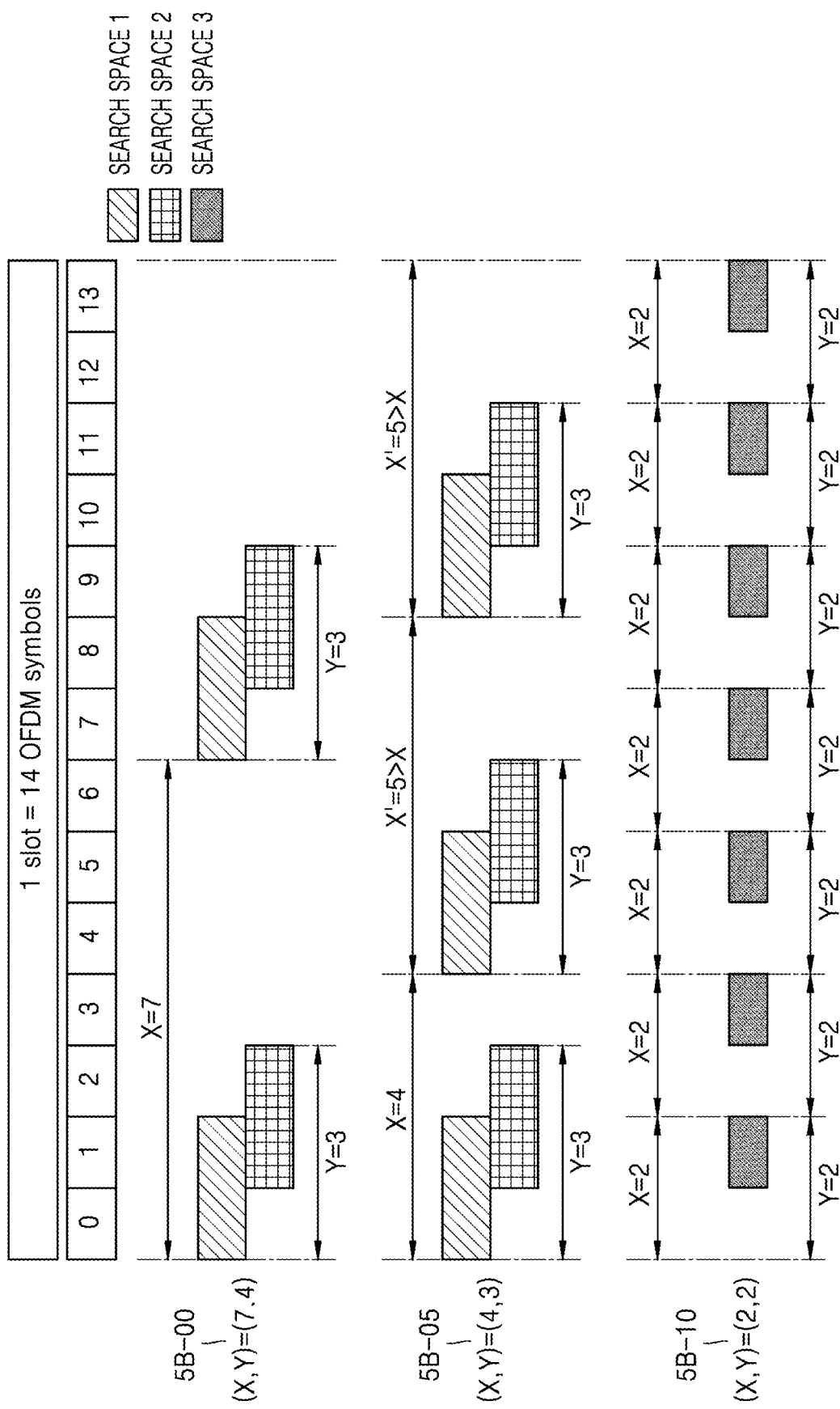
FIG. 5B illustrates a diagram showing, through a span, a case where a user equipment (UE) may have a plurality of physical downlink control channel (PDCCH) monitoring locations in a slot, in a wireless communication system according to an embodiment of the disclosure.

FIG. 5B illustrates a diagram showing, through the span, a case where the UE may have the plurality of PDCCH monitoring locations in the slot, in a wireless communication system. Regarding the span, (X, Y)=(7, 4), (4, 3), and (2, 2), and these three cases are respectively indicated by 5B-00, 5B-05, and 5B-10 in FIG. 5B. For example, the case 5B-00 shows a case where two spans representable by (7, 4) are present in a slot. An interval between first symbols of the two spans is represented by X=7, a PDCCH monitoring location may be presented within total Y=3 symbols from the first symbol of each span, and search spaces 1 and 2 are each present within Y=3 symbols. As another example, the case 5B-05 shows a case where total three spans representable by (4, 3) are present in a slot, wherein an interval between second and third spans is X'=5 symbols that is greater than X=4 symbols.

[DRX]

FIG. 6 illustrates a diagram of an example of a discontinuous reception (DRX) operation in a wireless communication system according to an embodiment of the disclosure.

DRX is an operation in which a UE using a service discontinuously receives data in an RRC-connected state in which a radio link is configured between a base station and the UE. When the DRX is applied, the UE may turn on a receiver at a specific time point to monitor a control channel, and when there is no data received for a certain period, the UE may turn off the receiver to reduce power consumption of the UE. The DRX operation may be controlled by a media access control (MAC) entity, based on various parameters and timers.

Referring to FIG. 6, an active time 605 is a time during the UE wakes up at DRX periods and monitors a PDCCH. The active time 605 may be defined as below:

drx-onDurationTimer or drx-InactivityTimer or drx-RetransmissionTimerDL or drx-RetransmissionTimerUL or ra-ContentionResolutionTimer is running;

a scheduling request is sent on a PUCCH and is pending; or a PDCCH indicating a new transmission addressed to a C-RNTI of the MAC entity has not been received after successful reception of a random access response for a random access preamble not selected by the MAC entity among a contention-based random access preamble.

Here, drx-onDurationTimer, drx-InactivityTimer, drx-RetransmissionTimerDL, drx-RetransmissionTimerUL, and ra-ContentionResolutionTimer are timers having values configured by the base station, and have a function to configure the UE to monitor the PDCCH in a situation satisfying a certain condition.

A drx-onDurationTimer 615 is a parameter for configuring a minimum time during which the UE is awake in a DRX cycle. A drx-InactivityTimer 620 is a parameter for configuring a time during which the UE is additionally awake in a case 630 where the PDCCH indicating new uplink transmission or downlink transmission is received. A drx-RetransmissionTimerDL is a parameter for configuring a maximum time during which the UE is awake to receive downlink retransmission in a downlink hybrid automatic request (HARQ) procedure. A drx-RetransmissionTimerUL is a parameter for configuring a maximum time during which the UE is awake to receive a grant for uplink retransmission in an uplink HARQ procedure. The drx-onDurationTimer 615, the drx-InactivityTimer 620, the drx-RetransmissionTimerDL, and the drx-RetransmissionTimerUL may be configured by, for example, a time, the number of subframes, or the number of slots. A ra-ContentionResolutionTimer is a parameter for monitoring a PDCCH in a random access procedure.

An inactive time 610 is a time configured not to monitor and/or receive a PDCCH in the DRX operation, and may be remaining time excluding the active time 605 from the entire time during which the DRX operation is performed. When the UE does not monitor the PDCCH during the active time 605, the UE may enter a sleep or inactive state to reduce power consumption.

The DRX cycle denotes a period at which the UE wakes up and monitors the PDCCH. In other words, the DRX cycle denotes a time interval between monitoring of the PDCCH by the UE and monitoring of a next PDCCH, or an on-duration occurrence period. There are two types of DRX cycles, which are a short DRX cycle and a long DRX cycle. The short DRX cycle may be optionally applied.

A long DRX cycle 625 is a long cycle among the two types of DRX cycles configured to the UE. While the UE operates in long DRX, the UE restarts the drx-onDurationTimer 615 at a time point after the long DRX cycle 625 has passed from a start point (e.g., a starting symbol) of the drx-onDurationTimer 615. When the UE operates in the long DRX cycle 625, the UE may start the drx-onDurationTimer 615 in a slot after a drx-SlotOffset in a subframe satisfying Equation 2 below. The drx-SlotOffset implies a delay before the drx-onDurationTimer 615 is started. The drx-SlotOffset may be configured by, for example, a time or the number of slots. [Equation 2]

$$[(SFN\ Y\ 10)+\text{subframe number}]\text{modulo}(\text{drx-Long-Cycle})=\text{drx-LongCycleStartOffset} \quad \text{[Equation 2]}$$

Here, a drx-StartOffset may be used to define a subframe in which the DRX cycle starts. For example, a drx-LongCycleStartOffset may be used to define a subframe in which the long DRX cycle 625 starts. The drx-LongCycleStartOffset may be configured by a time, the number of subframes, or the number of slots.

[PDCCH: UE Capability Report]

A slot location where the common search space or UE-specific search space described above is located is indicated by a monitoringSymbolsWithinSlot parameter of Table 10-1, and a symbol location in a slot is indicated by a bitmap through the monitoringSymbolsWithinSlot parameter of Table 9. A symbol location in a slot on which the UE may perform search space monitoring may be reported to the base station through following examples of UE capabilities.

In one example of UE Capability 1 (hereinafter, FG 3-1), as in Table 10-1 below, the current UE capability denotes a capability capable of monitoring a monitoring occasion (MO) when the corresponding MO is within first 3 symbols in a slot, in a case where one MO for type 1 and type 3 common search spaces or UE-specific search spaces is present in the slot. The current UE capability is a mandatory capability to be supported by all UEs supporting NR. Supporting of the UE capability is not explicitly reported to the base station.

TABLE 10-1

| Index | Feature group | Components | Field name in TS 38.331 |
|---|---|---|---|
| 3-1 | Basic DL control channel | 1) One configured CORESET per BWP per cell in addition to CORESET0<br>    CORESET resource allocation of 6RB bit-map and duration of 1-3 OFDM symbols for FR1<br>        For type 1 CSS without dedicated RRC configuration and for type 0, 0A, and 2 CSSs, CORESET resource allocation of 6RB bit-map and duration 1-3 OFDM symbols for FR2<br>        For type 1 CSS with dedicated RRC configuration and for type 3 CSS, UE specific SS, CORESET resource allocation of 6RB bit-map and duration 1-2 OFDM symbols for FR2<br>        REG-bundle sizes of ⅔ RBs or 6 RBs<br>        Interleaved and non-interleaved CCE-to-REG mapping<br>            Precoder-granularity of REG-bundle size<br>            PDCCH DMRS scrambling determination<br>            TCI state(s) for a CORESET configuration<br>2) CSS and UE-SS configurations for unicast PDCCH transmission per BWP per cell<br>    PDCCH aggregation levels 1, 2, 4, 8, 16<br>    UP to 3 search space sets in a slot for a scheduled SCell per BWP<br>    This search space limit is before applying all dropping rules.<br>        For type 1 CSS with dedicated RRC configuration, type 3 CSS, and UE-SS, the monitoring occasion is within the first 3 OFDM symbols of a slot<br>        For type 1 CSS without dedicated RRC configuration and for type 0, 0A, and 2 CSS, the monitoring occasion can be any OFDM symbol(s) of a slot, with the monitoring occasions for any of Type 1-CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | n/a |

In one example of UE Capability 2 (hereinafter, FG 3-2), as in Table 10-2 below, the current UE capability denotes a capability capable of monitoring an MO regardless of a location of a start symbol of the corresponding MO, in a case where one MO for a common search space or UE-specific search space is present in the slot. The current UE capability is optionally supportable by the UE. Supporting of the UE capability is explicitly reported to the base station.

TABLE 10-2

| Index | Feature group | Components | Field name in TS 38.331 |
|---|---|---|---|
| 3-2 | PDCCH monitoring on any span of up to 3 consecutive OFDM symbols of a slot | For a given UE, all search space configurations are within the same span of 3 consecutive OFDM symbols in the slot | pdcchMonitoringSingleOccasion |

In one example of UE Capability 3 (hereinafter, FG 3-5, 3-5a, and 3-5b), as in Table 10-3 below, the current UE capability indicates a pattern of an MO capable of being monitored by the UE, in a case where a plurality of MOs for a common search space or UE-specific search space are present in a slot. The pattern includes an interval X between start symbols of different MOs, and a maximum symbol length Y for one MO. A combination of (X, Y) supported by the UE may be one or more of $\{(2, 2), (4, 3), (7, 3)\}$. The current UE capability is optionally supportable by the UE and supporting of the UE capability and the combination of (X, Y) are explicitly reported to the base station.

TABLE 10-3

| Index | Feature group | Components | Field name in TS 38.331 |
|---|---|---|---|
| 3-5 | For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 | pdcch-MonitoringAnyOccasions {<br>3-5.<br>withoutDCI-Gap<br>3-5a.<br>withDCI-Gap<br>} |
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as<br>    2OFDM symbols for 15 kHz<br>    4OFDM symbols for 30 kHz<br>    7OFDM symbols for 60 kHz<br>with NCP<br>    11OFDM symbols for 120 kHz Up to one unicast DL DCI and up to one unicast UL DCI in a monitoring occasion except for the monitoring occasions of FG 3-1. In addition for TDD the minimum separation between the first two UL unicast DCIs within the first 3 OFDM symbols of a slot can be zero OFDM symbols. | |
| 3-5b | All PDCCH monitoring occasion can | PDCCH monitoring occasions of FG-3-1, plus additional PDCCH monitoring | |

TABLE 10-3-continued

| Index | Feature group | Components | Field name in TS 38.331 |
|---|---|---|---|
| | be any OFDM symbol(s) of a slot for Case 2 with a span gap | occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(1), 0 <= 1 <= 13 is generated, where b(1) = 1 if symbol 1 of any slot is part of a monitoring occasion, b(1) = 0 otherwise. The first span in the span pattern begins at the smallest 1 for which b(1) = 1. The next span in the span pattern begins at the smallest 1 not included in the previous span(s) for which b(1) = 1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary. For the set of monitoring occasions which are within the same span: Processing one unicast DCI scheduling DL and one unicast DCI scheduling UL per scheduled CC across this set of monitoring occasions for FDD Processing one unicast DCI scheduling DL and two unicast DCI scheduling UL per scheduled CC across this set of monitoring occasions for TDD Processing two unicast DCI scheduling DL and one unicast DCI scheduling UL per scheduled CC across this set of monitoring occasions for TDD The number of different start symbol indices of spans for all PDCCH monitoring occasions per slot, including PDCCH monitoring occasions of FG-3 1, is no more than floor(14/X) (X is minimum among values reported by UE). The number of different start symbol indices of PDCCH monitoring occasions per slot including PDCCH monitoring occasions of FG-3-1, is no more than 7. The number of different start symbol indices of PDCCH monitoring occasions per half-slot including PDCCH monitoring occasions of FG 3-1 is no more than 4 in SCell. | |

The UE may report, to the base station, the supporting of the UE capability 2 and/or the UE capability 3, and related parameters. Based on the reported UE capability, the base station may perform time axis resource assignment for the common search space and the UE-specific search space. During the resource assignment, the base station may not locate the MO at a location that is unable to be monitored by the UE.

[PDCCH: BD/CCE Limit]

When a plurality of search space sets are configured to the UE, following conditions may be considered regarding a method of determining a search space set required to be monitored by the UE.

When a value of monitoringCapabilityConfig-r16 that is higher layer signaling is configured to the UE as r15monitoringcapability, the UE defines, for each slot, a maximum value of the number of CCEs configuring the number of PDCCH candidates and an entire search space (here, the entire search space denotes an entire CCE set corresponding to a union region of a plurality of search space sets) capable of being monitored, and when the value of monitoringCapabilityConfig-r16 is configured to the UE as r16monitoringcapability, the UE defines, for each span, a maximum value of the number of CCEs configuring the number of PDCCH candidates and the entire search space (here, the entire search space denotes the entire CCE set corresponding to the union region of the plurality of search space sets) capable of being monitored.

TABLE 10-4

| Condition 1: Limitation on maximum number of PDCCH Candidates | |
|---|---|
| $\mu$ | Maximum number of PDCCH candidates per slot and per serving cell ($M^\mu$) |
| 0 | 44 |
| 1 | 36 |
| 2 | 22 |
| 3 | 20 |

According to a configuration value of the higher layer signaling, the maximum number M Pt of PDCCH candidates capable of being monitored by the UE may follow Table 11-1 when defined based on a slot in a cell configured to have subcarrier spacing $15 \cdot 2\mu$ kHz, and follow Table 11-2 when defined based on a span.

TABLE 11-1

| $\mu$ | Maximum number of PDCCH candidates per slot and per serving cell ($M^\mu$) |
|---|---|
| 0 | 44 |
| 1 | 36 |
| 2 | 22 |
| 3 | 20 |

TABLE 11-2

| | Maximum number $M^\mu$ of monitored PDCCH candidates per span for combination (X, Y) and per serving cell | | |
|---|---|---|---|
| $\mu$ | (2, 2) | (4, 3) | (7, 4) |
| 0 | 14 | 28 | 44 |
| 1 | 12 | 24 | 36 |

[Condition 2: Limitation on Maximum Number of CCEs]

According to the configuration value of the higher layer signaling, the maximum number $C\mu$ of CCEs configuring an entire search space (here, the entire search space denotes all CCE sets corresponding to a union region of a plurality of search space sets) may follow Table 11-3 below when defined based on a slot in a cell configured to have subcarrier spacing $15 \cdot 2\mu$ kHz, and follow Table 11-4 when defined based on a span.

TABLE 11-3

| $\mu$ | Maximum number of non-overlapped CCEs per slot and per serving cell ($C^\mu$) |
|---|---|
| 0 | 56 |
| 1 | 56 |
| 2 | 48 |
| 3 | 32 |

TABLE 11-4

| | Maximum number $C^\mu$ of non-overlapped CCEs per span for combination (X, Y) and per serving cell | | |
|---|---|---|---|
| $\mu$ | (2, 2) | (4, 3) | (7, 4) |
| 0 | 18 | 36 | 56 |
| 1 | 18 | 36 | 56 |

For convenience of description, a Condition A is defined as a situation satisfying both Conditions 1 and 2 at a specific time point. Therefore, non-satisfaction of Condition A may imply non-satisfaction of at least one of Conditions 1 and 2.

A case where Condition A is not satisfied at a specific time point may occur according to a configuration of search space sets by the base station. When Condition A is not satisfied at the specific time point, the UE may select and monitor only some of search space sets configured to satisfy Condition A at the time point, and the base station may transmit a PDCCH through the selected search space sets.

[PDCCH: Overbooking]

A method of selecting some search spaces of all configured search space sets may follow methods below.

Method 1

In a case where Condition A related to a PDCCH is not satisfied at a specific time point (slot), a UE (or a base station) may select a search space set configured to have a search space type of a common search space among search space sets present at the time point in preference to a search space set configured to have a search space type of a UE-specific search space.

When all search space sets configured as a common search space are selected (i.e., when Condition A is satisfied even after all search spaces configured as a common search space are selected), the UE (or the base station) may select search space sets configured as a UE-specific search space. Here, when there are a plurality of search space sets configured as a UE-specific search space, the smaller an index of a search space set, the higher a priority of the search space set. UE-specific search space sets may be selected within a range of satisfying Condition A in consideration of the priorities.

[QCL, TCI State]

In a wireless communication system, one or more different antenna ports (may be replaced by one or more channels, signals, or combinations thereof, but for convenience of description, unified to the different antenna ports) may be associated with each other through a QCL configuration as Table 12 below. A TCI state is for notifying about a QCL relationship between a PDCCH (or PDCCH DMRS) and another RS or channel. When a reference antenna port A (reference RS #A) and another target antenna port B (target RS #B) are QCLed to each other, the UE is allowed to apply all or some of large-scale channel parameters estimated in the antenna port A to perform a channel measurement in the antenna port B. QCL may require different parameters to be associated according to situations including 1) time tracking affected by average delay and delay spread, 2) frequency tracking affected by a Doppler shift and Doppler spread, 3) radio resource management (RRM) affected by an average gain, and 4) beam management (BM) affected by a spatial parameter. Accordingly, NR supports four types of QCL relationships shown in Table 12 below.

TABLE 12

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial RX parameter may be a generic term for some or all of various parameters including an angle of arrival (AoA), a power Angular Spectrum (PAS) of AoA, an angle of departure (AoD), a PAS of AoD, a transmit/receive channel correlation, transmit/receive beamforming, and a spatial channel correlation.

The QCL relationship may be configured to the UE through an RRC parameter TCI-State and QCL-Info as shown in Table 13 below. Referring to Table 13, the base station may configure the UE with at least one TCI state to notify the UE about a maximum of two QCL relationships (qcl-Type1 and qcl-Type2) regarding an RS referring to ID of the TCI state, that is, a target RS. Each of pieces of QCL information (QCL-Info) included in the TCI state may include a serving cell index and a BWP index of a reference RS indicated by a corresponding piece of QCL information, a type and ID of the reference RS, and a QCL type as shown in Table 12 above.

denotes, from among CSI-RSs, an NZP CSI-RS in which a parameter indicating repetition (for example, a repetition parameter) is not configured and trs-Info is also not configured to be true.

TABLE 13

```
TCI-State ::=               SEQUENCE {
   tci-StateId              TCI-StateId,
   (ID of corresponding TCI state)
   qcl-Type1                QCL-Info,
   (QCL information of first reference RS of RS (target RS) referring to corresponding TCI
state ID)
   qcl-Type2                QCL-Info          OPTIONAL,    -- Need R
   (QCL information of second reference RS of RS (target RS) referring to corresponding
TCI state ID)
   ...
}
QCL-Info ::=                SEQUENCE {
   cell                     ServCellIndex     OPTIONAL,    -- Need R
   (Serving cell index: Serving cell index of reference RS indicated by corresponding QCL
information)
   bwp-Id                   BWP-Id            OPTIONAL,    -- Cond
CSI-RS-Indicated
   (BWP index: BWP index of reference RS indicated by corresponding QCL information)
   referenceSignal          CHOICE {
      csi-rs                NZP-CSI-RS-ResourceId,
      ssb                   SSB-Index
      (One of CSI-RS ID or SSB ID, indicated by corresponding QCL information)
   },
   qcl-Type                 ENUMERATED {typeA, typeB, typeC, typeD},
   ...
}
```

FIG. 7 illustrates a diagram of an example of base station beam assignment according to a TCI state configuration in a wireless communication system according to an embodiment of the disclosure.

Referring to FIG. 7, a base station may transmit, to a UE, pieces of information regarding N different beams through N different TCI states. For example, as illustrated in FIG. 7, when N is 3, the base station may allow a qcl-Type 2 parameter included in each of three TCI states 700, 705, and 710 to be associated with a CSI-RS or SSB corresponding to different beams and to be configured to be of QCL type D, so as to notify that antenna ports referring to the different TCI states 700, 705, and 710 are associated with different spatial Rx parameters, that is, different beams.

Tables 14-1 through 14-5 indicate valid TCI state configurations according to target antenna port types.

Table 14-1 indicates valid TCI state configurations when a target antenna port is CSI-RS for tracking (TRS). The TRS denotes, from among CSI-RSs, a non-zero power (NZP) CSI-RS in which a repetition parameter is not configured and trs-Info is configured to be true. A configuration 3 in Table 14-1 may be used for aperiodic TRS.

TABLE 14-1

Valid TCI state configuration when target antenna port is TRS

| Valid TCI state Configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS(BM) | QCL-TypeD |
| 3 | TRS (periodic) | QCL-TypeA | TRS (same as DL RS 1) | QCL-TypeD |

Table 14-2 indicates valid TCI state configurations when a target antenna port is CSI-RS for CSI. The CSI-RS for CSI denotes, from among CSI-RSs, an NZP CSI-RS in which a parameter indicating repetition (for example, a repetition parameter) is not configured and trs-Info is also not configured to be true.

TABLE 14-2

Valid TCI state configuration when target antenna port is CSI-RS for CSI

| Valid TCI state Configuration | DL RS 1 | qcl-Type1 | DL RS 2 (if configured) | qcl-Type2 (if configured |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 14-3 indicates valid TCI state configurations when a target antenna port is CSI-RS for BM (identical to CSI-RS for L1 RSRP reporting). The CSI-RS for BM denotes, from among CSI-RSs, an NZP CSI-RS in which a repetition parameter is configured to have a value of on or off, and trs-Info is not configured to be true.

TABLE 14-3

Valid TCI state configuration when a target antenna port is CSI-RS for BM (for L1 RSRP reporting).

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 14-4 indicates valid TCI state configurations when a target antenna port is PDCCH DMRS.

TABLE 14-4

Valid TCI state configuration when target antenna port is PDCCH DMRS

| Valid TCI state Configuration | DL RS1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 14-5 indicates valid TCI state configurations when a target antenna port is PDSCH DMRS.

TABLE 14-5

Valid TCI state configuration when target antenna port is PDSCH DMRS

| Valid TCI state Configuration | DL RS1 | qcl-Type1 | DL RS 2 (if configured) | qcl-Type2 (if configured |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

A representative QCL configuration method by Tables 14-1 through 14-5 includes managing a target antenna port and reference antenna port for each stage by configuring "SSB"→"TRS"→"CSI-RS for CSI, CSI-RS for BM, PDCCH DMRS, or PDSCH DMRS." Accordingly, it is possible to aid a reception operation of a UE by associating statistical characteristics measurable from an SSB and TRS with each antenna port.

[PDCCH: Regarding TCI State]

In detail, a combination of TCI states applicable to a PDCCH DMRS antenna port is as Table 14-6 below. A fourth row in Table 14-6 is a combination assumed by a UE before an RRC configuration, and a configuration after RRC is impossible.

TABLE 14-6

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
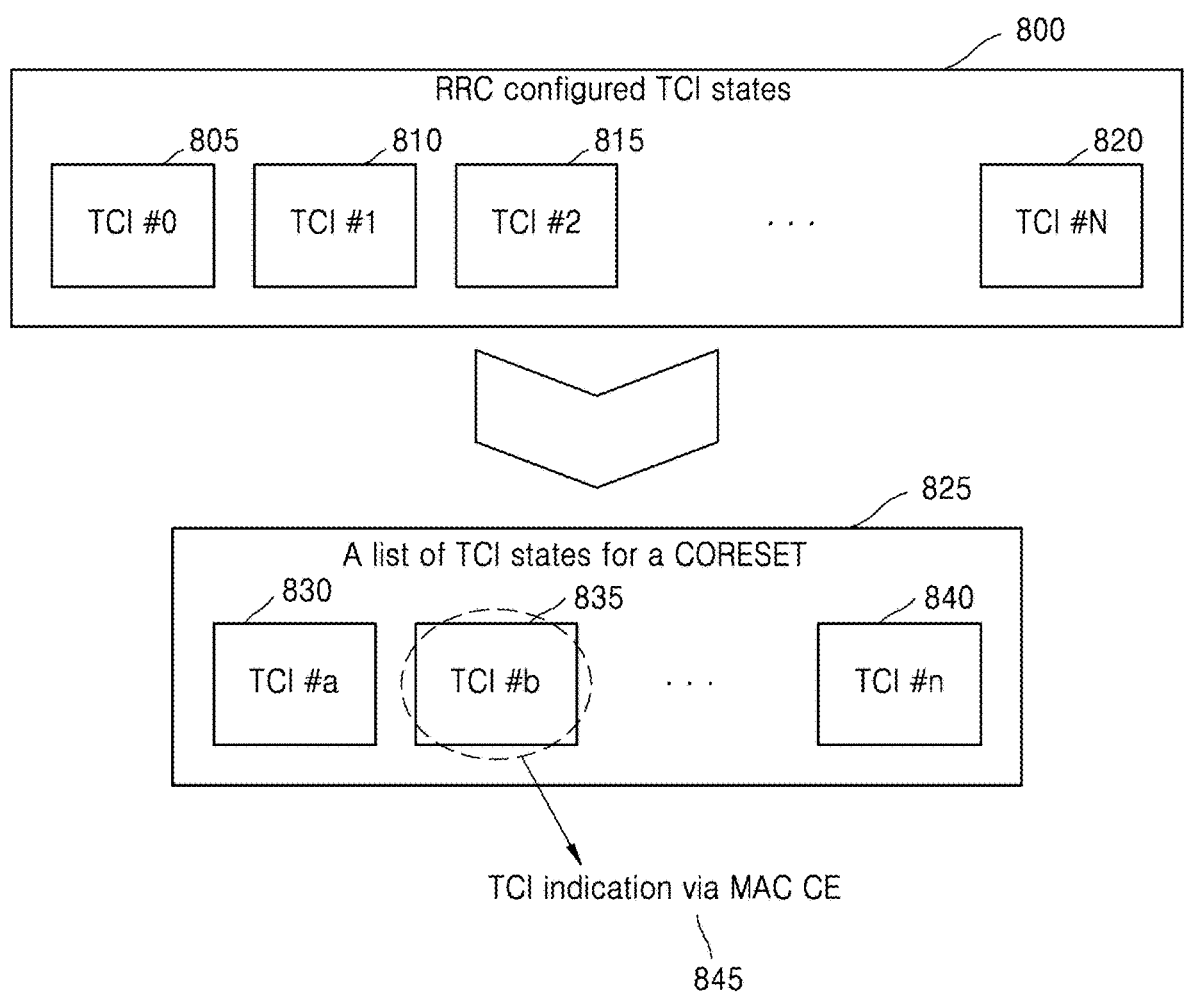
FIG. 8 illustrates a diagram of an example of a TCI state assignment method regarding a PDCCH in a wireless communication system according to an embodiment of the disclosure.

In NR, a hierarchical signaling method as shown in FIG. 8 is supported for dynamic assignment regarding PDCCH beams.

FIG. 8 illustrates a diagram of an example of a TCI state assignment method regarding a PDCCH in a wireless communication system according to an embodiment of the disclosure.

Referring to FIG. 8, a base station may configure, to a UE, N TCI states 805 through 820 through RRC signaling 800, and may configure some TCI states as TCI states 825 for a CORESET. Then, the base station may indicate one of TCI states 830 through 840 for the CORESET to the UE through MAC control element (CE) signaling as indicated by a reference numeral 845. Then, the UE receives a PDCCH, based on beam information included in a TCI state indicated by the MAC CE signaling.

Figure 9:
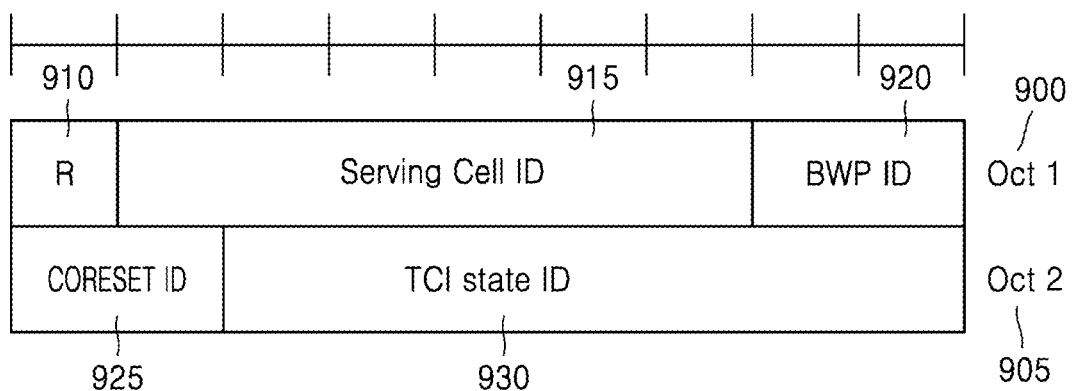
FIG. 9 illustrates a diagram of a TCI indication medium access control (MAC) control element (CE) signaling structure for a PDCCH demodulation reference signal (DMRS) in a wireless communication system according to an embodiment of the disclosure.

FIG. 9 illustrates a diagram of a TCI indication MAC CE signaling structure for a PDCCH DMRS in a wireless communication system according to an embodiment of the disclosure.

Referring to FIG. 9, TCI indication MAC CE signaling for the PDCCH DMRS is configured by 2 bytes (16 bits), and includes a reserved bit (R) 910 of one bit, a serving cell ID 915 of five bits, a BWP ID 920 of two bits, a CORESET ID 925 of two bits, and a TCI state ID 930 of six bits.

Figure 10:
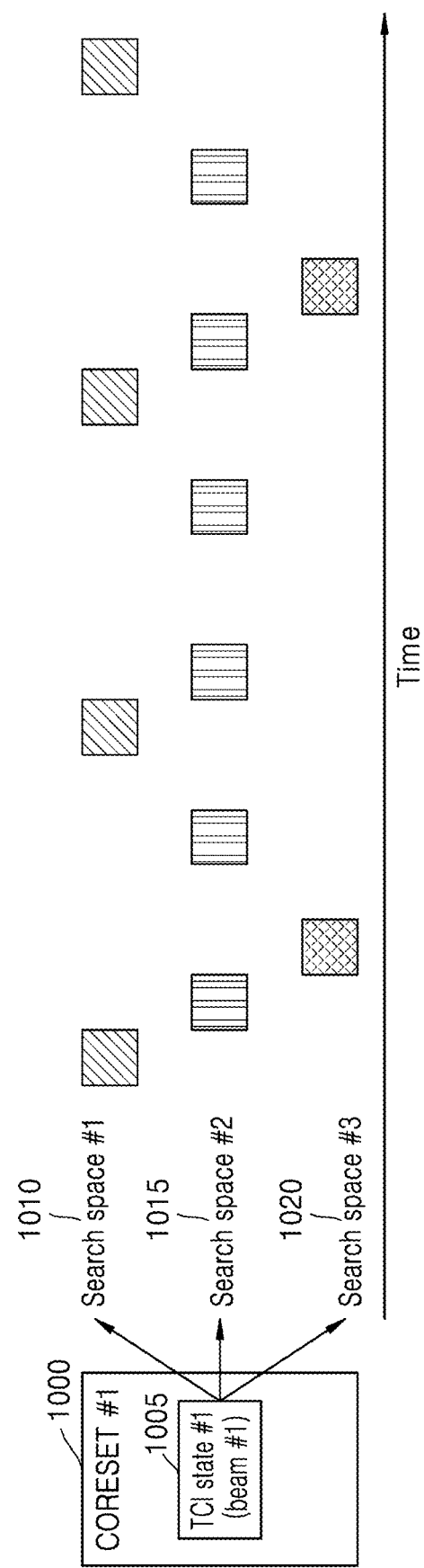
FIG. 10 illustrates a diagram of an example of a beam configuration for a CORESET and a search space in a wireless communication system according to an embodiment of the disclosure.

FIG. 10 illustrates a diagram of an example of a beam configuration for a CORESET and a search space in a wireless communication system according to an embodiment of the disclosure.

Referring to FIG. 10, a base station may indicate one TCI state 1005 in a TCI state list included in a configuration of a CORESET 1000 via MAC CE signaling. Then, until another TCI state is indicated to the CORESET 1000 via another MAC CE signaling, a UE assumes that same QCL information (TCI state 1005, beam #1) is applied to one or more search spaces 1010, 1015, and 1020 connected to the CORESET 1000. Regarding the PDCCH beam assignment method described above, it is difficult to indicate a beam change earlier than an MAC CE signaling delay. Also, there is a demerit that a same beam is collectively applied for each CORESET regardless of characteristics of search spaces, and thus flexible PDCCH beam management is difficult. Hereinafter, embodiments of the disclosure provide a more flexible PDCCH beam configuration and management method. In describing embodiments of the disclosure below, some distinguishable examples are provided for convenience of description, but the examples are not mutually exclusive, and may be appropriately combined with each other according to a situation for application.

The base station may configure, to the UE, one or a plurality of TCI states with respect to a specific CORESET, and may activate one of the configured TCI states through an MAC CE activation command. For example, {TCI state #0, TCI state #1, TCI state #2} is configured to CORESET #1 as TCI states, and the base station may transmit, to the UE, a command for activating the TCI state #0 as a TCI state for the CORESET #1 via an MAC CE. Based on the activation command regarding the TCI state, received via the MAC CE, the UE may correctly receive a DMRS in the CORESET #1, based on QCL information in the activated TCI state.

With respect to a CORESET (CORESET #0) configured to have an index of 0, when the UE has failed to receive an MAC CE activation command regarding a TCI state of the CORESET #0, it may be assumed that the UE is QCLed with an SS/PBCH block identified during an initial access process or a non-contention-based random access process that is not triggered by a PDCCH command, with respect to a DMRS transmitted in the CORESET #0.

With respect to a CORESET (CORESET #X) configured to have an index of a value other than zero, when a TCI state regarding the CORESET #X is failed to be configured to the UE, or when one or more TCI states are configured to the UE, but the UE has failed to receive an MAC CE activation command for activating one of the TCI states, it may be assumed that the UE is QCLed with an SS/PBCH block identified in an initial access process, with respect to a DMRS transmitted in the CORESET #X.

[PDSCH: Regarding Frequency Resource Assignment]

Figure 11:
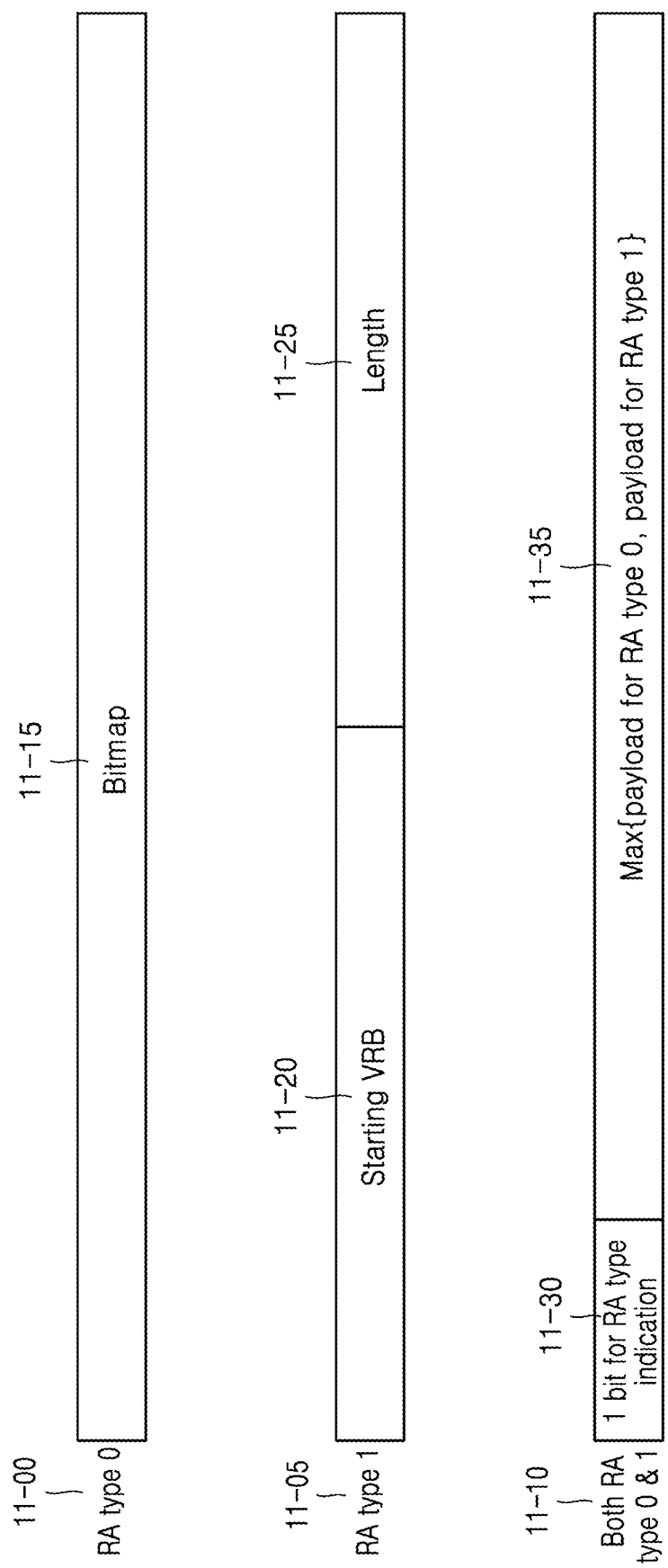
FIG. 11 illustrates a diagram showing an example of a frequency axis resource assignment of a physical downlink shared channel (PDSCH) in a wireless communication system according to an embodiment of the disclosure.

FIG. 11 illustrates a diagram showing an example of a frequency axis assignment of a PDSCH in a wireless communication system according to an embodiment of the disclosure.

FIG. 11 is a diagram showing three frequency axis resource assignment methods of a type 0 11-00, type 1 11-05, and a dynamic switch 11-10, which are configurable via a higher layer in an NR wireless communication system.

Referring to FIG. 11, when a UE is configured to use only a resource type 0 (type 0 11-00) via higher layer signaling, a part of DCI assigning a PDSCH to the UE includes a bitmap consisting of $N_{RBG}$ bits. A condition therefor will be described below. Here, $N_{RBG}$ denotes the number of resource block groups (RBGs) determined as Table 15-1 below according to a BWP size assigned by a BWP indicator and a higher layer parameter rbg-Size, and data is transmitted to RBG indicated by 1 by the bitmap.

TABLE 15-1

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured to use only a resource type 1 (type 1 11-05) via higher layer signaling, the part of DCI assigning the PDSCH to the UE may include frequency axis resource assignment information consisting of $\lceil \log_2(N_{RB}^{DL,BWP}(N_{RB}^{DL,BWP}+1)/2) \rceil$ bits. A condition therefor will be described below. Accordingly, a base station may configure a starting virtual resource block (VRB) 11-20 and a length 11-25 of frequency axis resources assigned continuously therefrom.

When the UE is configured to use both the resource type 0 and the resource type 1 (dynamic switch 11-10) via higher layer signaling, the part of DCI assigning the PDSCH to the UE includes the frequency axis assignment information consisting of bits of a greater value 11-35 among a payload 11-15 for configuring the resource type 0 and a payload (the starting VRB 11-20 and the length 11-25) for configuring the resource type 1. A condition therefor will be described below. At this time, one bit may be added to a front portion (most significant bit (MSB)) of the frequency axis resource assignment information in the DCI, and when a value of the corresponding bit is 0, the use of the resource type 0 may be indicated, and when the value of the corresponding bit is 1, the use of the resource type 1 may be indicated.

[PDSCH/PUSCH: Regarding Time Resource Assignment]

Hereinafter, a time domain resource assignment method regarding a data channel in a next-generation mobile communication system (5G or NR system) will be described.

A base station may configure, to a UE, a table regarding time domain resource assignment information for a PDSCH and a PUSCH, via higher layer signaling (for example, RRC signaling). For the PDSCH, a table consisting of up to maxNrofDL-Allocations=16 entries may be configured, and for the PUSCH, a table consisting of up to maxNrofUL-Allocations=16 entries may be configured. According to an embodiment of the disclosure, the time domain resource assignment information may include a PDCCH-to-PDSCH slot timing (corresponds to a time interval in a slot unit between a time point when the PDCCH is received and a time point when the PDSCH scheduled by the received PDCCH is transmitted, indicated by K0), a PDCCH-to-PUSCH slot timing (corresponds to a time interval in a slot unit between a time point when the PDCCH is received and a time point when the PUSCH scheduled by the received PDCCH is transmitted, indicated by K2), information about a location and length of a start symbol where the PDSCH or PUSCH is scheduled within a slot, and a mapping type of the PDSCH or PUSCH. For example, information such as Table 15-2 or 15-3 below may be transmitted from the base station to the UE.

TABLE 15-2

PDSCH-TimeDomainResourceAllocationList information element

```
PDSCH-TimeDomainResourceAllocationList  ::=  SEQUENCE (SIZE(1..maxNrofDL-Allocations)) OF
PDSCH-TimeDomainResourceAllocation
PDSCH-TimeDomainResourceAllocation  ::=  SEQUENCE (
   k0                                                                INTEGER(0..32)
   OPTIONAL, - Need S
   (PDCCH-to-PDSCH timing, slot unit)
   mappingType                                    ENUMERATED (typeA, typeB},
   (PDSCH mapping type)
   startSymbolAndLength                           INTEGER (0..127)
   (Starting symbol and length of PDSCH)
```

TABLE 15-3

PUSCH-TimeDomainResourceAllocation information element

```
PUSCH-TimeDomainResourceAllocationList  ::=  SEQUENCE (SIZE(1..maxNrofUL-Allocations)) OF
PUSCH-TimeDomainResourceAllocation
PUSCH-TimeDomainResourceAllocation  ::=  SEQUENCE {
   k2                                     INTEGER(0..32)     OPTIONAL,  - Need S
   (PDCCH-to-PUSCH timing, slot unit)
   mappingType                            ENUMERATED (typeA, typeB),
   (PUSCH mapping type)
   startSymbolAndLength                   INTEGER (0..127)
   (Start symbol and length of PUSCH)
```

The base station may notify the UE about one of entries in a table of the time domain resource assignment information, via L1 signaling (for example, DCI) (for example, indicated via a 'time domain resource assignment' field within DCI). The UE may obtain the time domain resource assignment information regarding the PDSCH or PUSCH, based on the DCI received from the base station.

Figure 12:
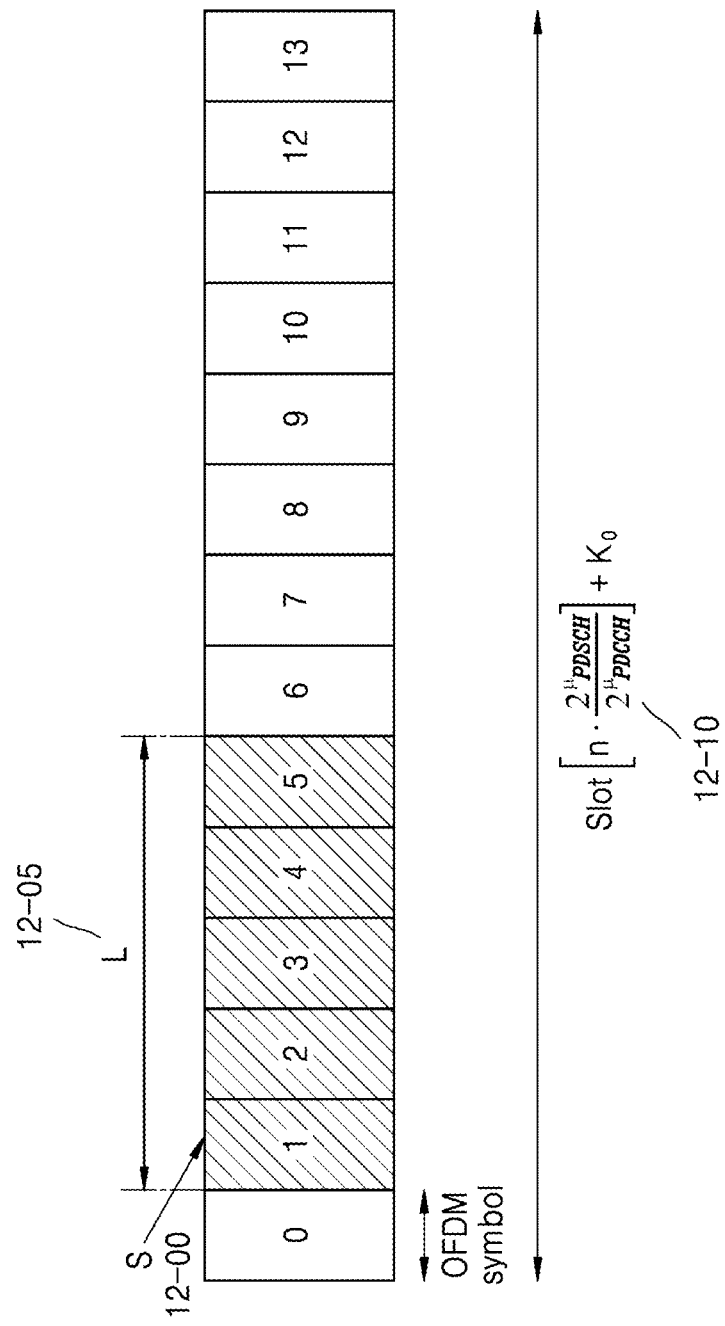
FIG. 12 illustrates a diagram showing an example of a time axis resource assignment of a PDSCH in a wireless communication system according to an embodiment of the disclosure.

FIG. 12 illustrates a diagram showing an example of a time axis resource assignment of a PDSCH in a wireless communication system according to an embodiment of the disclosure.

Referring to FIG. 12, a base station may indicate a time axis location of a PDSCH resource, according to subcarrier spacings (SCSs) (μPDSCH and μPDCCH) of a data channel and control channel configured by using a higher layer, a value of a scheduling offset $K_0$, and an OFDM symbol starting location 12-00 and length 12-05 in one slot dynamically indicated via DCI.

Figure 13A:
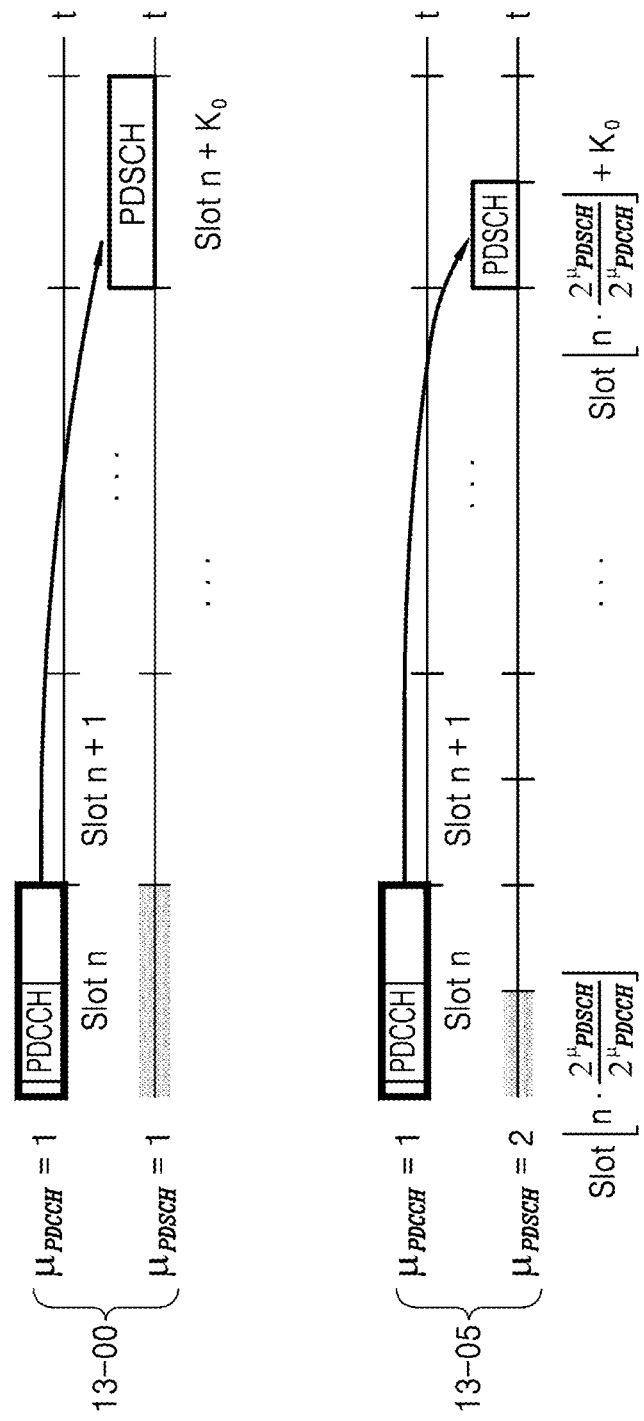
FIG. 13A illustrates a diagram of an example of a time axis resource assignment according to a subcarrier spacing of a data channel and control channel in a wireless communication system according to an embodiment of the disclosure.

Referring to FIG. 13A, in a case 13-00 where subcarrier spacings of a data channel and control channel are the same (μPDSCH=μPDCCH), slot numbers for data and control are the same, and thus a base station and a UE may generate a scheduling offset according to a pre-determined slot offset. On the other hand, in a case 13-05 where the subcarrier spacings of the data channel and control channel are different (μPDSCH≠μPDCCH), the slot numbers for data and control are different, and thus the base station and the UE may generate the scheduling offset according to the pre-determined slot offset, based on the subcarrier spacing of the PDCCH.

[Regarding SRS]

Next, an uplink channel estimation method using sounding reference signal (SRS) transmission of a UE will be described. A base station may configure, to the UE, at least one SRS configuration for each uplink BWP and at least one SRS resource set for each SRS configuration, so as to transmit configuration information for the SRS transmission.

For example, the base station and the UE may exchange higher signaling information as below so as to transfer information about the SRS resource set:

srs-ResourceSetId: An SRS resource set index;
srs-ResourceIdList: A set of SRS resource indexes referred to by an SRS resource set
resourceType: A time axis transmission configuration of an SRS resource referred to by an SRS resource set, and may be configured to be one of periodic, semi-persistent, and aperiodic. When configured to be periodic or semi-persistent, associated CSI-RS information may be provided depending on where the SRS resource set is used. When configured to be aperiodic, an aperiodic SRS resource trigger list and slot offset information may be provided, and the associated CSI-RS information may be provided depending on where the SRS resource set is used;
usage: A configuration regarding where an SRS resource referred to by an SRS resource set is used, and may be configured to be one of beamManagement, codebook, nonCodebook, and antennaSwitching; and
alpha, p0, pathlossReferenceRS, srs-PowerControlAdjustmentStates: Provides a parameter configuration for transmission power control of an SRS resource referred to by an SRS resource set.

The UE may interpret that an SRS resource included in a set of SRS resource indexes referred to by an SRS resource set follows information configured in the SRS resource set.

Also, the base station and the UE may transmit and receive higher layer signaling information to transfer individual configuration information regarding the SRS resource. For example, the individual configuration information regarding the SRS resource may include time-frequency axis mapping information in a slot of the SRS resource, and the time-frequency axis mapping information may include information about frequency hopping within a slot or between slots of the SRS resource. Also, the individual configuration information regarding the SRS resource may include a time axis transmission configuration of the SRS resource, and may be configured to be one of periodic, semi-persistent, and aperiodic. The individual configuration information may be limited to have a same time axis transmission configuration as the SRS resource set including the SRS resource. When the time axis transmission configuration of the SRS resource is configured to be periodic or semi-persistent, an SRS resource transmission period and a slot offset (for example, periodicityAndOffset) may be additionally included in the time axis transmission configuration.

The base station may activate, deactivate, or trigger the SRS transmission in the UE via higher layer signaling including RRS signaling or MAC CE signaling, or via L1 signaling (for example, DCI). For example, the base station may activate or deactivate periodic SRS transmission in the UE via higher layer signaling. The base station may indicate an SRS resource set in which resourceType is configured to be periodic to be activated via higher layer signaling, and the UE may transmit an SRS resource referred to by the activated SRS resource set. Time-frequency axis resource mapping in a slot of the transmitted SRS resource follows resource mapping information configured in the SRS resource, and slot mapping including a transmission period and slot offset follows periodicityAndOffset configured in the SRS resource. Also, a spatial domain transmission filter applied to the transmitted SRS resource may refer to spatial relation information configured in the SRS resource or associated CSI-RS information configured in the SRS resource set including the SRS resource. The UE may transmit the SRS resource in an uplink BWP activated regarding the periodic SRS resource activated via the higher layer signaling.

For example, the base station may activate or deactivate semi-persistent SRS transmission in the UE via higher layer signaling. The base station may indicate an SRS resource set to be activated via MAC CE signaling, and the UE may transmit an SRS resource referred to by the activated SRS resource set. The SRS resource set activated via the MAC CE signaling may be limited to an SRS resource set in which resourceType is configured to be semi-persistent. Time-frequency axis resource mapping in a slot of the transmitted SRS resource follows resource mapping information configured in the SRS resource, and slot mapping including a transmission period and slot offset follows periodicityAndOffset configured in the SRS resource.

Also, a spatial domain transmission filter applied to the transmitted SRS resource may refer to spatial relation information configured in the SRS resource or associated CSI-RS information configured in the SRS resource set including the SRS resource. When the spatial relation information is configured in the SRS resource, the spatial domain transmission filter may be determined without following the spatial relation information. Here, configuration information regarding the spatial relation information may be transmitted via the MAC CE signaling for activating the semi-persistent SRS transmission, and the spatial domain transmission filter may be determined by referring to the spatial relation information. The UE may transmit the SRS resource in an uplink BWP activated regarding the semi-persistent SRS resource activated via the higher layer signaling.

For example, the base station may trigger aperiodic SRS transmission in the UE via DCI. The base station may indicate one of aperiodic SRS resource triggers (aperiodicSRS-ResourceTrigger) via an SRS request field of the DCI. The UE may interpret that an SRS resource set including an aperiodic SRS resource trigger indicated by the DCI has been triggered in an aperiodic SRS resource trigger list among configuration information of the SRS resource set. The UE may transmit an SRS resource referred to by the triggered SRS resource set. A time-frequency axis resource mapping in a slot of the transmitted SRS resource may follow resource mapping information configured in the SRS resource. Also, slot mapping of the transmitted SRS resource may be determined through a slot offset between the SRS resource and a PDCCH including the DCI, and the slot offset may refer to a value (or values) included in a slot offset set configured in the SRS resource set.

In detail, the slot offset between the SRS resource and the PDCCH including the DCI may apply a value indicated by a time domain resource assignment field of the DCI among an offset value (or offset values) included in the slot offset set configured in the SRS resource set. Also, a spatial domain transmission filter applied to the transmitted SRS resource may refer to spatial relation information configured in the SRS resource or associated CSI-RS information configured in the SRS resource set including the SRS resource. The UE may transmit the SRS resource in an uplink BWP activated regarding the aperiodic SRS resource triggered via the DCI.

When the base station triggers aperiodic SRS transmission in the UE via DCI, a minimum time interval between a PDCCH including the DCI triggering the aperiodic SRS transmission and a transmitted SRS may be required for the UE transmit the SRS by applying configuration information regarding the SRS resource. A time interval for SRS transmission of the UE may be defined by the number of symbols between a last symbol of the PDCCH including the DCI triggering the aperiodic SRS transmission and a first symbol to which an SRS resource transmitted first from among transmitted SRS resource(s) is mapped. The minimum time interval may be determined by referring to a PUSCH preparation procedure time required for the UE to prepare for PUSCH transmission.

Also, the minimum time interval may have different values according to the use of an SRS resource set including the transmitted SRS resource. For example, the minimum time interval may refer to the PUSCH preparation procedure time of the UE and may be determined to be N2 symbols defined in consideration of UE processing capability according to capability of the UE. Also, when the SRS resource set is configured to be used for codebook or antennaSwitching, considering the use of the SRS resource set including the transmitted SRS resource, the minimum time interval may be determined to be N2 symbols, and when the SRS resource set is configured to be used for nonCodebook or beamManagement, the minimum time interval may be determined to be N2+14 symbols. When the time interval for aperiodic SRS transmission is equal to or greater than the minimum time interval, the UE may transmit aperiodic SRS, and when the time interval for aperiodic SRS transmission is smaller than the minimum time interval, the UE may ignore the DCI triggering the aperiodic SRS.

TABLE 16-1

| SRS-Resource ::= | SEQUENCE { |
|---|---|
| srs-ResourceId | SRS-ResourceId, |
| nrofSRS-Ports | ENUMERATED {port1, ports2, ports4}, |

TABLE 16-1-continued

| ptrs-PortIndex | ENUMERATED {n0, n1 } OPTIONAL,    -- Need R |
|---|---|
| transmissionComb | CHOICE { |
| n2 | SEQUENCE { |
| combOffset-n2 | INTEGER (0..1), |
| cyclicShift-n2 | INTEGER (0..7) |
| }, | |
| n4 | SEQUENCE { |
| combOffset-n4 | INTEGER (0..3), |
| cyclicShift-n4 | INTEGER (0..11) |
| } | |
| }, | |
| resourceMapping | SEQUENCE { |
| startPosition | INTEGER (0..5), |
| nrofSymbols | ENUMERATED {n1, n2, n4}, |
| repetitionFactor | ENUMERATED {n1, n2, n4} |
| }, | |
| freqDomainPosition | INTEGER (0..67), |
| freqDomainShift | INTEGER (0..268), |
| freqHopping | SEQUENCE { |
| c-SRS | INTEGER (0..63), |
| b-SRS | INTEGER (0..3), |
| b-hop | INTEGER (0..3) |
| }, | |
| groupOrSequenceHopping | ENUMERATED {neither, groupHopping, sequenceHopping }, |
| resourceType | CHOICE { |
| aperiodic | SEQUENCE { |
| ... | |
| }, | |
| semi-persistent | SEQUENCE { |
| periodicityAndOffset-sp | SRS-PeriodicityAndOffset, |
| ... | |
| }, | |
| periodic | SEQUENCE { |
| periodicityAndOffset-p | SRS-PeriodicityAndOffset, |
| ... | |
| } | |
| }, | |
| sequenceId | INTEGER (0..1023), |
| spatialRelationInfo | SRS-SpatialRelationInfo OPTIONAL,    -- Need R |
| ... | |
| } | | spatialRelationInfo configuration information in Table 16-1 above may apply, by referring to one reference signal, beam information of the reference signal to a beam used for SRS transmission. For example, a spatialRelationInfo configuration may include information as in Table 16-2 below.

TABLE 16-2

| SRS-SpatialRelationInfo ::= | SEQUENCE { |
|---|---|
| servingCellId | ServCellIndex |
| OPTIONAL,    -- Need S | |
| referenceSignal | CHOICE { |
| ssb-Index | SSB-Index, |
| csi-RS-Index | NZP-CSI-RS-ResourceId, |
| srs | SEQUENCE { |
| resourceId | SRS-ResourceId, |
| uplinkBWP | BWP-Id |
| } | |
| } | |
| } | |

Referring to the spatialRelationInfo configuration, an SS/PBCH block index, a CSI-RS index, or an SRS index may be configured as an index of a reference signal to be referred to, so as to use beam information of a specific reference signal. Higher signaling referenceSignal is configuration information indicating beam information of which reference signal is to be referred to for SRS transmission, and ssb-Index denotes an index of a SS/PBCH block, csi-RS-Index denotes an index of CSI-RS, and srs denotes an index of SRS. When a value of the higher signaling referenceSignal is configured to be ssb-Index, the UE may apply a reception beam used when an SS/PBCH block corresponding to the ssb-Index is received, as a transmission beam of the SRS transmission. When the value of the higher signaling referenceSignal is configured to be csi-RS-Index, the UE may apply a reception beam used when CSI-RS corresponding to the csi-RS-Index is received, as a transmission beam of the SRS transmission. When the value of the higher signaling referenceSignal is configured to be srs, the UE may apply a reception beam used when SRS corresponding to the srs is received, as a transmission beam of the SRS transmission.

[PUSCH: Regarding Transmission Scheme]

Next, a scheduling scheme of PUSCH transmission will be described. The PUSCH transmission may be dynamically scheduled by UL grant in DCI or may operate by configured grant Type 1 or Type 2. A dynamic scheduling indication regarding the PUSCH transmission is enabled by a DCI format 0_0 or 0_1.

The configured grant Type 1 PUSCH transmission may be quasi-statically configured through reception of configuredGrantConfig including rrc-ConfiguredUplinkGrant of Table 16-3 via higher signaling, without receiving the UL grant in the DCI. The configured grant Type 2 PUSCH transmission may be semi-persistently scheduled by the UL grant in the DCI after reception of configuredGrantConfig not including rrc-ConfiguredUplinkGrant of Table 16-3, via higher signaling. When the PUSCH transmission operates by configured grant, parameters applied to the PUSCH transmission are applied through configuredGrantConfig that is higher signaling of Table 16-3, except for dataScramblingIdentityPUSCH, txConfig, codebookSubset, maxRank, and scaling of UCI-OnPUSCH provided via pusch-Config of Table 16-4 that is higher signaling. When the UE is provided with transformPrecoder in the configuredGrantConfig that is higher signaling of Table 16-3, the UE applies tp-pi2BPSK in the pusch-Config of Table 16-4 with respect to the PUSCH transmission operating by the configured grant.

TABLE 16-3

| | |
|---|---|
| ConfiguredGrantConfig ::= | SEQUENCE { |
| frequencyHopping | ENUMERATED |
| | {intraSlot, interSlot} |
| OPTIONAL, -- Need S, | |
| cg-DMRS-Configuration | DMRS-UplinkConfig, |
| mcs-Table | ENUMERATED {qam256, |
| qam64LowSE} | OPTIONAL, -- |
| Need S | |
| mcs-TableTransformPrecoder | ENUMERATED {qam256, |
| qam64LowSE} | OPTIONAL, -- |
| Need S | |
| uci-OnPUSCH | SetupRelease { CG-UCI- |
| OnPUSCH } | OPTIONAL, -- |
| Need M | |
| resourceAllocation | ENUMERATED |
| { resourceAllocationType0, resourceAllocationType1, dynamicSwitch }, | |
| rbg-Size | ENUMERATED {config2} |
| OPTIONAL, -- Need S | |
| powerControlLoopToUse | ENUMERATED {n0, n1}, |
| p0-PUSCH-Alpha | P0-PUSCH-AlphaSetId, |
| transformPrecoder | ENUMERATED |
| | {enabled, disabled} |
| OPTIONAL, -- Need S | |
| nrofHARQ-Processes | INTEGER(1..16), |
| repK | ENUMERATED |
| | {n1, n2, n4, n8}, |

TABLE 16-3-continued

| | |
|---|---|
| repK-RV | ENUMERATED {s1-0231, |
| s2-0303, s3-0000} | OPTIONAL, -- Need R |
| periodicity | ENUMERATED { |
| | sym2, sym7, sym1x14, |
| sym2x14, sym4x14, sym5x14, sym8x14, sym10x14, sym16x14, sym20x14, | |
| | sym32x14, sym40x14, |
| sym64x14, sym80x14, sym128x14, sym160x14, sym256x14, sym320x14, sym512x14, | |
| | sym640x14, sym1024x14, |
| sym1280x14, sym2560x14, sym5120x14, | |
| | sym6, sym1x12, sym2x12, |
| sym4x12, sym5x12, sym8x12, sym10x12, sym16x12, sym20x12, sym32x12, | |
| | sym40x12, sym64x12, |
| sym80x12, sym128x12, sym160x12, sym256x12, sym320x12, sym512x12, sym640x12, | |
| | sym1280x12, sym2560x12 |
| }, | |
| configuredGrantTimer | INTEGER (1..64) |
| OPTIONAL, -- Need R | |
| rrc-ConfiguredUplinkGrant | SEQUENCE { |
| timeDomainOffset | INTEGER (0..5119), |
| timeDomainAllocation | INTEGER (0..15), |
| frequencyDomainAllocation | BIT STRING (SIZE(18)), |
| antennaPort | INTEGER (0..31), |
| dmrs-SeqInitialization | INTEGER (0..1) |
| OPTIONAL, -- Need R | |
| precodingAndNumberOfLayers | INTEGER (0..63), |
| srs-ResourceIndicator | INTEGER (0..15) |
| OPTIONAL, -- Need R | |
| mcsAndTBS | INTEGER (0..31), |
| frequencyHoppingOffset | INTEGER (1.. |
| maxNrofPhysicalResourceBlocks-1) | OPTIONAL, -- Need R |
| pathlossReferenceIndex | INTEGER |
| (0..maxNrofPUSCH-PathlossReferenceRSs-1), | |
| ... | |
| } | |
| OPTIONAL, -- Need R | |
| ... | |
| } | |

Next, a PUSCH transmission method will be described. A DMRS antenna port for PUSCH transmission is the same as an antenna port for SRS transmission. The PUSCH transmission may follow a codebook-based transmission method or a non-codebook-based transmission method, depending on whether a value of the pusch-Config of Table 16-4 that is higher signaling is codebook or nonCodebook.

As described above, the PUSCH transmission may be dynamically scheduled via the DCI format 0_0 or 0_1, and may be configured quasi-statically by the configured grant. When scheduling regarding the PUSCH transmission is indicated to the UE via the DCI format 0_0, the UE may perform beam configuration for the PUSCH transmission by using pucch-spatialRelationInfoID corresponding to a UE-specific PUCCH resource corresponding to a minimum ID in an uplink BWP activated in a serving cell, and in this case, the PUSCH transmission is based on a single antenna port. The UE does not expect the scheduling regarding the PUSCH transmission via the DCI format 0_0, in a BWP in which a PUCCH resource including pucch-spatialRelationInfo is not configured. When the UE is not configured with txConfig in the pusch-Config of Table 16-4, the UE does not expect scheduling via the DCI format 0_1.

TABLE 16-4

| | |
|---|---|
| PUSCH-Config ::= | SEQUENCE { |
| dataScramblingIdentityPUSCH | INTEGER (0..1023) |
| OPTIONAL, -- Need S | |
| txConfig | ENUMERATED |
| {codebook, nonCodebook} | OPTIONAL, -- Need S |

TABLE 16-4-continued

```
    dmrs-UplinkForPUSCH-MappingTypeA    SetupRelease { DMRS-
UplinkConfig }                              OPTIONAL,  -- Need M
    dmrs-UplinkForPUSCH-MappingTypeB    SetupRelease { DMRS-
UplinkConfig }                              OPTIONAL,  -- Need M
    pusch-PowerControl                  PUSCH-PowerControl
OPTIONAL,  -- Need M
    frequencyHopping                    ENUMERATED
{intraSlot, interSlot}                      OPTIONAL,  -- Need S
    frequencyHoppingOffsetLists         SEQUENCE (SIZE (1..4)) OF
INTEGER (1.. maxNrofPhysicalResourceBlocks-1)
OPTIONAL,  -- Need M
    resourceAllocation                  ENUMERATED
{ resourceAllocationType0, resourceAllocationType1, dynamicSwitch},
    pusch-TimeDomainAllocationList      SetupRelease { PUSCH-
TimeDomainResourceAllocationList }          OPTIONAL,  -- Need M
    pusch-AggregationFactor             ENUMERATED { n2, n4, n8 }
OPTIONAL,  -- Need S
    mcs-Table                           ENUMERATED {qam256,
qam64LowSE}                                 OPTIONAL,  -- Need
S
    mcs-TableTransformPrecoder          ENUMERATED {qam256,
qam64LowSE}                                 OPTIONAL,  -- Need
S
    transformPrecoder                   ENUMERATED {enabled,
disabled}                                   OPTIONAL,  -- Need S
    codebookSubset                      ENUMERATED
{fullyAndPartialAndNonCoherent, partialAndNonCoherent,nonCoherent}
OPTIONAL, -- Cond codebookBased
    maxRank                             INTEGER (1..4)
OPTIONAL, -- Cond codebookBased
    rbg-Size                            ENUMERATED { config2}
OPTIONAL, -- Need S
    uci-OnPUSCH                         SetupRelease { UCI-
OnPUSCH}                                    OPTIONAL, -- Need M
    tp-pi2BPSK                          ENUMERATED {enabled}
OPTIONAL, -- Need S
    ...
}
```

Next, codebook-based PUSCH transmission will be described. The codebook-based PUSCH transmission may be dynamically scheduled via the DCI format 0_0 or 0_1, or may quasi-statically operate by the configured grant. When a codebook-based PUSCH is dynamically scheduled by the DCI format 0_1 or quasi-statically configured by the configured grant, the UE determines a precoder for the PUSCH transmission, based on an SRS resource indicator (SRI), a transmission precoding matrix indicator (TPMI), and a transmission rank (the number of PUSCH transmission layers).

Here, the SRI may be provided via a field SRS resource indicator in the DCI or via srs-ResourceIndicator that is higher signaling. The UE is configured with at least one SRS resource, and may be configured up to two SRS resources, during the codebook-based PUSCH transmission. When the UE is provided with the SRI via the DCI, an SRS resource indicated by the SRI denotes an SRS resource corresponding to the SRI, from among SRS resources transmitted before a PDCCH including the SRI. Also, the TPMI and transmission rank may be provided via field precoding information and number of layers in the DCI or may be configured via precodingAndNumberOfLayers that is higher signaling. The TPMI is used to indicate a precoder applied to the PUSCH transmission. When the UE is configured with one SRS resource, the TPMI is used to indicate the precoder to be applied to the one configured SRS resource. When the UE is configured with a plurality of SRS resources, the TPMI is used to indicate the precoder to be applied to the SRS resource indicated via the SRI.

The precoder to be used for the PUSCH transmission is selected from an uplink codebook having the number of antenna ports equal to a value of nrofSRS-Ports in SRS-Config that is higher signaling. In the codebook-based PUSCH transmission, the UE determines a codebook subset, based on the TPMI and the codebookSubset in the pusch-Config that is higher signaling. The codebookSubset in the pusch-Config that is higher signaling may be configured to be one of fullyAndPartialAndNonCoherent, partialAndNonCoherent, and nonCoherent, based on UE capability reported by the UE to the base station. When the UE reported partialAndNonCoherent as the UE capability, the UE does not expect a value of codebookSubset that is higher signaling to be configured to fullyAndPartialAndNonCoherent. Also, when the UE reported nonCoherent as the UE capability, the UE does not expect the value of codebookSubset that is higher signaling to be configured to fullyAndPartialAndNonCoherent or partialAndNonCoherent. When nrofSRS-Ports in SRS-ResourceSet that is higher signaling indicates two SRS antenna ports, the UE does not expect the value of codebookSubset that is higher signaling to be configured to partialAndNonCoherent.

The UE may be configured with one SRS resource set in which a value of usage in SRS-ResourceSet that is higher signaling is configured to codebook, and one SRS resource in the SRS resource set may be indicated via SRI. When several SRS resources are configured in the SRS resource set in which the value of usage in SRS-ResourceSet that is higher signaling is configured to codebook, the UE expects a value of nrofSRS-Ports in SRS-Resource that is higher signaling to be the same for all SRS resources.

The UE transmits, to the base station, one or a plurality of SRS resources included in the SRS resource set in which the value of usage is configured to codebook according to higher signaling, and the base station selects one of the SRS resources transmitted by the UE and instructs the UE to perform the PUSCH transmission, by using transmission beam information of the selected SRS resource. Here, in the codebook-based PUSCH transmission, SRI is used as information for selecting an index of one SRS resource, and is included in the DCI. In addition, the base station includes, to the DCI, information indicating the TPMI and rank to be used by the UE for the PUSCH transmission. The UE performs the PUSCH transmission by applying the precoder indicated by the rank and TPMI indicated based on a transmission beam of the SRS resource, by using the SRS resource indicated by the SRI.

Next, non-codebook-based PUSCH transmission will be described. The non-codebook-based PUSCH transmission may be dynamically scheduled via the DCI format 0_0 or 0_1, or may quasi-statically operate by the configured grant. When at least one SRS resource is configured in the SRS resource set in which a value of usage in SRS-ResourceSet that is higher signaling is configured to nonCodebook, the UE may receive scheduling of the non-codebook-based PUSCH transmission via the DCI format 0_1.

Regarding the SRS resource set in which the value of usage in SRS-ResourceSet that is higher signaling is configured to nonCodebook, the UE may receive configuration of one connected non-zero power (NZP) CSI-RS resource. The UE may perform calculation regarding a precoder for SRS transmission via measurement on the NZP CSI-RS resource connected to the SRS resource set. When a difference between a last reception symbol of an aperiodic NZP CSI-RS resource connected to the SRS resource set and a first symbol of aperiodic SRS transmission is less than 42 symbols, the UE does not expect information regarding the precoder for SRS transmission to be updated.

When a value of resourceType in SRS-ResourceSet that is higher signaling is configured to be aperiodic, the connected NZP CSI-RS is indicated by an SRS request that is a field in the DCI format 0_1 or 1_1. Here, when the connected NZP CSI-RS resource is an aperiodic NZP CSI-RS resource, it is indicated that the connected NZP CSI-RS is present regarding a case where a value of SRS request that is the field in the DCI format 0_1 or 11 is not 00. In this case, corresponding DCI does not indicate cross carrier or cross BWP scheduling. Also, when the value of SRS request indicates the presence of NZP CSI-RS, the NZP CSI-RS is located at a slot on which PDCCH including an SRS request field is transmitted. Here, TCI states configured in a scheduled subcarrier are not configured to be QCL-TypeD.

When a periodic or semi-persistent SRS resource set is configured, the connected NZP CSI-RS may be indicated via associatedCSI-RS in the SRS-ResourceSet that is higher signaling. Regarding the non-codebook-based transmission, the UE does not expect spatialRelationInfo that is higher signaling for the SRS resource and associatedCSI-RS in SRS-ResourceSet that is higher signaling to be configured together.

When a plurality of SRS resources are configured, the UE may determine the precoder and a transmission rank to be applied to the PUSCH transmission, based on SRI indicated by the base station. Here, the SRI may be indicated via a field SRS resource indicator in the DCI or configured via srs-ResourceIndicator that is higher signaling. Like the codebook-based PUSCH transmission, when the UE receives the SRI via the DCI, the SRS resource indicated by the SRI denotes an SRS resource corresponding to the SRI from among SRS resources transmitted prior to the PDCCH including the SRI. The UE may use one or plurality of SRS resources for SRS transmission, and the maximum number of SRS resources capable of being simultaneously transmitted from a same symbol in one SRS resource set is determined by UE capability reported by the UE to the base station. Here, the SRS resources simultaneously transmitted by the UE occupy a same RB. The UE configures one SRS port for each SRS resource. Only one SRS resource set, in which the value of usage in SRS-ResourceSet that is higher signaling is configured to be nonCodebook, may be configured, and up to 4 SRS resources for the non-codebook-based PUSCH transmission may be configured.

The base station transmits, to the UE, one NZP CSI-RS connected to the SRS resource set. Based on a result of measurement during the reception of NZP CSI-RS, the UE calculates the precoder to be used for transmission of one or plurality of SRS resources in the SRS resource set. The UE applies the calculated precoder when transmitting, to the base station, one or plurality of SRS resources in the SRS resource set, in which the usage is configured to be non-Codebook, and the base station selects one or plurality of SRS resources from among the received one or plurality of SRS resources. Here, in the non-codebook-based PUSCH transmission, the SRI denotes an index capable of representing one SRS resource or a combination of a plurality of SRS resources, and the SRI is included in the DCI. At this time, the number of SRS resources indicated by the SRI transmitted by the base station may be the number of transmission layers of the PUSCH, and the UE transmits the PUSCH by applying, to each layer, the precoder applied for the SRS resource transmission.

[PUSCH: Preparation Procedure Time]

Next, a PUSCH preparation procedure time will be described. When the base station schedules the UE to transmit the PUSCH by using the DCI format 0_0 or DCI format 0_1, the UE may require the PUSCH preparation procedure time for transmitting the PUSCH by applying a transmission method (a transmission precoding method of an SRS resource, the number of transmission layers, and a spatial domain transmission filter) indicated via the DCI. In NR, the PUSCH preparation procedure time is defined in consideration of the same. The PUSCH preparation procedure time of the UE may follow Equation 3 below.

$$T_{proc,2}=\max((N_2+d_{2,1}+d_2)(2048+144)\kappa 2^{-\mu}T_c+T_{ext}+T_{switch},d_{2,2}).$$ [Equation 3]

Each variable in $T_{proc,2}$ may have a meaning below:

$N_2$: The number of symbols determined according to numerology $\mu$ and UE processing capability 1 or 2 according to capability of the UE. $N_2$ may have a value of Table 16-5 when UE processing capability 1 is reported according to a capability report of the UE, and may have a value of Table 16-6 when UE processing capability 2 is reported and availability of the UE processing capability 2 is configured via higher layer signaling.

TABLE 16-5

| $\mu$ | PUSCH preparation time $N_2$ [symbols] |
|---|---|
| 0 | 10 |
| 1 | 12 |
| 2 | 23 |
| 3 | 36 |

TABLE 16-6

| $\mu$ | PUSCH preparation time $N_2$ [symbols] |
|---|---|
| 0 | 5 |
| 1 | 5.5 |
| 2 | 11 for frequency range 1 |

$d_{2,1}$: The number of symbols determined to be 0 when resource elements of a first OFDM symbol of PUSCH transmission are all DM-RS, and to be 1 otherwise;

k: 64;

$\mu$: One of $\mu_{DL}$ and $\mu_{UL}$, which increases $T_{proc,2}$, is used. $\mu_{DL}$ denotes numerology of a downlink on which a PDCCH including DCI for scheduling the PUSCH is transmitted, and $\mu_{UL}$ denotes numerology of an uplink on which the PUSCH is transmitted;

$T_c$: $1/(\Delta f_{max} \cdot N_f)$, $\Delta f_{max}=480 \cdot 10^3$ Hz, $N_f$=4096;

$d_{2,2}$: Follows a BWP switching time when the DCI for scheduling the PUSCH indicates BWP switching, and is 0 otherwise;

$d_2$: When a PUSCH having a high priority index with a PUCCH and an OFDM symbol of a PUCCH having a low priority index overlap on time, a value of $d_2$ of the PUSCH having the high priority index is used. Otherwise, $d_2$ is 0;

$T_{ext}$: When the UE uses a shared spectrum channel access scheme, the UE calculates $T_{ext}$ to apply the same to PUSCH preparation procedure time. Other words, $T_{ext}$ is assumed to be 0; and $T_{switch}$: When an uplink switching interval is triggered, $T_{switch}$ is assumed to be a switching interval time. Otherwise, $T_{switch}$ is assumed to be 0;

The base station and the UE determine that the PUSCH preparation procedure time is not sufficient when a first symbol of the PUSCH starts before a first uplink symbol where CP starts after $T_{proc,2}$ from a last symbol of the PDCCH including the DCI for scheduling the PUSCH, considering time axis resource mapping information of the PUSCH scheduled via the DCI and a timing advance (TA) effect between the uplink and the downlink. Otherwise, the base station and the UE determine that the PUSCH preparation procedure time is sufficient. When the PUSCH preparation procedure time is sufficient, the UE transmits the PUSCH, and when the PUSCH preparation procedure time is not sufficient, the UE may ignore the DCI for scheduling the PUSCH.

Next, a PUSCH repetitive transmission will be described. When the PUSCH transmission has been scheduled to the UE by the DCI format 0_1 in the PDCCH including a CRC scrambled with C-RNTI, MCS-C-RNTI, or CS-RNTI, and the UE is configured with higher layer signaling pusch-AggregationFactor, same symbol assignment is applied to the number of consecutive slots equal to pusch-AggregationFactor, and the PUSCH transmission is limited to single rank transmission. For example, the UE needs to repeat a same TB on the number of consecutive slots equal to pusch-AggregationFactor, and apply the same slot assignment for each slot. Table 16-7 indicates a redundancy version applied to PUSCH repetitive transmission for each slot. When the PUSCH repetitive transmission is scheduled to the UE by the DCI format 0_1 for a plurality of slots, and at least one symbol from among the slots on which the PUSCH repetitive transmission is performed is indicated as a downlink symbol according to information of higher layer signaling tdd-UL-DL-ConfigurationCommon or tdd-UL-DL-ConfigurationDedicated, the UE does not perform the PUSCH transmission on a slot where the corresponding symbol is located.

TABLE 16-7

| $rv_{id}$ indicated by the DCI scheduling the PUSCH | $rv_{id}$ to be applied to $n^{th}$ transmission occasion | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

[PUSCH: Regarding Repetitive Transmission]

Hereinafter, repetitive transmission of an uplink data channel in a 5G system will be described in detail. The 5G system supports, as a repetitive transmission method of the uplink data channel, two types, i.e., a PUSCH repetitive transmission type A and a PUSCH repetitive transmission type B. The UE may be configured with one of the PUSCH repetitive transmission type A and B via higher layer signaling.

PUSCH Repetitive Transmission Type A

As described above, a location of a start symbol and a symbol length of an uplink data channel may be determined via a time domain resource assignment method in one slot, and the base station may notify the UE about the number of repetitive transmissions via higher layer signaling (for example, RRC signaling) or L1 signaling (for example, DCI).

Based on the number of repetitive transmissions received from the base station, the UE may repetitively transmit, on consecutive slots, the uplink data channel having a start symbol and length identical to a start symbol and length of the configured uplink data channel. Here, when a slot configured to be downlink by the base station to the UE or at least one symbol among symbols of the uplink data channel configured to the UE is set to be downlink, the UE omits uplink data channel transmission but counts the number of repetitive transmissions of the uplink data channel.

PUSCH Repetitive Transmission Type B

As described above, the start symbol and length of the uplink data channel may be determined via the time domain resource assignment method in one slot, and the base station may notify the UE about the number of repetitive transmissions numberofrepetitions via higher signaling (for example, RRC signaling) or L1 signaling (for example, DCI).

First, based on the start symbol and length of the configured uplink data channel, nominal repetition of the uplink data channel is determined as below. A slot on which n-th nominal repetition starts is provided by $$K_s + \left\lfloor \frac{S + n \cdot L}{N_{symb}^{slot}} \right\rfloor$$

and a symbol starting from the slot is provided by mod(S+ n·L, $N_{symb}^{slot}$. A slot on which the n-th nominal repetition ends is provided by $$K_s + \left\lfloor \frac{S + (n+1) \cdot L - 1}{N_{symb}^{slot}} \right\rfloor$$

and a symbol ending at the slot is provided by mod(S+(n+ 1)·L−1,$N_{symb}^{slot}$). Here, n is 0 to numberofrepetitions−1, S denotes the start symbol of the configured uplink data channel and L denotes the symbol length of the configured uplink data channel. $K_s$ denotes a slot on which PUSCH transmission starts, and $N_{symb}^{slot}$ denotes the number of symbols per slot.

The UE determines an invalid symbol for the PUSCH repetitive transmission type B. The symbol configured to be downlink by tdd-UL-DL-ConfigurationCommon or tdd-UL-DL-ConfigurationDedicated is determined to be the invalid symbol for the PUSCH repetitive transmission type B. In addition, the invalid symbol may be configured by a higher layer parameter (for example, InvalidSymbolPattern). The higher layer parameter (for example, InvalidSymbolPattern) may provide a symbol level bitmap over one slot or two slots to configure the invalid symbol. In the bitmap, 1 denotes the invalid symbol.

In addition, a cycle and pattern of the bitmap may be configured via a higher layer parameter (for example, periodicityAndPattern). When the higher layer parameter (for example, InvalidSymbolPattern) is configured and an InvalidSymbolPatternIndicator-ForDCIFormat0_1 or InvalidSymbolPatternIndicator-ForDCIFormat0_2 parameter indicates 1, the UE applies an invalid symbol pattern. When the parameter indicates 0, the UE does not apply the invalid symbol pattern. When the higher layer parameter (for example, InvalidSymbolPattern) is configured and the InvalidSymbolPatternIndicator-ForDCIFormat0_1 or InvalidSymbolPatternIndicator-ForDCIFormat0_2 parameter is not configured, the UE applies the invalid symbol pattern.

After the invalid symbol is determined, the UE may consider symbols other than the invalid symbol as valid symbols, for each nominal repetition. When each nominal repetition includes at least one valid symbol, the nominal repetition may include one or more actual repetitions. Here, each actual repetition may include consecutive sets of valid symbols that may be used for the PUSCH repetitive transmission type B in one slot.

Figure 13B:
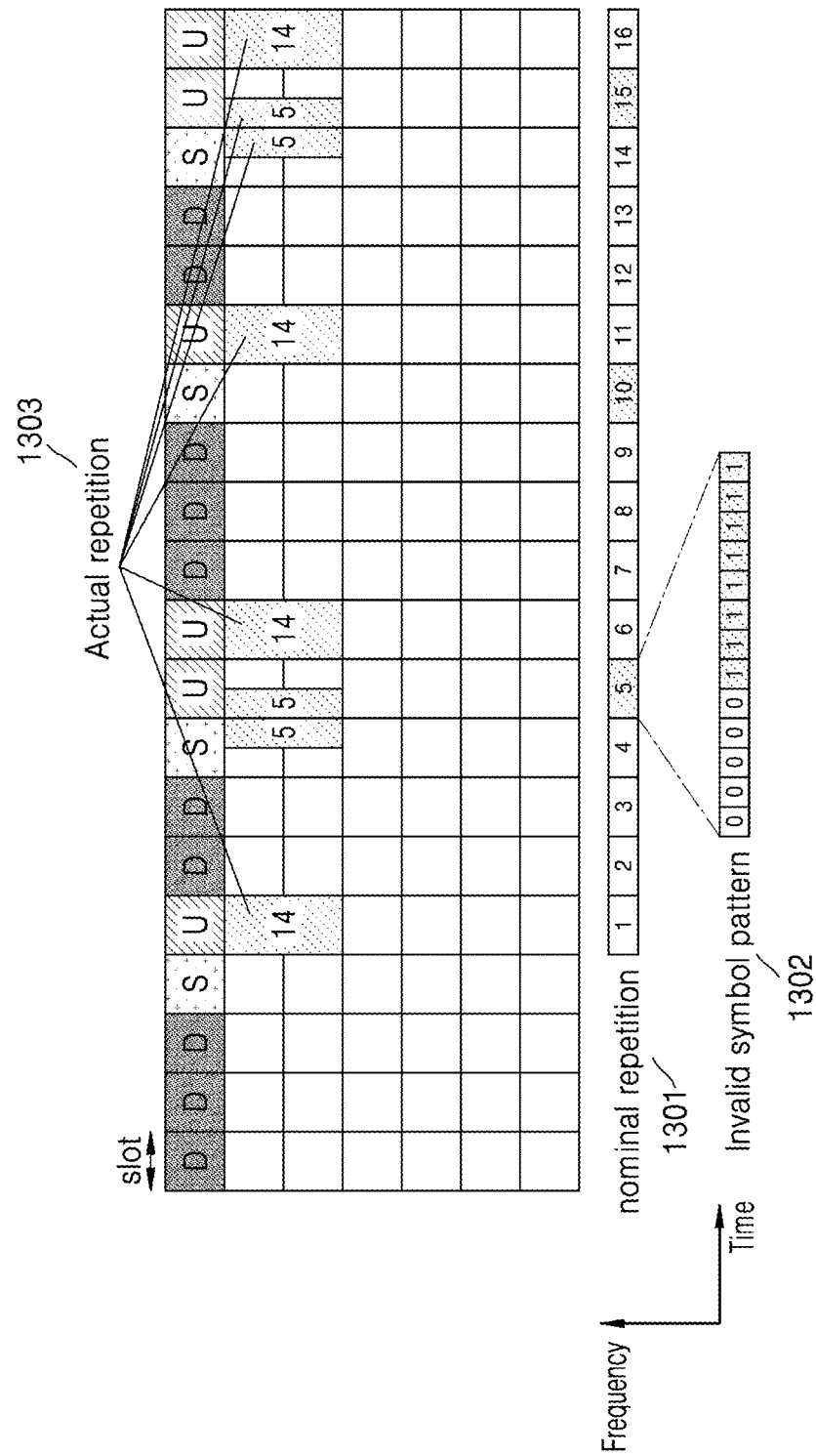
FIG. 13B illustrates an example of a physical uplink shared channel (PUSCH) repetitive transmission type B in a wireless communication system according to an embodiment of the disclosure.

FIG. 13B illustrates an example of the PUSCH repetitive transmission type B in a wireless communication system according to an embodiment of the disclosure. The UE may be configured with 0 for a start symbol S of the uplink data channel and 14 for a length L of the uplink data channel, and configured with 16 for the number of repetitive transmissions. In this case, a nominal repetition 1301 is indicated in 16 consecutive slots. Then, the UE may determine, as the invalid symbol, a symbol configured to be a downlink symbol in each nominal repetition 1301. Also, the UE determines, as the invalid symbols, symbols configured to be 1 in an invalid symbol pattern 1302. When valid symbols, rather than the invalid symbols, are configured to be one or more consecutive symbols in one slot in each nominal repetition 1301, the valid symbols are transmitted via actual repetition 1303.

Also, regarding the PUSCH repetitive transmission, NR Release 16 may define following additional methods for configured grant-based PUSCH transmission and UL grant-based PUSCH transmission exceeding a slot boundary.

In one embodiment of Method 1 (mini-slot level repetition), at least two PUSCH repetitive transmissions in one slot or exceeding a boundary of consecutive slots are scheduled via one UL grant. Also, regarding Method 1, the time domain resource assignment information in the DCI indicates a resource of first repetitive transmission. Time domain resource information of the remaining repetitive transmissions may be determined according to time domain resource information of the first repetitive transmission and an uplink or downlink direction determined for each symbol of each slot. Each repetitive transmission occupies consecutive symbols.

In one embodiment of Method 2 (multi-segment transmission), at least two PUSCH repetitive transmissions in consecutive slots are scheduled via one UL grant. Here, one transmission is assigned for each slot, and starting points or repeated lengths may be different for each transmission. In Method 2, the time domain resource assignment information in the DCI indicates the starting points and repeated lengths of all repetitive transmissions. Also, in a case where the repetitive transmission is performed in a single slot via Method 2, when there are several sets of consecutive uplink symbols in the slot, each repetitive transmission is performed for each set of uplink symbols. When there is only one set of consecutive uplink symbols in the slot, one PUSCH repetitive transmission is performed according to a method of NR Release 15.

In one embodiment of Method 3, at least two PUSCH repetitive transmissions in consecutive slots are scheduled via at least two UL grants. Here, one transmission is assigned for each slot, and an n-th UL grant may be received before PUSCH transmission scheduled by an n−1-th UL grant is over.

In one embodiment of Method 4, one or more PUSCH repetitive transmissions in a single slot or two or more PUSCH repetitive transmissions over a boundary of consecutive slots may be supported via one UL grant or one configured grant. The number of repetitions indicated by the base station to the UE is only a nominal value, and the number of PUSCH repetitive transmissions actually performed by the UE may be greater than the nominal number of repetitions. The time domain resource assignment information in the DCI or configured grant denotes a resource of a first repetitive transmission indicated by the base station.

The time domain resource information of the remaining repetitive transmissions may be determined by referring to resource information of the first repetitive transmission and an uplink or downlink direction of symbols. When the time domain resource information of the repetitive transmission indicated by the base station spans a slot boundary or includes an uplink/downlink switching point, the repetitive transmission may be divided into a plurality of repetitive transmissions. Here, one repetitive transmission may be included for each uplink period in one slot.

[PUSCH: Frequency Hopping Process]

Hereinafter, frequency hopping of the uplink data channel (PUSCH) in the 5G system will be described in detail.

In 5G, two methods are supported for each PUSCH repetitive transmission type, as a frequency hopping method of the uplink data channel. First, in the PUSCH repetitive transmission type A, intra-slot frequency hopping and inter-slot frequency hopping are supported, and in the PUSCH repetitive transmission type B, inter-repetition frequency hopping and inter-slot frequency hopping are supported.

An intra-slot frequency hopping method supported in the PUSCH repetitive transmission type A is a method of transmitting an assigned resource of a frequency domain by changing the resource by a configured frequency offset in two hops in one slot. A starting RB of each hop in the intra-slot frequency hopping may be indicated by Equation 4.

$$RB_{start} = \begin{cases} RB_{start} & i = 0 \\ (RB_{start} + RB_{offset}) \bmod N_{BWP}^{size} & i = 1 \end{cases} \quad \text{[Equation 4]}$$

In Equation 4, i=0 and i=1 respectively indicate a first hop and a second hop, and $RB_{start}$ indicates a starting RB in a UL BWP and is calculated from a frequency resource assignment method. $RB_{offset}$ denotes a frequency offset between two hops via a higher layer parameter. The number of symbols of the first hop may be indicated by $\lfloor N_{symb}^{PUSCH,s}/2 \rfloor$, and the number of symbols of the second hop may be indicated by $N_{symb}^{PUSCH,s} - \lfloor N_{symb}^{PUSCH,s}/2 \rfloor$. $\lfloor N_{symb}^{PUSCH,s}$ denotes a length of PUSCH transmission in one slot, and is indicated by the number of OFDM symbols.

Next, an inter-slot frequency hopping method supported in the PUSCH repetitive transmission types A and B is a method of transmitting an assigned resource of a frequency domain by changing the resource by a configured frequency offset for each slot. In the inter-slot frequency hopping, a starting RB during a $n_s^\mu$ slot may be indicated by Equation 5.

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases} \quad \text{[Equation 5]}$$

In Equation 5, $n_s^\mu$ denotes a current slot number regarding the multi-slot PUSCH transmission, and $RB_{start}$ denotes a starting RB in a UL BWP and is calculated from a frequency resource assignment method. $RB_{offset}$ denotes a frequency offset between two hops via a higher layer parameter.

Next, an inter-repetition frequency hopping method supported by the PUSCH repetitive transmission type B is a method of transmitting a resource assigned on a frequency domain regarding one or a plurality of actual repetitions in each nominal repetition by moving the resource by a configured frequency offset. $RB_{start}(n)$ that is an index of a starting RB on a frequency domain regarding the one or plurality of actual repetitions in an n-th nominal repetition may follow Equation 6 below.

$$RB_{start}(n) = \begin{cases} RB_{start} & n\bmod 2 = 0 \\ (RB_{start} + RB_{offset})\bmod N_{BWP}^{size} & n\bmod 2 = 1 \end{cases} \quad \text{[Equation 6]}$$

In Equation 6, n denotes an index of the nominal repetition, and $RB_{offset}$ denotes an RB offset between two hops via a higher layer parameter.

[Regarding UL PTRS]

When phaseTrackingRS that is a higher layer parameter for a phase tracking reference signal (PTRS) is configured on a higher layer parameter DMRS-UplinkConfig and a PUSCH is transmitted to the base station, the UE may transmit the PTRS for tracking a phase regarding an uplink channel. A procedure by which the UE transmits a UL PTRS is determined based on whether transform precoding is performed during PUSCH transmission. When the transform precoding is performed and a transformPrecoderEnabled field is configured in a higher layer parameter PTRS-UplinkConfig, sampleDensity in the transformPrecoderEnabled field indicates a sample density threshold indicated by $N_{RB0}$ to $N_{RB4}$ in a table below, and the UE may determine a PT-RS group pattern for a resource $N_{RB}$ scheduled according to Table 17 below. In addition, when a transform precoder is applied to the PUSCH transmission, the number of bits in a PTRS-DMRS association field for indicating an association between PTRS and DMRS is 0 in DCI format 0_1 or 0_2.

TABLE 17

| Scheduled bandwidth | Number of PT-RS groups | Number of samples per PT-RS group |
|---|---|---|
| $N_{RB0} \leq N_{RB} < N_{RB1}$ | 2 | 2 |
| $N_{RB1} \leq N_{RB} < N_{RB2}$ | 2 | 4 |
| $N_{RB2} \leq N_{RB} < N_{RB3}$ | 4 | 2 |
| $N_{RB3} \leq N_{RB} < N_{RB4}$ | 4 | 4 |
| $N_{RB4} \leq N_{RB}$ | 8 | 4 |

When the transform precoding is not applied to the PUSCH transmission and phaseTrackingRS that is a higher layer parameter is configured, the UE indicates $N_{RB0}$ to $N_{RB1}$ as frequencyDensity in a transformPrecoderDisabled field in the higher layer parameter PTRS-UplinkConfig, and indicates ptrs-$MCS_1$ to ptrs-$MCS_3$ as timeDensity. Then, the UE may determine PT-RS density ($L_{PT-RS}$) of a time domain and PT-RS density ($K_{PT-RS}$) of a frequency domain according to Tables 18-1 and 18-2, respectively, according to MCS ($I_{MCS}$) and RB ($N_{RB}$) of the scheduled PUSCH. In Table 18-1, although ptrs-$MCS_4$ is not explicitly stated as a higher layer parameter, but the base station and the UE are aware that ptrs-$MCS_4$ is 29 or 28 according to a configured MCS table.

TABLE 18-1

| Scheduled MCS | Time density ($L_{PT-RS}$) |
|---|---|
| $I_{MCS} <$ ptrs-$MCS_1$ | PT-RS is not present |
| ptrs-$MCS_1 \leq I_{MCS} <$ ptrs-$MCS_2$ | 4 |
| ptrs-$MCS_2 \leq I_{MCS} <$ ptrs-$MCS_3$ | 2 |
| ptrs-$MCS_3 \leq I_{MCS} <$ ptrs-$MCS_4$ | 1 |

TABLE 18-2

| Scheduled bandwidth | Frequency density ($K_{PT-RS}$) |
|---|---|
| $N_{RB} < N_{RB0}$ | PT-RS is not present |
| $N_{RB0} \leq NRB < N_{RB1}$ | 2 |
| $N_{RB1} < N_{RB}$ | 4 |

When the transform precoder is not applied to the PUSCH transmission and PTRS-UplinkConfig is configured, the base station indicates the UE of the PTRS-DMRS association field of 2 bits so as to indicate the association between the PTRS and DMRS in the DCI format 0_1 or 0_2. The indicated PTRS-DMRS association field of 2 bits is applied to Table 19-1 or 19-2 below according to the maximum number of ports of PTRS configured by maxNrofPorts in the higher layer parameter PTRS-UplinkConfig. When the maximum number of PTRS ports is 1, the UE determines the association between the PTRS and DMRS by Table 19-1 and the 2 bits indicated as the PTRS-DMRS association field, and transmits the PTRS accordingly. When the maximum number of PTRS ports is 2, the UE determines the association between the PTRS and DMRS by Table 19-2 and the 2 bits indicated as the PTRS-DMRS association field, and transmits the PTRS accordingly.

TABLE 19-1

| Value | DMRS port |
|---|---|
| 0 | $1^{st}$ scheduled DMRS port |
| 1 | $2^{nd}$ scheduled DMRS port |
| 2 | $3^{rd}$ scheduled DMRS port |
| 3 | $4^{th}$ scheduled DMRS port |

TABLE 19-2

| Value of MSB | DMRS port | Value of LSB | DMRS port |
|---|---|---|---|
| 0 | $1^{st}$ DMRS port which shares PTRS port 0 | 0 | $1^{st}$ DMRS port which shares PTRS port 1 |
| 1 | $2^{nd}$ DMRS port which shares PTRS port 0 | 1 | $2^{nd}$ DMRS port which shares PTRS port 1 |

A DMRS port of Tables 19-1 and 19-2 is determined by a table determined by higher layer parameter configuration and Antenna ports field indicated by same DCI indicating PTRS-DMRS association. When the transform precoder is not configured via higher configuration of the PUSCH, dmrs-Type is configured to 1 and maxLength is configured to 2 for the DMRS, and a rank of PUSCH is configured to 2, the UE may determine the DMRS port via a bit indicated by the Antenna ports field and a table regarding Antenna port(s) as Table 20 below. Table 20 is an example of the Antenna port table being referred to during the PUSCH configuration described above, and when the PUSCH has been configured by another parameter, the DMRS port is determined according to a bit of the Antenna ports field indicated by the DCI and the Antenna port table according to the configuration.

TABLE 20

| Value | Number of DMRS CDM group(s) without data | DMRS port(s) | Number of front-load symbols |
|---|---|---|---|
| 0 | 1 | 0, 1 | 1 |
| 1 | 2 | 0, 1 | 1 |

TABLE 20-continued

| Value | Number of DMRS CDM group(s) without data | DMRS port(s) | Number of front-load symbols |
|---|---|---|---|
| 2 | 2 | 2, 3 | 1 |
| 3 | 2 | 0, 2 | 1 |
| 4 | 2 | 0, 1 | 2 |
| 5 | 2 | 2, 3 | 2 |
| 6 | 2 | 4, 5 | 2 |
| 7 | 2 | 6, 7 | 2 |
| 8 | 2 | 0, 4 | 2 |
| 9 | 2 | 2, 6 | 2 |
| 10-15 | Reserved | Reserved | Reserved |

1st scheduled DMRS to 4th scheduled DMRS of Table 19-1 are defined to be values sequentially mapping DMRS ports indicated by the antenna port table according to the higher layer configuration and the bit of the Antenna ports field of DCI. For example, when the bits of the Antenna ports field of DCI is 0001 and the DMRS ports are determined by referring to Table 20, the scheduled DMRS ports are 0 and 1, wherein the DMRS port 0 may be defined as 1st scheduled DMRS and the DMRS port 1 may be defined as 2nd scheduled DMRS. This may be similarly applied to a DMRS port determined by a bit of another Antenna ports field and an antenna port table according to another higher layer configuration. Among the DMRS ports defined as such, the UE determines one DMRS port to be associated with a PTRS port by referring to a bit indicated by the PTRS-DMRS association in the DCI, and transmits the PTRS accordingly.

In Table 19-2, a DMRS port sharing a PTRS port 0 and a DMRS port sharing a PTRS port 1 may be defined according to the codebook-based PUSCH transmission or non-codebook-based PUSCH transmission. When the UE transmits the PUSCH based on a partial-coherent or non-coherent codebook, an uplink layer transmitted by PUSCH antenna ports 1000 and 1002 (antenna port number "1000-1011" are defined in TS 38.211) is associated with the PTRS port 0, and an uplink layer transmitted by PUSCH antenna ports 1001 and 1003 is associated with the PTRS port 1.

In detail, when layer 3: TPMI=2 is selected for the codebook-based PUSCH transmission, a first layer is associated with the PTRS port 0 because the first layer is transmitted by the PUSCH antenna ports 1000 and 1002, a second layer and a third layer are associated with the PTRS port 1 because the second layer is transmitted by the PUSCH antenna port 1001 and the third layer is transmitted by the PUSCH antenna port 1002. The three layers each denote a DMRS port, and the DMRS port regarding the first layer corresponds to 1st DMRS port which shares PTRS port 0 in Table 19-2, the DMRS port regarding the second layer corresponds to 1st DMRS port which shares PTRS port 1 in Table 19-2, and the DMRS port regarding the third layer corresponds to 2nd DMRS port which shares PTRS port 1 in Table 19-2.

Similarly, the DMRS port associated with the PTRS port 0 and the DMRS port associated with the PTRS port 1 may be determined according to TPMI and the different numbers of layers. When the UE transmits the PUSCH based on a non-codebook, the DMRS port associated with the PTRS port 0 and the DMRS port associated with the PTRS port 1 may be distinguished according to antenna ports and SRI indicated by the DCI. In detail, the SRS resource included in the SRS resource set in which the usage is nonCodebook may be configured whether the SRS is associated with the PTRS port 0 or the PTRS port 1 by a higher layer parameter ptrs-PortIndex. The base station indicates the SRS resource for non-codebook-based PUSCH transmission by the SRI. Here, ports of indicated SRS resources are mapped to PUSCH DMRS ports on a one-on-one manner. An association between a PUSCH DMRS port and a PTRS port is determined according to the higher layer parameter ptrs-PortIndex of the SRS resource mapped to the DMRS port.

For example, ptrs-PortIndex is configured to be n0, n0, n1, and n1 respectively for SRS resources 1 to 4 included in the SRS resource set in which the usage is nonCodebook. Also, the PUSCH is indicated to be transmitted through SRS resources 1, 2, and 4 by SRI and DMRS ports 0, 1, and 2 are indicated as Antenna ports field. Ports of the SRS resources 1, 2, and 4 are mapped to the DMRS ports 0, 1, and 2, respectively. Also, the DMRS ports 0 and 1 are associated with the PTRS port 0 and the DMRS port 2 is associated with the PTRS port 1, according to ptrs-PortIndex in the SRS resource.

Accordingly, in Table 19-2, the DMRS port 0 corresponds to 1st DMRS port which shares PTRS port 0, the DMRS port 1 corresponds to 2nd DMRS port which shares PTRS port 0, and the DMRS port 2 corresponds to 1st DMRS port which shares PTRS port 1. Similarly, the DMRS port associated with the PTRS port 0 and the DMRS port associated with the PTRS port 1 may be determined according to different SRI values and a ptrs-PortIndex configuration method in the SRS resources of different patterns. The UE determines the association between the DMRS port and the PTRS port as described above for two PTRS ports. Then, among a plurality of DMRS ports associated with each PTRS port, the UE may determine the DMRS port to be associated with the PTRS port 0 by referring to a most significant bit (MSB) of PTRS-DMRS association, and determine the DMRS port to be associated with the PTRS port 1 by referring to a least significant bit (LSB), to transmit the PTRS.

[Regarding UE Capability Report]

In LTE and NR, the UE may perform a procedure of reporting, to the base station, capability supported by the UE while being connected to a serving base station. Hereinafter, such a procedure will be referred to as a UE capability report.

The base station may transmit, to the UE in a connected state, a UE capability enquiry message requesting a capability report. The UE capability request message may include a UE capability request for each radio access technology (RAT) type of the base station. The UE capability request for each RAT type may include supported frequency band combination information or the like. Also, regarding the UE capability enquiry message, a plurality of UE capabilities for each RAT type may be requested via one RRC message container transmitted by the base station, or the base station may transmit, to the UE, the UE capability enquiry message including the UE capability request for each RAT type a plurality of times.

In other words, the UE capability enquiry may be repeated a plurality of times in one message, and the UE may configure a corresponding UE capability information message and report the same a plurality of times. In a next-generation mobile communication system, the UE capability may be requested for multi-RAT dual connectivity (MR-DC) as well as NR, LTE, and E-UTRA-NR dual connectivity (EN-DC). The UE capability enquiry message is generally transmitted at an initial stage after the UE is connected to the base station, but may be requested in any condition upon necessity by the base station.

Here, upon receiving a UE capability report request from the base station, the UE configures UE capability according to band information and RAT type requested by the base station. A method by which the UE configures the UE capability in an NR system will now be described.

In one embodiment, when the UE receives, from the base station, a list of LTE and/or NR bands as the UE capability request, the UE configures a band combination (BC) regarding EN-DC and NR stand-alone (SA). In other words, the UE configures a candidate list of BCs regarding the EN-DC and NR SA, based on bands requested from the base station by FreqBandList. Priorities of the bands are in an order stated in FreqBandList.

In one embodiment, when the base station has requested the UE capability report by setting a "eutra-nr-only" flag or a "eutra" flag, the UE may completely remove candidates regarding NR SA BC from the configured candidate list of BCs. Such an operation may be performed only when an LTE base station (eNB) requests "eutra" capability.

In one embodiment, the UE removes fallback BCs from the configured candidate list of BCs. Here, the fallback BC denotes a BC obtainable by removing a band corresponding to at least one SCell from an arbitrary BC, and this is possible because a BC before removing the band corresponding to the at least one SCell already covers the fallback BC. This operation is also applied to MR-DC, i.e., to LTE bands. The remaining BCs are a final candidate list of BCs.

In one embodiment, the UE selects BCs to be reported by selecting, from the final candidate list of BCs, the BCs according to a requested RAT type. Here, the UE configures supportedBandCombinationList in a determined order. In other words, the UE configures UE capability and BCs to be reported according to an order of pre-set rat-Type. (nr→eutra-nr→eutra). Also, featureSetCombination regarding the configured supportedBandCombinationList is configured, and a list of candidate feature set combinations is configured from the candidate list of BCs from which a list of fallback BCs (including capability of a same or lower level) is removed. The candidate feature set combination includes all feature set combinations regarding NR and EUTRA-NR BCs, and may be obtained from feature set combinations of UE-NR-Capabilities and UE-MRDC-Capabilities containers.

In one embodiment, when the requested rat Type is eutra-nr, the featureSetCombinations are included both of the UE-MRDC-Capabilities and UE-NR-Capabilities containers. However, a feature set of NR only includes UE-NR-Capabilities.

After the UE capability is configured, the UE transmits, to the base station, UE capability information message including the UE capability. Based on the UE capability received from the UE, the base station performs, on the UE, appropriate scheduling and transmission/reception management.

[Regarding CA/DC]

Figure 14:
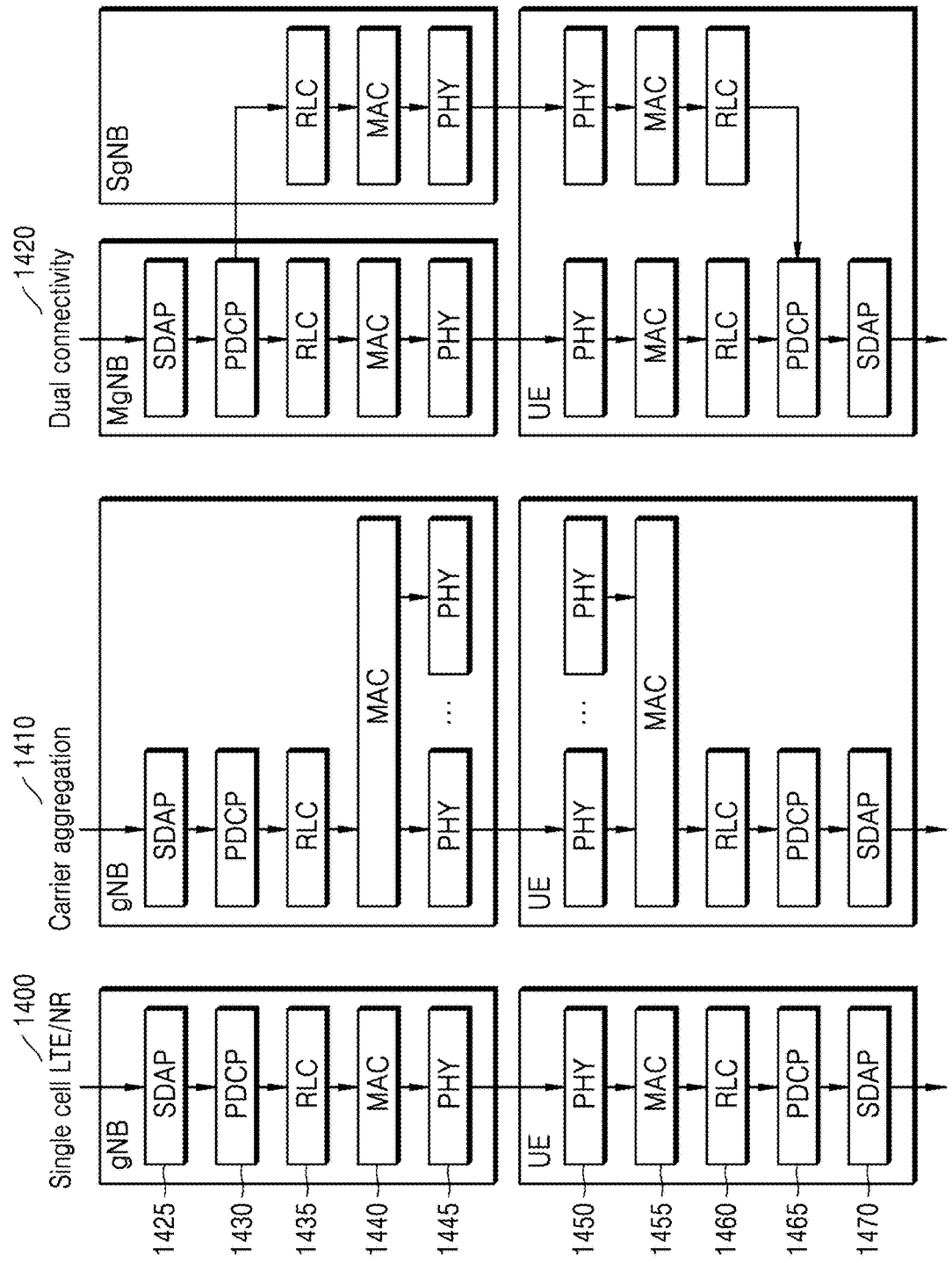
FIG. 14 illustrates a diagram of radio protocol architectures of base stations and UEs in single cell, carrier aggregation (CA), dual connectivity (DC) situations in a wireless communication system according to an embodiment of the disclosure.

FIG. 14 illustrates a diagram of radio protocol architectures of base stations and UEs in single cell, carrier aggregation (CA), dual connectivity (DC) situations in a wireless communication system according to an embodiment of the disclosure.

Referring to FIG. 14, the radio protocol architecture of a next-generation mobile communication system may include NR service data adaptation protocol (SDAP) layers 1425 and 1470, NR packet data convergence protocol (PDCP) layers 1430 and 1465, NR radio link control (RLC) layers 1435 and 1460, and NR media access control (MAC) layers 1440 and 1455, respectively for a UE and an NR base station (gNB).

Main functions of the NR SDAP layers 1425 and 1470 may include some of the following functions:

Transfer of user plane data;
Mapping between a QoS flow and a data radio bearer (DRB) for both DL and UL;
Marking QoS flow ID in both DL and UL packets; and/or
Reflective QoS flow to DRB mapping for the UL SDAP PDUs.

Regarding the NR SDAP layer 1425 or 1470, the UE may be configured with, by an RRC message, whether to use a header of the NR SDAP layer 1425 or 1470 or whether to use a function of the NR SDAP layer 1425 or 1470 for each NR PDCP layer 1430 or 1465, for each bearer, or for each logical channel, and when an SDAP header is configured, an NAS reflective QoS configuration 1-bit indicator and AS reflective QoS configuration 1-bit indicator of the SDAP header may indicate the UE to update or reconfigure mapping information between a QoS flow and a data bearer for UL and DL. The SDAP header may include QoS flow ID indicating QoS. QoS information may be used as data processing priority information, scheduling information, or the like for supporting a smooth service.

Main functions of the NR PDCP layer 1430 or 1465 may include some of the following functions:

Header compression and decompression: ROHC only;
Transfer of user data;
In-sequence delivery of upper layer PDUs;
Out-of-sequence delivery of upper layer PDUs;
PDCP PDU reordering for reception;
Duplicate detection of lower layer SDUs;
Retransmission of PDCP SDUs;
Ciphering and deciphering; and/or
Timer-based SDU discard in uplink.

A reordering function of the NR PDCP layer 1430 or 1465 may denote a function of reordering PDCP PDUs received from a lower layer, based on a PDCP sequence number (SN), and may include a function of delivering data to a higher layer in a reordered order. Alternatively, the reordering function of the NR PDCP layer 1430 or 1465 may include a function of immediately delivering the data without considering an order, a function of recording missing PDCP PDUs by reordering the order, a function of reporting a status regarding the missing PDCP PDUs to a transmitter, and a function of requesting to retransmit the missing PDCP PDUs.

The main functions of the NR RLC layer 1435 or 1460 may include at least some of the following functions:

Transfer of upper layer PDUs;
In-sequence delivery of upper layer PDUs;
Out-of-sequence delivery of upper layer PDUs;
Error correction through ARQ;
Concatenation, segmentation and reassembly of RLC SDUs;
Re-segmentation of RLC data PDUs;
Reordering of RLC data PDUs;
Duplicate detection;
Protocol error detection;
RLC SDU discard; and/or
RLC re-establishment.

The in-sequence delivery function of the NR RLC layer 1435 or 1460 may denote a function of delivering RLC SDUs received from a lower layer, to a higher layer in order. The in-sequence delivery function of the NR RLC layer 1435 or 1460 may include a function of reassembling RLC SDUs segmented from an RLC SDU and delivering the RLC SDUs when the segmented RLC SDUs are received, a function of reordering received RLC PDUs on an RLC SN or PDCP SN basis, a function of recording missing RLC PDUs by reordering the order, a function of reporting a status of the missing RLC PDUs to a transmitter, and a function of requesting to retransmit the missing RLC PDUs. The in-sequence delivery function of the NR RLC layer 1435 or 1460 may include a function of delivering only RLC SDUs previous to a missing RLC SDU, to a higher layer in order, when the missing RLC SDU exists, or a function of delivering all RLC SDUs received before a timer is started, to a higher layer in order, even when a missing RLC SDU exists, when a certain timer is expired.

Alternatively, the in-sequence delivery of the NR RLC layer 1435 or 1460 may include a function of delivering all RLC SDUs currently received to the higher layer in order, when a certain timer is expired despite of a missing RLC SDU. Further, the RLC PDUs may be processed in order of reception (in order of arrival regardless of sequence numbers) and the RLC PDUs may be delivered to the NR PDCP layer 1430 or 1465 out of order (out-of sequence delivery), and segments to be received or stored in a buffer may be reassembled into a whole RLC PDU and processed, the RLC PDU may be delivered to the NR PDCP layer 1430 or 1465. The NR RLC layer 1435 or 1460 may not have a concatenation function, and the concatenation function may be performed by the NR MAC layer 1440 or 1455 or be replaced with a multiplexing function of the NR MAC layer 1440 or 1455.

The out-of-sequence delivery of the NR RLC layer 1435 or 1460 denotes a function of delivering RLC SDUs received from a lower layer immediately to a higher layer regardless of order, and may include a function of reassembling and delivering segmented and received RLC SDUs when one RLC SDU is segmented into several RLC SDUs, and a function of recording missing RLC PDUs by storing RLC SN or PDCP SN and reordering received RLC PDUs.

The NR MAC layer 1440 or 1455 may be connected to multiple NR RLC layers 1435 or 1460 configured for a single UE, and main functions of the NR MAC layer 1440 or 1455 may include at least some of the following functions:

Mapping between logical channels and transport channels;
Multiplexing/demultiplexing of MAC SDUs;
Scheduling information reporting;
Error correction through HARQ;
Priority handling between logical channels of one UE;
Priority handling between UEs by means of dynamic scheduling;
MBMS identification;
Transport format selection; and/or
Padding.

The PHY layer 1445 or 1450 may channel-code and modulate higher layer data into OFDM symbols and transmit the OFDM symbols through a radio channel, or demodulate OFDM symbols received through a radio channel and channel-decode and deliver the OFDM symbols to a higher layer.

The radio protocol architecture may have various detailed structures depending on a carrier (or cell) operating scheme. For example, when the base station transmits data to the UE, based on a single carrier (or cell), the base station and the UE use a protocol architecture having a single structure per layer, as indicated by a reference numeral 1400. On the other hand, when the base station transmits data to the UE, based on CA using multiple carriers in a single transmission and reception point (TRP), the base station and the UE use a protocol architecture of having a single structure up to an RLC layer but multiplexing a PHY layer via an MAC layer, as indicated by a reference numeral 1410. As another example, when the base station transmits data to the UE, based on DC using multiple carriers in a multiple TRP (e,g, MgNB or SgNB), the base station and the UE use a protocol architecture of having a single structure up to an RLC layer but multiplexing a PHY layer via an MAC layer, as indicated by a reference numeral 1420.

[Regarding NC-JT]

According to an embodiment of the disclosure, non-coherent joint transmission (NC-JT) may be used for the UE to receive a PDSCH from a plurality of TRPs.

Unlike an existing communication system, a 5G wireless communication system may support not only a service requiring a high data rate, but also both a service having a very short transmission latency and a service requiring high connection density. Cooperative communication (coordinated transmission) between cells, TRPs, and/or beams in a wireless communication network including a plurality of cells, TRPs, or beams may satisfy various service requirements by efficiently performing inter-cell, TRP, and/or beam interference control or by increasing strength of a signal received by the UE. Hereinafter, for convenience of description, higher layer/L1 parameters, such as a TCI state and spatial relation information, or cells, transmission points, panels, beams, and/or transmission directions distinguishable by indicators, such as cell ID, TRP ID, and panel ID, may be collectively described as TRPs. Accordingly, for actual application, the TRP may be suitably replaced by one of the above terms.

JT is one of representative transmission technologies for the cooperative communication, and is a technology for increasing the strength or throughput of signal received by the UE, by transmitting the signal to the UE via a plurality of different cells, TRPs, and/or beams. Characteristics of channels between the UE and each cell, TRP, and/or beam may largely vary, and in particular, NC-JT supporting non-coherent precoding between cells, TRPs and/or beams may require individual precoding, MCS, resource assignment, or TCI indication, according to channel characteristics for each link between the UE and cell, TRP, and or beam.

The NC-JT may be applied to at least one of a downlink data channel (PDSCH), a downlink control channel (PDCCH), an uplink data channel (PUSCH), or an uplink control channel (PUCCH). During PDSCH transmission, transmission information, such as precoding, MCS, resource assignment, or TCI, is indicated by DL DCI, and for NC-JT, the transmission information needs to be indicated independently for each cell, TRP, and/or beam. This is a main factor for increasing payload required for DL DCI transmission, and may adversely affect reception performance of a PDCCH transmitting DCI. Accordingly, it is necessary to carefully design tradeoff between DCI amount and control information reception performance for JT support of a PDSCH.

Figure 15:
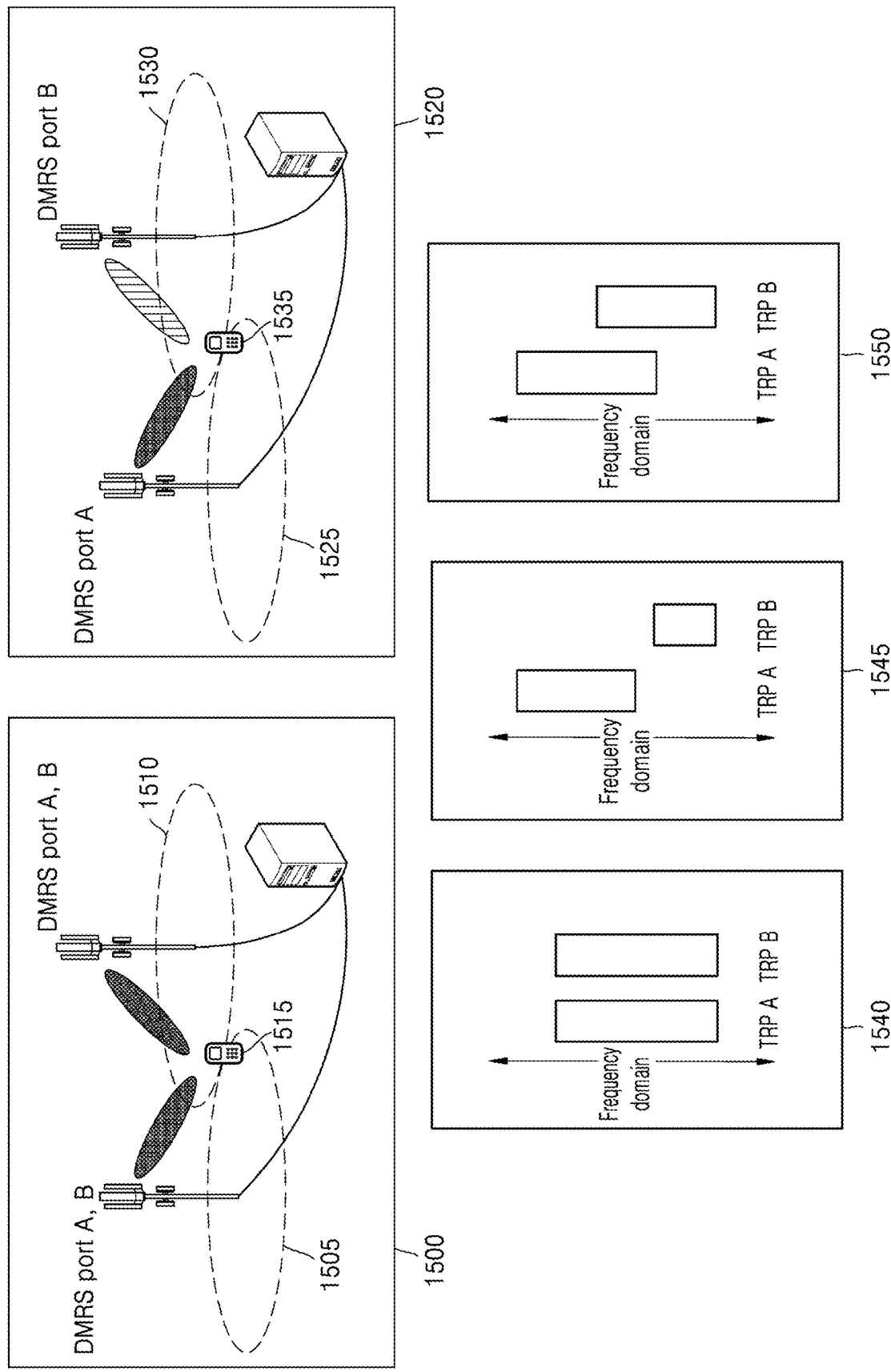
FIG. 15 illustrates a diagram of an example of an antenna port configuration and resource assignment for cooperative communication in a wireless communication system according to an embodiment of the disclosure.

FIG. 15 illustrates a diagram of an example of an antenna port configuration and resource assignment for transmitting a PDSCH by using cooperative communication in a wireless communication system according to an embodiment of the disclosure.

Referring to FIG. 15, examples for PDSCH transmission are described for each technique of JT, and examples for assigning a radio resource for each TRP are illustrated.

In FIG. 15, an example 1500 of coherent-JT (C-JT) supporting coherent precoding between cells, TRPs, and/or beams is illustrated.

In C-JT, single piece of data (PDSCH) is transmitted from a TRP A 1505 and a TRP B 1510 to a UE 1515, and a plurality of TRPs perform joint precoding. This may indicate that a DMRS is transmitted through same DMRS ports for the TRP A 1505 and TRP B 1510 to transmit a same PDSCH. For example, the TRP A 1505 and TRP B 1510 may each transmit the DMRS to the UE 1515 through a DMRS port A and a DMRS port B. In this case, the UE 1515 may receive one piece of DCI for receiving one PDSCH demodulated based on the DMRS transmitted through the DMRS ports A and B.

In FIG. 15, an example 1520 of NC-JT supporting non-coherent precoding between cells, TRPs, and/or beams for PDSCH transmission is illustrated.

In NC-JT, a PDSCH is transmitted to a UE 1535 for each cell, TRP, and/or beam, and individual precoding may be applied to each PDSCH. Each cell, TRP, and/or beam may transmit, to the UE 1535, different PDSCHs or different PDSCH layers to improve throughput relative to single cell, TRP, and/or beam transmission. Also, each cell, TRP, and/or beam may repeatedly transmit the same PDSCH to the UE 1535 to improve reliability relative to the single cell, TRP, and/or beam transmission. For convenience of description, a cell, TRP, and/or beam will be collectively referred to as a TRP below.

Here, various radio resource assignments may be considered for the PDSCH transmission, for example, a case 1540 where frequency and time resources used by a plurality of TRPs are all same, a case 1545 where frequency and time resources used by a plurality of TRPs do not overlap, and a case 1550 where frequency and time resources used by a plurality of TRPs partially overlap.

To support NC-JT, pieces of DCIs of various forms, structures, and relationships may be considered to simultaneously assign a plurality of PDSCHs to one UE.

Figure 16:
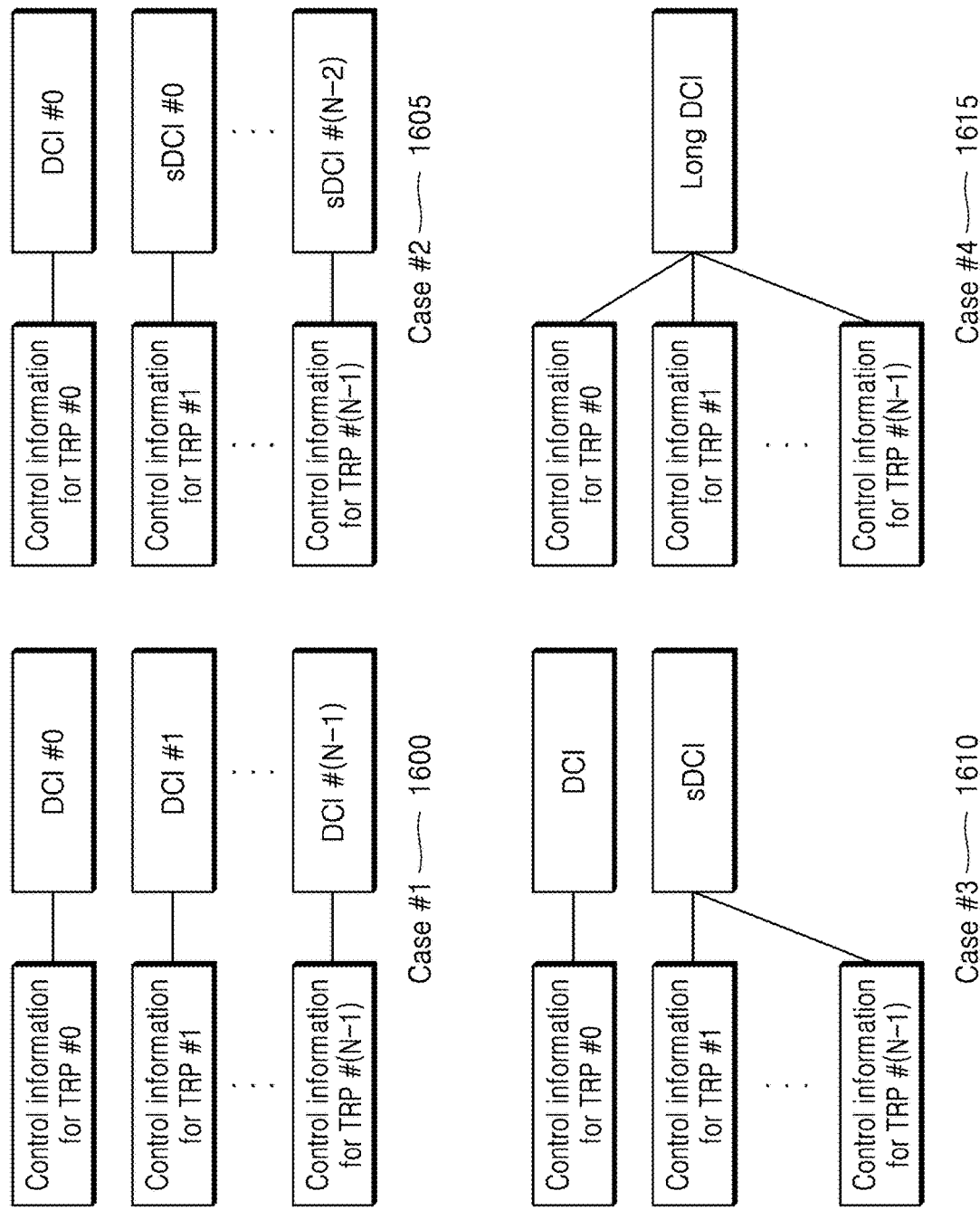
FIG. 16 illustrates a diagram of an example of a configuration of downlink control information (DCI) for cooperative communication in a wireless communication system according to an embodiment of the disclosure.

FIG. 16 illustrates a diagram of an example of a configuration of DCI for NC-JT, in which each TRP transmits, to a UE, different PDSCHs or different PDSCH layers, in a wireless communication system according to an embodiment of the disclosure.

Referring to FIG. 16, a case #1 1600 is an example in which, while different N−1 PDSCHs are transmitted from additional N−1 TRPs (TRP #1 to TRP #N−1) except a serving TRP (TRP #0) used during single PDSCH transmission, control information regarding the PDSCHs transmitted from the additional N−1 TRPs is transmitted independently from control information regarding the PDSCH transmitted from the serving TRP. In other words, the UE may obtain the control information regarding the PDSCHs transmitted from the different TRPs (TRP #0 to TRP #N−1), via independent pieces of DCI (DCI #0 to DCI #N−1. Formats of the independent pieces of DCI may be the same or different from each other, and payloads of the pieces of DCI may be the same or different from each other. In the case #1 1600, each PDSCH control or a degree of freedom of assignment may be fully guaranteed, but reception performance may deteriorate due to an occurrence of coverage difference for each piece of DCI when the pieces of DCI are transmitted from different TRPs.

A case #2 1605 is an example in which, while the different N−1 PDSCHs are transmitted from the additional N−1 TRPs (TRP #1 to TRP #N−1) except the serving TRP (TRP #0) used during the single PDSCH transmission, the pieces of control information (DCI) regarding the PDSCHs transmitted from the additional N−1 TRPs are each transmitted and each piece of DCI is dependent on the control information regarding the PDSCH transmitted from the serving TRP.

For example, the DCI #0 that is the control information regarding the PDSCH transmitted from the serving TRP (TRP #0) includes all information elements of a DCI format 1_0, a DCI format 1_1, and a DCI format 1_2, but shortened DCI (sDCI) (sDCI #0 to sDCI #N−2) that is control information regarding the PDSCHs transmitted from the cooperative TRPs (TRP #1 to TRP #N−1) may include some of the information elements of the DCI format 1_0, the DCI format 1_1, and the DCI format 1_2. Accordingly, because the sDCI transmitting the control information regarding the PDSCHs transmitted from the cooperative TRPs has a small payload compared to normal DCI (nDCI) transmitting the control information regarding the PDSCH transmitted from the serving TRP, it is possible for the sDCI to include reserved bits compared to the nDCI.

The case #2 1605 may have limited PDSCH control or degree of freedom of assignment according to content of the information elements included in the sDCI, but may have a low probability of an occurrence of a coverage difference for each piece of DCI because reception performance of the sDCI is superior compared to the nDCI.

A case #3 1610 is an example in which, while the different N−1 PDSCHs are transmitted from the additional N−1 TRPs (TRP #1 to TRP #N−1) except the serving TRP (TRP #0) used during the single PDSCH transmission, one piece of control information regarding the PDSCHs of the additional N−1 TRPs is transmitted and the DCI is dependent on the control information regarding the PDSCH transmitted from the serving TRP.

For example, the DCI #0 that is the control information regarding the PDSCH transmitted from the serving TRP (TRP #0) includes all information elements of the DCI format 1_0, the DCI format 1_1, and the DCI format 1_2, and for the control information regarding the PDSCHs transmitted from the cooperative TRPs (TRP #1 to TRP #N−1), it is possible to gather some of the information elements of the DCI format 1_0, the DCI format 1_1, and the DCI format 1_2 to one piece of secondary DCI (sDCI) for transmission. For example, the sDCI may include at least one piece of information of the cooperative TRPs, from among frequency domain resource assignment, time domain resource assignment, and HARQ-related information, such as MSC. In addition, information not included in the sDCI, such as a BWP indicator or a carrier indicator, may follow the DCI (DCI #0, normal DCI, nDCI) of the serving TRP.

The case #3 1610 may have limited PDSCH control or degree of freedom of assignment according to content of the information elements included in the sDCI, but reception performance of the sDCI may be controlled and complexity of DCI blind decoding of the UE may be low compared to the case #1 1600 and case #2 1605.

A case #4 1615 is an example in which, while the different N−1 PDSCHs are transmitted from the additional N−1 TRPs (TRP #1 to TRP #N−1) except the serving TRP (TRP #0) used during the single PDSCH transmission, the control information regarding the PDSCHs transmitted from the additional N−1 TRPs is transmitted on a same DCI (long DCI) as the control information regarding the PDSCH transmitted from the serving TRP. In other words, the UE may obtain, via single DCI, the control information regarding the PDSCHs transmitted from the different TRPs (TRP #0 to TRP #N−1). In the case #4 1615, complexity of DCI blind decoding of the UE may not be high, but PDSCH control or a degree of freedom of assignment may be low, for example, the number of cooperative TRPs may be limited, according to long DCI payload limitation.

In the description and embodiments of the disclosure below, the sDCI may denote various types of auxiliary DCI, such as shortened DCI, secondary DCI, and normal DCI (the DCI format 1_0 to 1_1 described above) including PDSCH control information transmitted from a cooperative TRP, and unless a limitation is specifically stated, the description may be similarly applied to the various types of auxiliary DCI.

In the description and embodiments of the disclosure below, the case #1 1600, the case #2 1605, and the case #3 1610 using one or more pieces of DCI (PDCCHs) to support NC-JT may be distinguished as multiple PDCCH-based NC-JT, and the case #4 1615 using a single piece of DCI (PDCCH) to support NC-JT may be distinguished as single PDCCH-based NC-JT. In multiple PDCCH-based PDSCH transmission, a CORESET scheduling DCI of the serving TRP (TRP #0) and a CORESET scheduling DCI of the cooperative TRPs (TRP #1 to TRP #N−1) may be distinguished. To distinguish the CORESETs, a method of distinguishing the CORESETs via a higher layer indicator for each CORESET, a method of distinguishing the CORESETs via a beam configuration for each CORESET, or the like may be used. Also, in the single PDCCH-based NC-JT, instead of scheduling a plurality of PDSCHs by a single piece of DCI, a single PDSCH including a plurality of layers is scheduled, and the plurality of layers may be transmitted from a plurality of TRPs. Here, a connection relationship between the layer and the TRP transmitting the layer may be indicated via a transmission configuration indicator (TCI) indication regarding the layer.

In embodiments of the disclosure, a "cooperative TRP" may be replaced by any one of various terms, such as "cooperative panel," a "cooperative beam," or the like, when actually applied.

In embodiments of the disclosure, the phrase "when NC-JT is applied" may be variously interpreted depending on a situation, for example, "when a UE simultaneously receives one or more PDSCHs from one BWP," "when a UE simultaneously receives PDSCHs based on two or more TCI indications from one BWP," and "when a PDSCH received by a UE is associated with at least one DMRS port group," and one expression is used for convenience of description.

In the disclosure, a radio protocol architecture for NC-JT may vary depending on a TRP deployment scenario. For example, when there is no or small backhaul delay between the cooperative TRPs (e.g. MgNB or SgNB), a method (CA-like method) using a structure based on MAC layer multiplexing as indicated by the reference numeral 1410 of FIG. 14 may be used. On the other hand, when the backhaul delay between the cooperative TRPs is too large to be ignored (for example, at least 2 ms is required to exchange information, such as CSI, scheduling, and HARQ-acknowledgement (ACK), between the cooperative TRPs), a method (DC-like method) of securing a robust characteristic regarding a delay by using an independent structure for each TRP from an RLC layer, as indicated by the reference numeral 1420 of FIG. 14, may be used.

The UE supporting C-JT/NC-JT may receive, from a higher layer configuration, C-JT/NC-JT-related parameters or setting values, and set an RRC parameter of the UE, based thereon. For the higher layer configuration, the UE may use a UE capability parameter, for example, tci-StatePDSCH. Here, the UE capability parameter, for example, tci-StatePDSCH, may define TCI states for a purpose of PDSCH transmission. The number of TCI states may be configured to be 4, 8, 16, 32, 64, or 128 in FR1, and may be configured to be 64 or 128 in FR2, and among the configured number, up to 8 states indicatable by 3 bits of a TCI field of DCI may be configured via an MAC CE message. The maximum number 128 denotes a value indicated by maxNumberConfiguredTCIstatesPerCC in the tci-StatePDSCH parameter included in capability signaling of the UE. As such, a series of configuration processes from a higher layer configuration to an MAC CE configuration may be applied to a beamforming indication or beamforming change command for at least one PDSCH in one TRP.

Hereinafter, for convenience of description, higher layer/ L1 parameters, such as a TCI state and spatial relation information, or cells, transmission points, panels, beams, and/or transmission directions distinguishable by indicators, such as cell ID, TRP ID, and panel ID, may be collectively described as TRPs. Accordingly, for actual application, the TRP may be suitably replaced by one of the above terms.

Referring to the descriptions related to the PUSCH above, current Rel-15/16 NR focuses on a single cell, a single TRP, a single panel, a single beam, and/or a single transmission direction regarding the PUSCH repetitive transmission. In detail, regarding the PUSCH repetitive transmission, transmission to a single TRP is considered regardless of codebook-based or non-codebook-based transmission. For example, in the codebook-based PUSCH transmission, a transmission beam of the UE may be determined by SRI and TPMI transmitted from the base station, i.e., a single TRP, to the UE. Similarly, in the non-codebook-based PUSCH transmission, NZP CSI-RS configurable from the base station, i.e., the single TRP, may be configured to the UE, and the transmission beam of the UE may be determined by the SRI transmitted from the single TRP.

Accordingly, when a deterioration factor highly interrelated with a time and space, such as a blockage in a channel between the UE and a specific TRP, is present, it is highly likely that the PUSCH repetitive transmission to the single TRP may not satisfy an expected performance. Thus, to overcome such a deterioration, Rel-17 or a release after Rel-17 may support the PUSCH repetitive transmission considering a plurality of TRPs. This may be a method of maximizing a diversity gain, considering channels between the UE and the plurality of TRPs having different spatial characteristics. To support the method, the UE needs to support a configuration for the PUSCH repetitive transmission to the multiple TRPs. For example, configuration or indication schemes regarding a plurality of transmission beams, power control, and the like to be used during the PUSCH repetitive transmission considering the multiple TRPs are required.

Also, higher layer signaling or dynamic indication for distinguishing repetitive transmission considering a single TRP defined in Rel-15/16 and the PUSCH repetitive transmission considering the multiple TRPs to be newly defined in Rel-17 is required. As a method for improving a PUSCH reception performance, a method of determining a transmission beam and frequency hopping in association with each other, such that a space diversity gain via repetitive transmission to the multiple TRPs and frequency diversity via the frequency hopping are simultaneously obtained, is required to maximize a diversity gain.

When transmitting downlink or uplink data, the base station or UE may transmit a PTRS together with the downlink or uplink data and a DMRS for data reception. The PTRS may be used to track a phase of a signal being transmitted and enhance a reception performance by compensating for the phase. In particular, in a frequency band 2 (FR2) that is a high frequency band, a very large channel estimation error is generated despite a small phase error, and thus necessity of an operation tracking and compensating for the phase error may be greater than a low frequency band. Such phase tracking and phase error compensation using a PTRS have been supported by NR Release 15 and 16. As described above, the base station indicates a DMRS port to be associated with the PTRS by a PTRS-DMRS association field in DCI. PTRS-DMRS association may reduce a phase estimation error using the PTRS by indicating the PTRS to be transmitted by a same port as a layer having a highest channel gain from among several layers, and accordingly phase estimation accuracy and channel estimation accuracy may be enhanced.

When time division multiplexing (TDM)-based PUSCH repetitive transmission is supported by using the multiple TRPs introduced in Rel-17, the UEs and channels are different for each TRP, and thus the PTRS needs to be transmitted for each TRP so as to perform the phase estimation and phase error compensation for each TRP. Because the channels are different form each TRP, a DMRS port regarding a layer having the high channel gain may be different for each TRP. The PTRS-DMRS association is required to indicate the association between the PTRS and DMRS regarding each of the multiple TRPs. However, in NR Release 15/16, only one PTRS-DMRS association field is present in the DCI, and thus it is not possible to indicate the association between the PTRS and DMRS for each of the plurality of TRPs. Accordingly, a method of indicating the PTRS-DMRS association field for performing phase tracking regarding the multiple TRPs needs to be improved.

In embodiments of the disclosure, a processing method regarding the above requirements is provided, thereby reducing a transmission latency time and a loss of uplink data during the PUSCH repetitive transmission considering the multiple TRPs. Also, when an improved PTRS-DMRS association method is provided to determine transmission information of the PTRS required for the PUSCH repetitive transmission considering the multiple TRPs, the phase tracking and phase error compensation regarding an uplink signal may be performed for each TRP. A method by which the UE configures or indicates the PUSCH repetitive transmission to the multiple TRPs, and the PTRS-DMRS association method regarding the multiple TRPs will be described in detail with reference to embodiments of the disclosure below, for the number of various cases.

Hereinafter, embodiments of the disclosure will be described in detail with reference to accompanying drawings. Hereinafter, the base station is an entity that assigns resources of a terminal, and may be at least one of a gNode B (gNB), an eNode B (eNB), a Node B (NB), a base station (BS), a wireless access unit, a BS controller, or a node on a network. Examples of a terminal may include user equipment (UE), a mobile station (MS), a cellular phone, a smartphone, a computer, and a multimedia system capable of performing a communication function. Hereinbelow, embodiments of the disclosure will be described with an example of a 5G system, but the embodiments of the disclosure may also be applied to other communication systems having a similar technical background or channel form.

For example, LTE or LTE-A mobile communication and a mobile communication technology developed after 5G may be included thereto. Accordingly, it will be understood by one of ordinary skill in the art that the disclosure may be applied to other communication systems through some modifications without departing from the scope of the disclosure. The content of the disclosure may be applied to frequency division duplex (FDD) or time division duplex (TDD) systems.

While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

Hereinafter, while describing embodiments of the disclosure, higher layer signaling may be signaling corresponding to at least one of or a combination of signaling methods below:
  Master information block (MIB);
  System information block (SIB) or SIB X (X=1, 2, . . . );
  Radio resource control (RRC); and/or
  Medium access control (MAC) control element (CE).

Also, L1 signaling may be signaling corresponding to at least one of or a combination of signaling methods using following physical layer channels or signaling:
  Physical downlink control channel (PDCCH);
  Downlink control information (DCI);
  UE-specific DCI;
  Group common DCI;
  Common DCI;
  Scheduling DCI (for example, DCI used to schedule downlink or uplink data);
  Non-scheduling DCI (for example, DCI not for scheduling downlink or uplink data);
  Physical uplink control channel (PUCCH); and/or
  Uplink control information (UCI).

Hereinafter, determining a priority between A and B in embodiments of the disclosure may be variously described as selecting a higher priority according to a pre-determined priority rule and performing an operation corresponding to the higher priority, or omitting or dropping an operation having a lower priority.

Hereinafter, the above examples will be described in through a plurality of embodiments of the disclosure, but the embodiments of the disclosure are not independent and one or more embodiments of the disclosure may be applied simultaneously or in combination.

First Embodiment: PUSCH Repetitive Transmission Considering Multiple TRPs

In the first embodiment of the disclosure, a higher layer signaling configuration and L1 signaling indication method for PUSCH repetitive transmission considering multiple TRPs will be described. The PUSCH repetitive transmission considering the multiple TRPs may operate via single or multiple DCI-based indication, and will be described in (1-1)th and (1-2)th embodiments of the disclosure. Also, a UE may, based on a configuration of a base station, support one of PUSCH repetitive transmissions via the single or multiple DCI-based indications, or support both methods while distinguishably using the two methods via L1 signaling. This will be described in a (1-3)th embodiment of the disclosure.

(1-1)th Embodiment: PUSCH Repetitive Transmission Considering Single DCI-Based Multiple TRPs As an embodiment of the disclosure, the PUSCH repetitive transmission considering the single DCI-based multiple TRPs will be described in the (1-1)th embodiment of the disclosure. The UE may report that the PUSCH repetitive transmission considering the single DCI-based multiple TRPs is possible, via a UE capability report. The base station may configure, via higher layer signaling, which PUSCH repetitive transmission is to be used, to the UE that reported UE capability (for example, UE capability supporting the PUSCH repetitive transmission considering the single DCI-based multiple TRPs). Here, the higher layer signaling may select and configure one of a PUSCH repetitive transmission type A and a PUSCH repetitive transmission type B.

In Rel-15/16, the PUSCH repetitive transmission considering the single TRP has been performed based on single DCI for both codebook and non-codebook-based transmissions. The UE may apply a same value to each PUSCH repetitive transmission by using TPMI or SRI indicated by one piece of DCI during codebook-based PUSCH transmission. Also, the UE may apply a same value to each PUSCH repetitive transmission by using SRI indicated by one piece of DCI during non-codebook-based PUSCH transmission.

For example, when the codebook-based PUSCH transmission and PUSCH repetitive transmission type A are configured via the higher layer signaling, and a time resource assignment index, in which the number of PUSCH repetitive transmissions is configured to 4, an SRI index 0, and a TPMI index 0 are indicated via DCI, the UE applies both the SRI index 0 and the TPMI index 0 to each of the 4 PUSCH repetitive transmissions. Here, SRI may be related to a transmission beam and TPMI may be related to a transmission precoder. Unlike the PUSCH repetitive transmission considering the single TRP, the PUSCH repetitive transmission considering the multiple TRPs may apply a transmission beam and a transmission precoder differently to transmission to each TRP. Accordingly, the UE may receive indications of a plurality of SRIs or TPMIs via the DCI, and perform the PUSCH repetitive transmission considering the multiple TRPs by applying the plurality of SRIs or TPMIs to each PUSCH repetitive transmission.

When the base station indicates, to the UE, the PUSCH repetitive transmission considering the single DCI-based multiple TRPs, methods of indicating the plurality of SRIs or TPMIs may be as follows when PUSCH transmission is codebook or non-codebook.

[Method 1] Transmission of Single DCI Including Plurality of SRI or TPMI Fields

To support the PUSCH repetitive transmission considering the single DCI-based multiple TRPs, the base station may transmit, to the UE, the DCI including the plurality of SRI or TPMI fields. The DCI has a new format (for example, a DCI format 0_3) or an existing format (for example, a DCI format 0_1 or 0_2), but may be configured with additional higher layer signaling (for example, signaling for determining supportability of the plurality of SRI or TPMI fields). For example, when the codebook-based PUSCH transmission is configured via the higher layer signaling, the UE may perform the PUSCH repetitive transmission considering the multiple TRPs by receiving the DCI of the new format (for example, the DCI format 0_3) having two SRI fields and two TPMI fields.

As another example, regarding the non-codebook-based PUSCH transmission, the UE may receive the DCI of the existing format (for example, the DCI format 0_1 or 0_2) having two SRI fields and in which the plurality of SRI fields may be configured to be supportable via the higher layer signaling. When a plurality of SRS resources are indicated by using the plurality of SRI fields, a transmit power control parameter of the SRS resource is configured for each SRS resource set, and thus the SRS resources may be present in different SRS resource sets so as to configure different transmit power control parameters for each TRP. Accordingly, there may be two or more SRS resource sets in which usage that is higher layer signaling is configured to be codebook or non-codebook.

Figure 17:
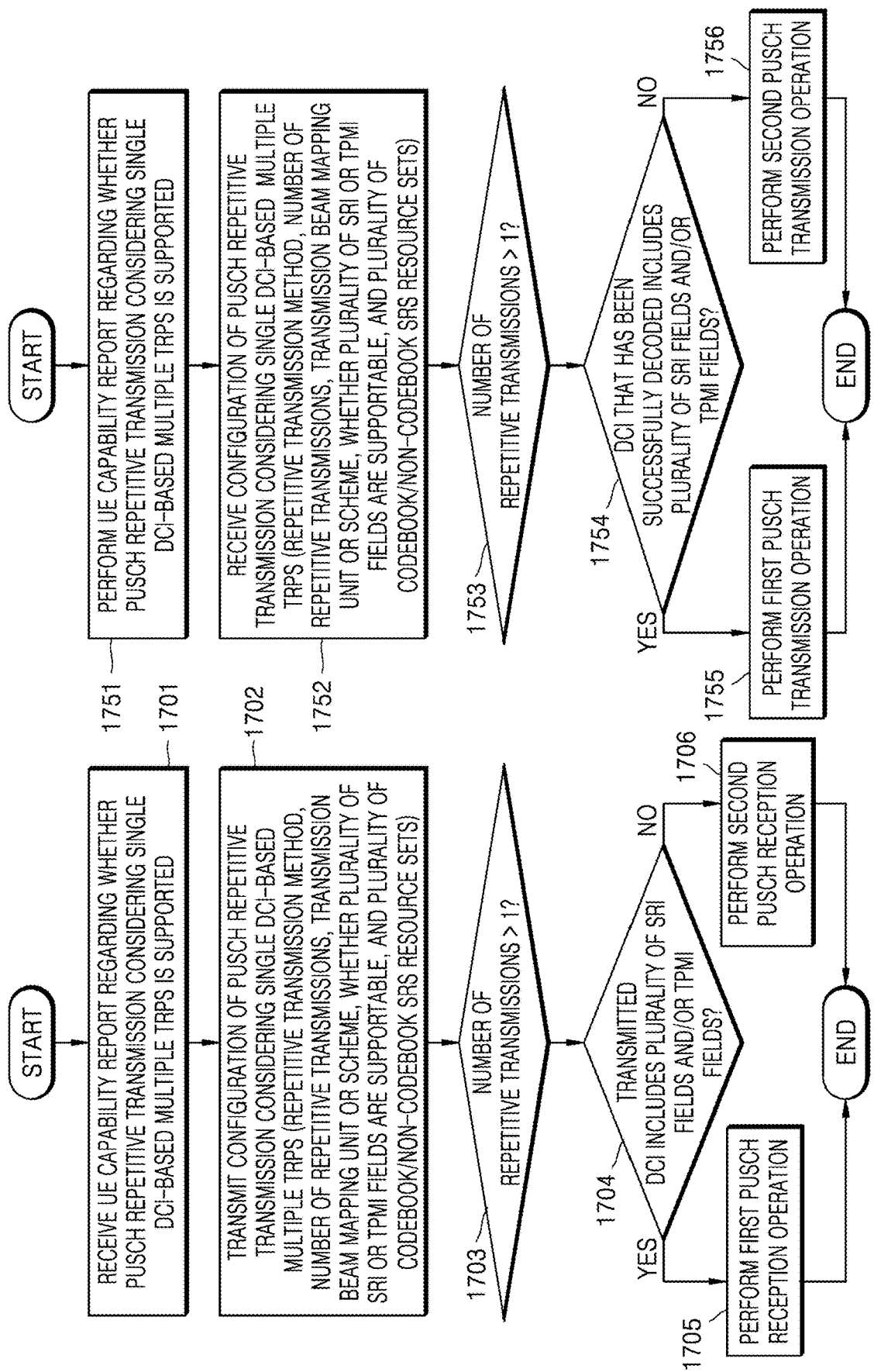
FIG. 17 illustrates a flowchart of operations of a base station and UE regarding PUSCH repetitive transmissions considering single DCI transmission-based multiple transmission and reception points (TRPs) where a plurality of sounding reference signal (SRS) resource indicator (SRI) or transmission precoding matrix indicator (TPMI) fields are present according to an embodiment of the disclosure.

FIG. 17 illustrates a flowchart of operations of a base station and UE regarding PUSCH repetitive transmissions considering single DCI transmission-based multiple TRPs where a plurality of SRI or TPMI fields are present according to an embodiment of the disclosure.

In operation 1751, the UE may perform a UE capability report regarding whether PUSCH repetitive transmission considering single DCI-based multiple TRPs is supported.

In operation 1701, the base station receives the UE capability report.

In operation 1702, the base station transmits, to the UE, a configuration of the PUSCH repetitive transmission considering the single DCI-based multiple TRPs. Here, the transmitted configuration may include a repetitive transmission method, the number of repetitive transmissions, a transmission beam mapping unit or scheme, whether a plurality of SRI or TPMI fields are supportable, and a plurality of codebook or non-codebook SRS resource sets.

In operation 1752, the UE receives the configuration.

In operation 1703, the base station determines whether the number of repetitive transmissions exceeds 1.

In operation 1753, the UE determines whether the number of repetitive transmissions exceeds 1.

In operation 1704, the base station determines, when the PUSCH repetitive transmission is codebook-based PUSCH transmission, whether DCI that has been successfully transmitted includes the pluralities of SRI fields and TPMI fields. According to another embodiment of the disclosure, when the PUSCH repetitive transmission is non-codebook-based PUSCH transmission, the base station may determine whether the DCI that has been successfully transmitted includes the plurality of SRI fields.

In operation 1754, the UE determines, when the PUSCH repetitive transmission is codebook-based PUSCH transmission, whether DCI that has been successfully received (or decoded) includes the pluralities of SRI fields and TPMI fields. According to another embodiment of the disclosure, when the PUSCH repetitive transmission is non-codebook-based PUSCH transmission, the UE may determine whether the DCI that has been successfully received includes the plurality of SRI fields.

In operation 1705, the base station may perform a first PUSCH reception operation upon determining that the plurality of SRI fields and TPMI fields are included in operation 1704. Otherwise, the base station may perform a second PUSCH reception operation in operation 1706.

In operation 1755, the UE may perform a first PUSCH transmission operation upon determining that the plurality of SRI fields and TPMI fields are included in operation 1754. Otherwise, the UE may perform a second PUSCH transmission operation in operation 1756. The first PUSCH transmission operation is an operation of repeatedly transmitting a PUSCH by using the plurality of SRI and TPMI fields in case of the codebook-based PUSCH transmission, and by using the plurality of SRI fields in case of the non-codebook-based PUSCH transmission, and repeatedly transmits the PUSCH by applying a plurality of transmission beams and/or a plurality of transmission precoders. A method of mapping a plurality of transmission beams will be described in detail with reference to a second embodiment of the disclosure. The second PUSCH transmission operation is an operation of repeatedly transmitting the PUSCH by using single SRI field and single TPMI field in case of the codebook-based PUSCH transmission, and by using single SRI field in case of the non-codebook-based PUSCH transmission, and repeatedly transmits the PUSCH by applying one transmission beam and/or one transmission precoder.

[Method 2] Transmission of DCI to which Improved SRI and TPMI Fields are Applied To support the PUSCH repetitive transmission considering the single DCI-based multiple TRPs, the UE may receive, from the base station, MAC-CE for supporting the improved SRI and TPMI fields. The MAC-CE may contain information indicating to change an interpretation of a codepoint of a DCI field so as to indicate a plurality of transmission beams regarding a specific codepoint of the SRI field in the DCI or to indicate a plurality of transmission precoders regarding a specific codepoint of the TPMI field.

A method of indicating the plurality of transmission beams may consider following two methods:
- Reception of the MAC-CE activating the specific codepoint of the SRI field to indicate one SRS resource to which a plurality of pieces of SRS spatial relation information are connected; and
- Reception of the MAC-CE activating the specific codepoint of the SRI field to indicate a plurality of SRS resources to which one piece of SRS spatial relation information is connected.

When the plurality of SRS resources are indicated by using the improved SRI field, a transmit power control parameter of the SRS resource is configured for each SRS resource set, and thus the SRS resources may be present in different SRS resource sets so as to configure different transmit power control parameters for each TRP. Accordingly, there may be two or more SRS resource sets in which usage that is higher layer signaling is configured to be codebook or non-codebook.

Figure 18:
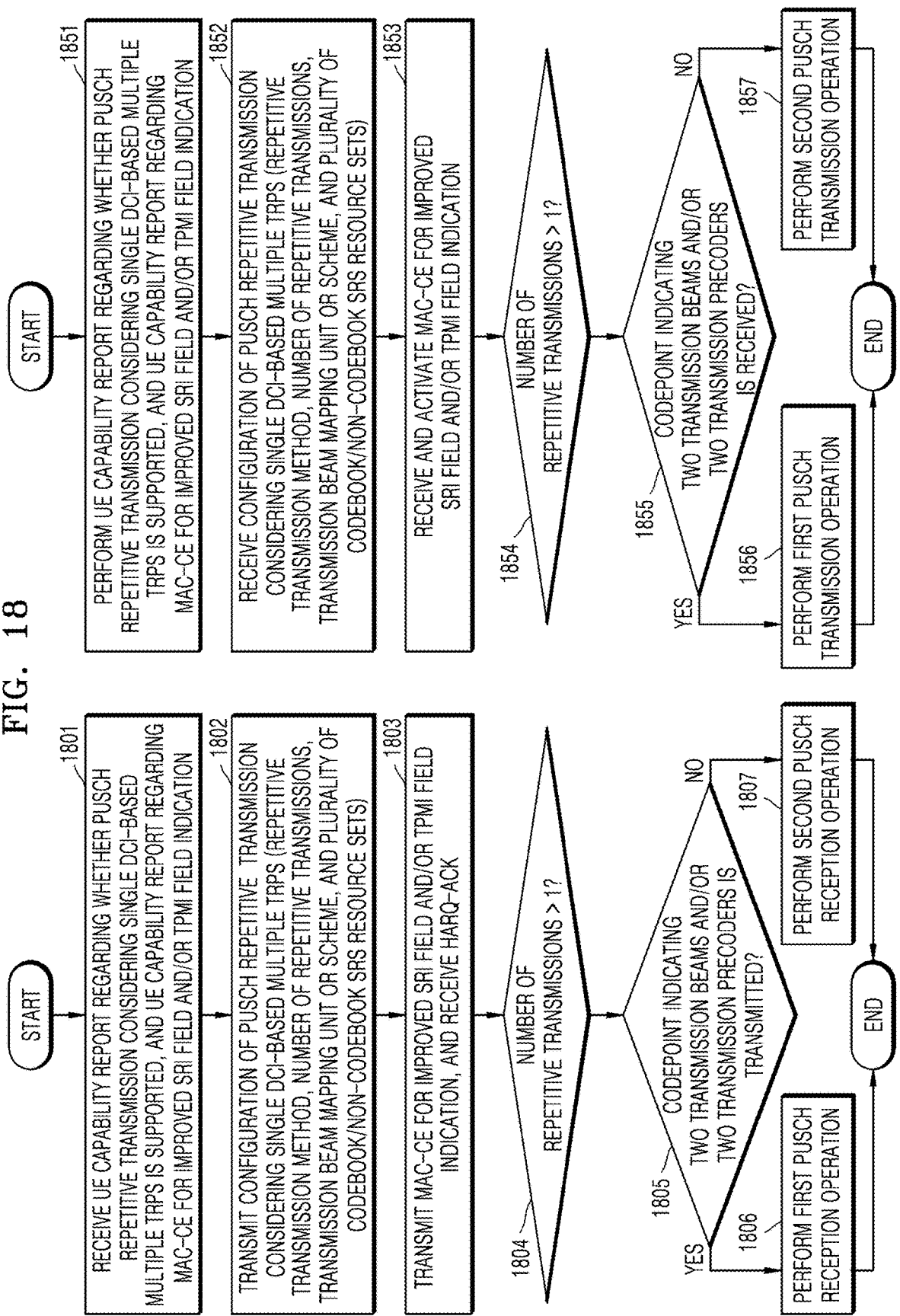
FIG. 18 illustrates a flowchart of operations of a base station and UE regarding PUSCH repetitive transmissions considering single DCI transmission-based multiple TRPs using improved SRI and TPMI fields according to an embodiment of the disclosure.

FIG. 18 illustrates a flowchart of operations of the base station and UE regarding the PUSCH repetitive transmissions considering the single DCI transmission-based multiple TRPs using the improved SRI and TPMI fields according to an embodiment of the disclosure.

In operation 1851, the UE may perform a UE capability report regarding whether the PUSCH repetitive transmission considering the single DCI-based multiple TRPs is supported, and a UE capability report regarding whether MAC-CE for an improved SRI field or TPMI field indication is activatable.

In operation 1801, the base station receives the UE capability report.

In operation 1802, the base station transmits, to the UE, a configuration of the PUSCH repetitive transmission considering the single DCI-based multiple TRPs. Here, the transmitted configuration may include a repetitive transmission method, the number of repetitive transmissions, a transmission beam mapping unit or scheme, and a plurality of codebook or non-codebook SRS resource sets.

In operation 1852, the UE receives the configuration.

In operation 1853, the UE receives the MAC-CE for activating the improved SRI field or TPMI field indication.

In operation 1803, the UE transmits, to the base station, HARQ-ACK 3 ms after the reception. In other words, in terms of the base station, the base station may receive the HARQ-ACK 3 ms after the UE receives the MAC-CE for activating the improved SRI field or TPMI field indication.

In operation 1804, the base station may determine whether the number of repetitive transmissions exceeds 1.

In operation 1854, the UE may determine whether the number of repetitive transmissions exceeds 1.

In operations 1855 and 1856, when the PUSCH repetitive transmission is codebook-based PUSCH transmission and DCI that has been successfully received includes the improved SRI field and TPMI field, the UE may perform a first PUSCH transmission operation. The first PUSCH transmission operation is an operation of repeatedly transmitting a PUSCH by using a codepoint of the SRI and TPMI fields indicating pluralities of SRIs and TPMIs in case of the codebook-based PUSCH transmission, and by using a codepoint of the SRI field indicating the plurality of SRIs in case of the non-codebook-based PUSCH transmission, and the PUSCH is repeatedly transmitted by applying a plurality of transmission beams and/or a plurality of transmission precoders. A method of mapping a plurality of transmission beams will be described in detail with reference to the second embodiment of the disclosure.

In operation 1857, a second PUSCH transmission operation is an operation of repeatedly transmitting the PUSCH as all codepoints of the SRI and TPMI fields receive the DCI denoting the single SRI and single TPMI indication, and the PUSCH is repeatedly transmitted by applying one transmission bean and/or one transmission precoder.

Operations 1805, 1806, and 1807 are performed by the base station with respect to operations 1855, 1856, and 1857 described above.

Second Embodiment: Frequency Hopping and Transmission Beam Mapping Methods During PUSCH Repetitive Transmission Considering Multiple TRPs In the second embodiment of the disclosure, the frequency hopping and transmission beam mapping methods for each PUSCH during the PUSCH repetitive transmission considering the multiple TRPs is described. Here, a transmission beam may be an indicator referring to an SRS resource connected to SRS spatial relation information, an SRS spatial relation, or collectively the SRS spatial relation and a TPMI. The frequency hopping method and the transmission beam mapping method may be configured independently or dependently via higher layer signaling, may be indicated via L1 signaling, or may operate in combination of a configuration via higher layer signaling and indication via L1 signaling.

The frequency hopping method and the transmission beam mapping method being independently performed denotes that the two methods are transmitted to the UE via independent signaling (for example, a configuration via higher layer signaling, indication via L1 signaling, or a combination of the configuration via higher layer signaling and the indication via L1 signaling). However, the number of all cases of the frequency hopping method and the number of all cases of the transmission beam mapping method may not be all combinable. For example, when there are three frequency hopping methods and four transmission beam mapping methods, only 10 combinations may be supported instead of all 12 combinations. Detailed embodiments of the disclosure will be described below.

(2-1)th Embodiment: Transmission Beam Mapping Method During PUSCH Repetitive Transmission Considering Multiple TRPs In the (2-1)th embodiment, the transmission beam mapping Method during the PUSCH repetitive transmission considering the multiple TRPs will be described. When a plurality of transmission beams are configured via higher layer signaling, indicated via L1 signaling, or transmitted in combination of a configuration via higher layer signaling and indication via L1 signaling, by the base station, the UE may determine how to perform the transmission beam mapping method during the PUSCH repetitive transmission considering the multiple TRPs. Information about the plurality of transmission beams may be SRI to which a plurality of pieces of SRS spatial relation information are connected or SRI to which one piece of SRS spatial relation information is connected. The base station may configure via higher layer signaling, indicate via L1 signaling, or transmit in combination of a configuration via higher layer signaling and indication via L1 signaling, information about how to map which transmission beam to each PUSCH repetitive transmission from among pieces of information about the plurality of transmission beams received by the UE, i.e., a transmission beam mapping unit. Also, the number of entire PUSCH repetitive transmissions during the PUSCH repetitive transmission considering the multiple TRPs may be configured via higher layer signaling, indicated via L1 signaling, or transmitted in combination of a configuration via higher layer signaling and indication via L1 signaling.

Following candidates may be possible as the transmission beam mapping unit:

Each slot or sub-slot, or a plurality of slots or sub-slots;

Each repetitive transmission (nominal or actual) or a plurality of repetitive transmissions (nominal or actual);

Each symbol or a plurality of symbols; and/or

1/N of the number of entire repetitive transmissions.

When the transmission beam mapping unit is a slot, a same transmission beam is applied to all PUSCH repetitive transmissions (nominal or actual) in a slot and a transmission beam is changed in units of slots. For example, when the number of entire PUSCH repetitive transmissions is 4, the number of transmission beams is 2, the transmission beam mapping unit is a slot, and there are two PUSCH repetitive transmissions in each slot, a first transmission beam may be applied to first and second PUSCH repetitive transmissions transmitted from a first slot, and a second transmission beam may be applied to third and fourth PUSCH repetitive transmissions transmitted from a second slot.

As another example, when the number of entire repetitive transmissions is 4, the number of transmission beams is 2, the transmission beam mapping unit is two slots, and one PUSCH repetitive transmission is performed in each slot, a first transmission beam may be applied to first and second PUSCH repetitive transmissions transmitted from first and second slots respectively, and a second transmission beam may be applied to third and fourth PUSCH repetitive transmissions transmitted from third and fourth slots respectively.

When the transmission beam mapping unit is 1/N of the number of entire PUSCH repetitive transmissions, N may be a submultiple of the number of entire repetitive transmissions or a natural number that is equal to or greater than 2 and is smaller than or equal to the number of entire repetitive transmissions. For example, when the number of PUSCH repetitive transmissions is 6, the number of transmission beams is 2, and the transmission beam mapping unit is ½ (N=2) of the number of entire repetitive transmissions, the UE may apply a first transmission beam to first to third PUSCH repetitive transmissions, and apply a second transmission beam to fourth to sixth PUSCH repetitive transmissions.

Also, regarding, from among the transmission beam mapping units, a fixed transmission beam mapping unit or a transmission beam mapping unit configured by the UE to the base station via higher layer signaling, indicated via L1 signaling, or received in combination of a configuration via higher layer signaling and indication via L1 signaling, the base station may configure via higher layer signaling, indicate via L1 signaling, or transmit in combination of a configuration via higher layer signaling or indication via L1 signaling, one of cyclical and sequential transmission beam mapping schemes to the UE.

For example, when the number of entire PUSCH repetitive transmissions is 6, the number of transmission beams is 2, the transmission beam mapping unit is repetitive transmission (nominal or actual), and the transmission beam mapping scheme is cyclical, the UE may apply a first transmission beam to odd-th PUSCH repetitive transmissions and apply a second transmission beam to even-th PUSCH repetitive transmissions. When the transmission beam mapping scheme is sequential, the number of transmission beam mapping units for applying a same transmission beam may be 2 or a submultiple of the number of entire repetitive transmissions, and corresponding information may be pre-determined (for example, fixed to 2 without specific signaling), configured via higher layer signaling, indicated via L1 signaling, or transmitted in combination of a configuration via higher layer signaling and indication via L1 signaling.

In the above example, when the transmission beam mapping scheme is sequential and the number of transmission beam mapping units for applying a same transmission beam is 2, the UE may apply a first transmission beam to first and second PUSCH repetitive transmissions, a second transmission beam to third and fourth PUSCH repetitive transmissions, and the first transmission beam to fifth and sixth PUSCH repetitive transmissions.

(2-2)th Embodiment: Independent Frequency Hopping and Transmission Beam Mapping Methods In the (2-2)th embodiment, a method of independently performing the frequency hopping method and the transmission beam mapping method during the PUSCH repetitive transmission considering the multiple TRPs is described. Like a process of transmitting the transmission beam mapping unit from the base station to the UE, the frequency hopping method may be configured by the base station to the UE via higher layer signaling, indicated via L1 signaling, or transmitted in combination of a configuration via higher layer signaling and indication via L1 signaling. Also, the UE may receive, from the base station, the frequency hopping method independently from the process of transmitting the transmission beam mapping unit.

Following candidates may be possible as a frequency hopping unit:

An inter-slot or a plurality of slots;

A frequency hopping method in a slot;

A frequency hopping method of inter-repetitive transmission or between a plurality of repetitive transmissions; and/or A frequency hopping method in a repetitive transmission.

The UE may independently apply the frequency hopping method and transmission beam mapping unit, which are configured via higher layer signaling, indicated via L1 signaling, or received in combination of a configuration via higher layer signaling and indication via L1 signaling.

Figure 19:
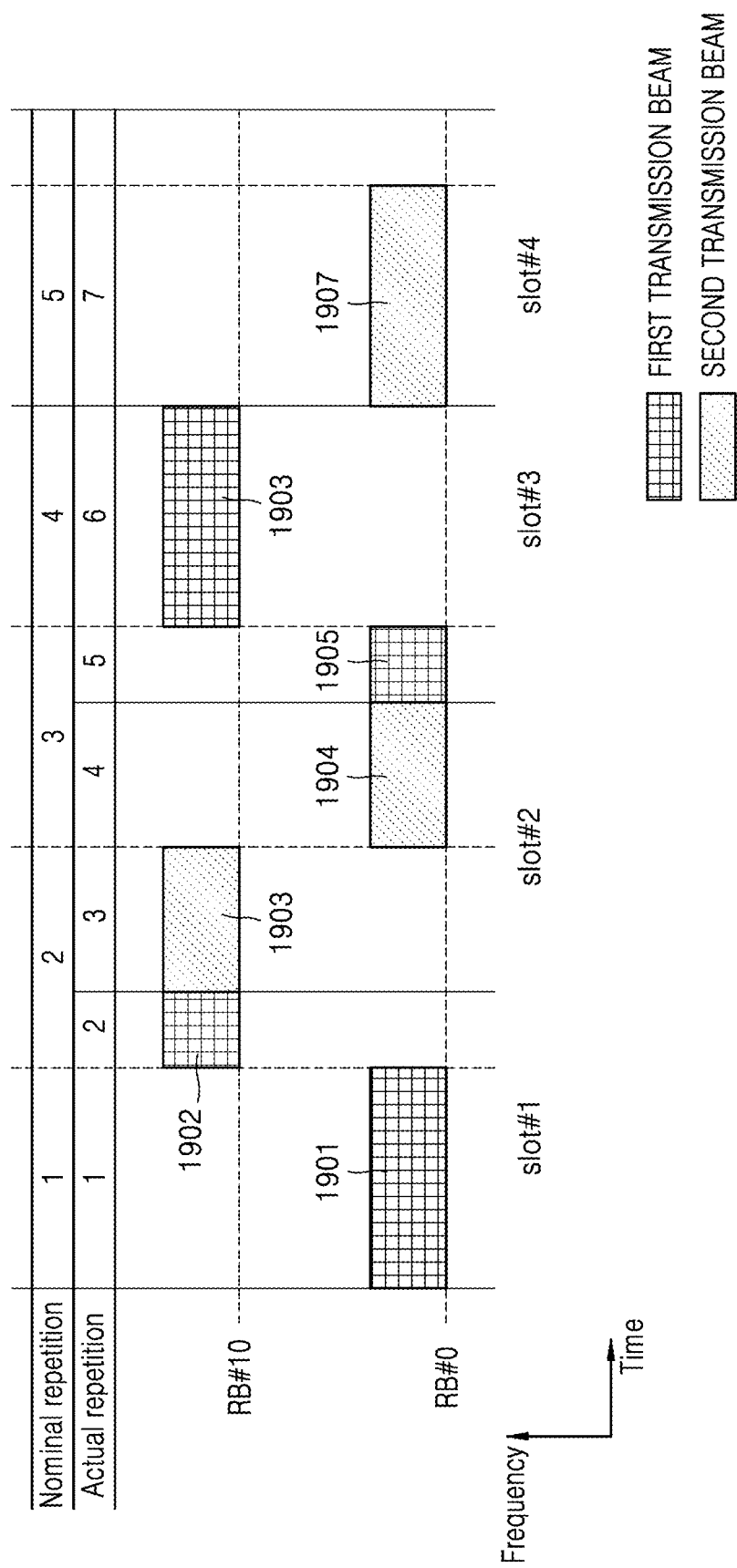
FIG. 19 illustrates a diagram for describing a method of independently determining frequency hopping and transmission beam mapping during PUSCH repetitive transmission considering multiple TRPs according to an embodiment of the disclosure.

FIG. 19 illustrates a diagram for describing a method of independently determining frequency hopping and transmission beam mapping during the PUSCH repetitive transmission considering the multiple TRPs according to an embodiment of the disclosure.

For example, when the PUSCH repetitive transmission is the PUSCH repetitive transmission type B, the number of entire PUSCH repetitive transmissions (for example, the number of nominal repetitions) is 5, a symbol length of the nominal repetition is 10, an inter-nominal repetition frequency hopping method is used as the frequency hopping method, the transmission beam mapping unit is a slot, the number of PUSCH repetitive transmissions in a slot is 1, a location of a starting RB is 0th RB, and an RF offset caused by frequency hopping is 10 RBs, the UE may apply a first transmission beam in a first slot and a third slot, and apply a second transmission beam in a second slot and a fourth slot. The UE transmits first actual repetition 1901 from an RB #0 in a slot #1, and transmits second actual repetition 1902 from an RB #10 in the slot #1. The UE transmits third actual repetition 1903 from an RB #10 in a slot #2, and transmits fourth actual repetition 1904 from an RB #0 in the slot #2. The UE transmits fifth actual repetition 1905 from an RB #0 in a slot #3, and transmits sixth actual repetition 1906 from an RB #10 in the slot #3. The UE transmits seventh actual repetition 1907 from an RB #0 in a slot #4.

When a combination of a specific frequency hopping method and transmission beam mapping unit is configured via higher layer signaling, indicated via L1 signaling, or transmitted in combination of a configuration via higher layer signaling and indication via L1 signaling, the base station and UE may insert one or a plurality of symbol gaps between frequency hoppings or repetitive transmissions, or drop one or a plurality of transmission symbols, in addition to changing transmit power according to application of different transmission beams.

The base station and UE may not support the combination of the specific frequency hopping method and transmission beam mapping unit. For example, the combination may not be supported when the frequency hopping does not occur or only one transmission beam mapping occurs while the combination is used. For example, the number of entire PUSCH repetitive transmissions is 2, the frequency hopping unit is a slot, the transmission beam mapping unit is PUSCH repetitive transmission, and the number of PUSCH repetitive transmissions in a slot is 2, the UE may map a first transmission beam to a first PUSCH repetitive transmission in a first slot, map a second transmission beam to a second PUSCH repetitive transmission, and does not perform frequency hopping. The UE may not expect the combination to be configured by the base station via higher layer signaling, indicated via L1 signaling, or transmitted in combination of a configuration via higher layer signaling and indication via L1 signaling.

(2-3)th Embodiment: Dependent Frequency Hopping and Transmission Beam Mapping Methods In the (2-3)th embodiment of the disclosure, a method of dependently performing the frequency hopping method and the transmission beam mapping method during the PUSCH repetitive transmission considering the multiple TRPs is described. The frequency hopping method and the transmission beam mapping method are dependently determined so as to obtain a frequency diversity and a space diversity as much as possible with respect to the PUSCH repetitive transmission considering the multiple TRPs. For example, the frequency hopping unit may be greater than the transmission beam mapping unit. In other words, the UE may transmit the PUSCH from a same frequency location by applying different transmission beams to the PUSCH, and transmit the PUSCH from another frequency location via frequency hopping, by applying different transmission beams to the PUSCH. As another example, the frequency hopping unit may be smaller than the transmission beam mapping unit. In other words, the UE may transmit the PUSCH from different frequency locations by applying a same transmission beam to the PUSCH, and transmit the PUSCH from different frequency locations by applying different transmission beams to the PUSCH. As described above, a method of providing dependency between the frequency hopping unit and the transmission beam mapping unit may consider following three methods.

[Method 1] Using Independent Configurations of Frequency Hopping and Transmission Beam Mapping Units The UE may perform dependent frequency hopping and transmission beam mapping by using transmission schemes of the frequency hopping unit and transmission beam mapping unit, respectively. The transmission schemes may be the same, but additional restrictions may exist.

For example, when the UE is configured via higher layer signaling, indicated via L1 signaling, or configured and indicated in combination of higher layer signaling and L1 signaling, the frequency hopping method and the transmission beam mapping method by the base station, the UE may expect the frequency hopping unit to be smaller than the transmission beam mapping unit. For example, when the frequency hopping method is configured via higher layer signaling, indicated via L1 signaling, or configured and indicated in combination of higher layer signaling and L1 signaling, in units of slots, the UE does not expect the transmission beam mapping unit greater than a slot to be configured via higher layer signaling, indicated via L1 signaling, or configured and indicated in combination of higher layer signaling and L1 signaling.

As another example, when the UE is configured via higher layer signaling, indicated via L1 signaling, or configured and indicated in combination of higher layer signaling and L1 signaling, the frequency hopping method and the transmission beam mapping method by the base station, the UE may expect the frequency hopping unit to be greater than the transmission beam mapping unit. For example, when the frequency hopping method is configured via higher layer signaling, indicated via L1 signaling, or configured and indicated in combination of higher layer signaling and L1 signaling, in units of slots, the UE does not expect the transmission beam mapping unit smaller than a slot to be configured via higher layer signaling, indicated via L1 signaling, or configured and indicated in combination of higher layer signaling and L1 signaling.

[Method 2] Configuring Transmission Beam Mapping Unit Based on Configuration of Frequency Hopping Unit The UE may support the transmission beam mapping unit according to the frequency hopping method that has been, by the base station, configured via higher layer signaling, indicated via L1 signaling, or configured and indicated in combination of higher layer signaling and L1 signaling. In other words, the transmission beam mapping unit may be configured and indicated to the UE in a multiple of the configured or indicated frequency hopping unit. For example, when the base station has configured or indicated the frequency hopping method in units of slots to the UE, the transmission beam mapping unit may be configured or indicated to the UE by one slot or a plurality of slots.

Figure 20:
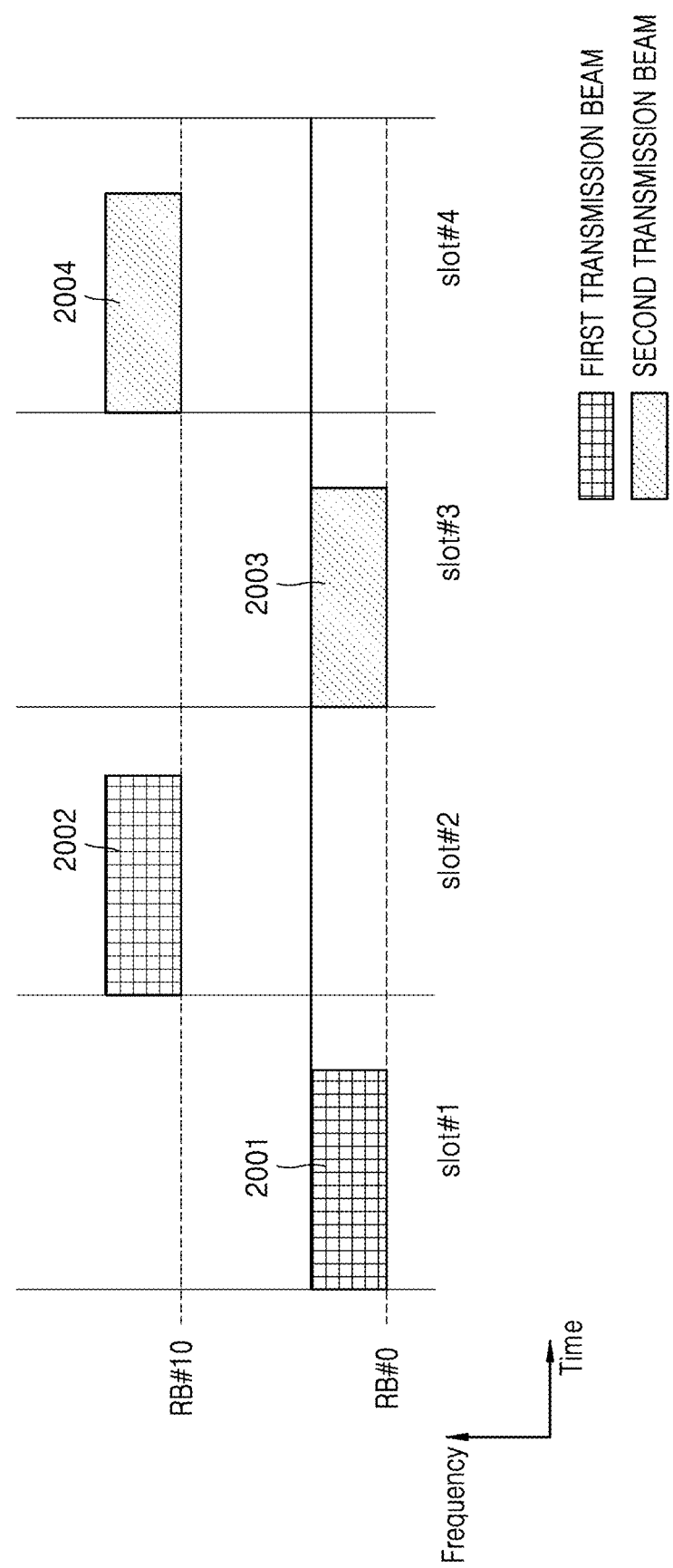
FIG. 20 illustrates a diagram for describing a configuration of a transmission beam mapping unit, based on a configuration of a frequency hopping unit according to an embodiment of the disclosure.

FIG. 20 illustrates a diagram for describing a configuration of the transmission beam mapping unit, based on a configuration of the frequency hopping unit according to an embodiment of the disclosure.

When the number of PUSCH repetitive transmissions is 4, the frequency hopping method is in units of slots, the transmission beam mapping units are configured or indicated to be 2 and thus the transmission beam mapping is performed in units of 2 slots, the number of PUSCH repetitive transmissions is 2 in a slot, a location of a starting RB is a 0th RB, and an RB offset of the frequency hopping is 10 RBs, the UE may transmit the PUSCH by applying a first transmission beam from a 0th RB in a first slot with respect to a first PUSCH repetitive transmission 2001, transmit the PUSCH by applying the first transmission beam from a 10th RB in a second slot with respect to a second PUSCH repetitive transmission 2002, transmit the PUSCH by applying a second transmission beam from a 0th RB in a third slot with respect to a third PUSCH repetitive transmission 2003, and transmit the PUSCH by applying the second transmission beam from a 10th RB in a fourth slot with respect to a fourth PUSCH repetitive transmission 2004.

Also, the transmission beam mapping unit may be configured or indicated to the UE in smaller units than the configured or indicated frequency hopping unit. The base station may apply following two methods to configure or indicate the transmission beam mapping unit to be smaller than the frequency hopping unit.

[Method 3] Defining Available Frequency Hopping Units as Set and Selecting Transmission Beam Mapping Unit from Corresponding Set The UE may pre-define the set including the available frequency hopping units. The set may be defined in a following order:
Unit 1. Within actual PUSCH repetitive transmission;
Unit 2. Actual PUSCH repetitive transmission;
Unit 3. Within nominal PUSCH repetitive transmission;
Unit 4. Nominal PUSCH repetitive transmission; and/or
Unit 5. Slot.

The UE may be, by the base station, configured via higher layer signaling, indicated via L1 signaling, or configured and indicated via higher layer signaling and L1 signaling, how many lower the transmission beam mapping unit is than the frequency hopping unit, within the set. For example, when the UE is, by the base station, configured or indicated the frequency hopping method in units of slots that is unit 5, and configured and indicated to use the transmission beam mapping unit that is one unit lower than the frequency hopping unit, the UE may perform the transmission beam mapping in units of nominal PUSCH repetitive transmissions that is unit 4.

Also, the UE may ignore the frequency hopping method to reduce a burden to the UE when the transmission beam mapping unit or transmission beam mapping scheme, and the frequency hopping method are configured via higher layer signaling, indicated via L1 signaling, or transmitted in combination of a configuration via higher layer signaling and indication via L1 signaling, during the PUSCH repetitive transmission considering the multiple TRPs. Also, when the transmission beam mapping unit or transmission beam mapping scheme, and the frequency hopping method are configured via higher layer signaling, indicated via L1 signaling, or transmitted in combination of a configuration via higher layer signaling and indication via L1 signaling, the UE does not expect the transmission beam mapping unit and the frequency hopping unit to be both applied to a slot (for example, when the transmission beam mapping unit is actual repetition and the frequency hopping unit is repetitive transmission in a slot).

Third Embodiment: PTRS-DMRS Association Method Considering Multiple TRPs

In the third embodiment of the disclosure, the PTRS-DMRS association method for determining a port of a PTRS transmitted together with a PUSCH for each TRP, during the PUSCH repetitive transmission considering the multiple TRPs, and a method of transmitting the PTRS, based on the PTRS-DMRS association method are described. The PTRS-DMRS association method may be divided into a method of determining a port of a PTRS via different PTRS-DMRS associations for multiple TRPs, and transmitting the PTRS, and a method of determining a port of a PTRS via a same PTRS-DMRS association for all TRPs, and transmitting the PTRS, which are described in (3-1)th and (3-2)th embodiments of the disclosure.

(3-1)th Embodiment: Method of Determining Port of PTRS Via Different PTRS-DMRS Associations for Multiple TRPs, and Transmitting PTRS In the (3-1)th embodiment, a method by which the base station indicates, to the UE, the PTRS-DMRS association for each TRP, in consideration of the multiple TRPs, and the UE transmitting the PTRS based on the PTRS-DMRS association is described. In NR Release 15/16, an association between a PTRS port and a DMRS port for single TRP is indicated via one PTRS-DMRS association field in DCI for scheduling a PUSCH. However, a method for indicating the association between the PTRS port and the DMRS port for each TRP regarding the PUSCH repeatedly transmitted by the multiple TRPs is required. When the PUSCH is repeatedly transmitted by N TRPs and a phase is tracked and a phase error is compensated for by the PTRS, the base station may indicate, to the UE, N PTRS-DMRS associations. Hereinafter, embodiments of the disclosure are described as if N is 2 for convenience, but a provided technique may be expanded and applied to support the TRPs in the number greater than 2.

A method of indicating the PTRS-DMRS association for each TRP, in consideration of the multiple TRPs, may include following detailed operations:

A method of adding a PTRS-DMRS association field in DCI;
A method of defining a PTRS-DMRS association table newly configurable for multiple TRPs, and indicating a PTRS-DMRS association for the multiple TRPs, based on the PTRS-DMRS association table; and/or
A method of reinterpreting a PTRS-DMRS association field, in consideration of multiple TRPs.

The detailed operations are described in (3-1-1)th, (3-1-2)th, and (3-1-3)th detailed embodiments of the disclosure, respectively.

(3-1-1)th Detailed Embodiment: Method of Adding PTRS-DMRS Association Field in DCI In the current detailed embodiment of the disclosure, a method of adding the PTRS-DMRS association field in the DCI according to the number of TRPs supportable by the UE, by expanding an operation of setting only one PTRS-DMRS association field in the DCI, is described. The method of adding the PTRS-DMRS association field considering the multiple TRPs may be described in detail via operations between the UE and the base station below. The UE may perform a UE capability report notifying the base station that a plurality of TRPs are supportable. The base station may determine the number of TRPs to be supported according to UE capability reported by the UE, and configure, to the UE, RRC parameters according to the number of TRPs. Here, to determine a bit size of the PTRS-DMRS association field in the DCI, a higher layer parameter configuration for transmitting the PUSCH to the multiple TRPs or a field for indicating multiple TRP transmission in same DCI may be identified, in addition to identifying transform precoding, a higher layer parameter PTRS-UplinkConfig, and a configuration value of maxRank in a higher layer parameter PUSCH-Config.

The UE determines that the PUSCH is transmittable by the multiple TRPs regarding one or a combination of following candidates:

Candidate 1) When a higher layer parameter (for example, "enablePUSCHwithTwoSRSSet") is configured to support the PUSCH repetitive transmission considering the multiple TRPs, such as "enable" or "on," according to the UE capability reported by the UE;

Candidate 2) When the number of SRS resource sets in which "usage" is configured to "codebook" or "non-Codebook" is 2;

Candidate 3) When the SRI field and/or TPMI field in the DCI for scheduling the PUSCH indicates two SRIs and/or two TPMIs (may include both cases in which there are two SRI fields and/or two TPMI fields and in which a single field is reinterpreted to indicate two values each); and/or Candidate 4) When the PUSCH repetitive transmission considering the multiple TRPs is scheduled by the DCI received from a CORESET configured by two different CORESETPoolIndex.

As such, when the UE identifies the configuration for the PUSCH repetitive transmission based on the multiple TRPs, the UE may verify that the PTRS-DMRS association fields in the same number as the number of multiple TRPs in the DCI format 0_1 or 0_2 are configured. When the PUSCH is repeatedly transmitted by two TRPs, the number of PTRS-DMRS association fields in the DCI format 0_1 or 0_2 is two. A plurality of PTRS-DMRS association fields are used to determine the port of PTRS transmitted to each TRP. When the number of PTRS-DMRS association fields is two, the UE may use a first PTRS-DMRS association field to determine a PTRS regarding a TRP indicated by a first SRI and/or TPMI, and a second PTRS-DMRS association field to determine a PTRS regarding a TRP indicated by a second SRI and/or TPMI.

The UE may transmit the PUSCH considering single TRP or considering multiple TRPs, according to the numbers of SRIs and TPMIs indicated by the SRI and TPMI fields in the DCI, via the method of Candidate 3. When the SRI and TPMI fields in the DCI indicate one SRI and one TPMI, the UE may transmit the PUSCH by the single TRP and determine that only one PTRS-DMRS association field is configured. On the other hand, when the SRI and TPMI fields in the DCI indicate two SRIs and two TPMIs, the UE may transmit the PUSCH by the multiple TRPs and determine that two PTRS-DMRS association fields are configured. When the base station has configured, to the UE, a higher layer parameter for supporting the PUSCH repetitive transmission considering the multiple TRPs via the method of Candidate 1 or Candidate 4, but schedules the PUSCH to be supported by the single TRP, the number of PTRS-DMRS association fields in the DCI may be configured to be two, but only one PTRS-DMRS association field may be applied for actual PTRS transmission by the UE. In this case, the UE may ignore the added PTRS-DMRS association field and determine the association between the PTRS port and DMRS port by two MSB bits corresponding to the first PTRS-DMRS association field.

(3-1-2)th Detailed Embodiment: PTRS-DMRS Association Method Based on PTRS-DMRS Association Table Newly Configurable in Consideration of Multiple TRPs The base station and the UE may determine the association between the PTRS port and DMRS port, by referring to the PTRS-DMRS association fields and Table 19-1 or 19-2 above, according to the maximum number of PTRS ports configured by a higher layer. In the (3-1-2)th detailed embodiment of the disclosure, the method of determining the association between the PTRS port and DMRS port by using a newly configurable table, instead of using a table for a fixed PTRS-DMRS association, such as Table 19-1 or 19-2, is described. The base station may configure candidates of the association between the PTRS and DMRS regarding two TRPs, by using uplink channel information of each TRP estimated by receiving SRS, or uplink channel information of each TRP estimated by channel reciprocity based on CSI report information reported by the UE. Because four associations between the PTRS and DMRS are indicated for each TRP, the associations between the PTRS and DMRS considering both the two TRPs may be represented by total 16 combinations.

However, when the base station includes the uplink channel information, the base station may notify the UE about some of the total 16 associations, which are frequently indicated, and the PTRS-DMRS association regarding the two TRPs may be performed on the basis of some associations. Referring to an example according to the (3-1-2)th detailed embodiment of the disclosure, in detail, the base station may configure a new PTRS-DMRS association table when the number of PTRS ports is 1 as in Table 21 below, based on channel information between the UE and each TRP.

TABLE 21

| Value | DMRS port |
|---|---|
| 0 | $1^{st}$ scheduled DMRS, $1^{st}$ scheduled DMRS |
| 1 | $2^{nd}$ scheduled DMRS, $2^{nd}$ scheduled DMRS |
| 2 | $3^{rd}$ scheduled DMRS, $1^{st}$ scheduled DMRS |
| 3 | $3^{rd}$ scheduled DMRS, $4^{th}$ scheduled DMRS |

In Table 21, information about two scheduled DMRSs is included in a DMRS port field. A scheduled DMRS indicated first in the DMRS port field of Table 21 indicates PTRS-DMRS association information regarding a TRP 1, and a scheduled DMRS indicated second indicates PTRS-DMRS association information regarding a TRP 2. When a bit value of the PTRS-DMRS association field indicated by the DCI is 1, the UE associates a PTRS port regarding the TRP 1 to a DMRS port scheduled second regarding the TRP 1, and associates a PTRS port regarding the TRP 2 to a DMRS port scheduled second regarding the TRP 2. Here, the DMRS port scheduled second regarding the TRP 1 and the DMRS port scheduled second regarding the TRP 2 denote layers regarding different channels, and thus do not denote a same DMRS port.

Table 21 is one example and the number of DMRS port fields or value fields of a table may be variously determined depending on the maximum number of PTRS ports and a channel state between the UE and each TRP. The base station determines the PTRS-DMRS association table by determining the numbers of DMRS port fields and value fields, according to the maximum number of TPRS ports and the channel state between the UE and each TRP. Then, the base station may configure, to the UE, or update the determined PTRS-DMRS association table by using a new RRC parameter or MAC CE.

(3-1-3)th Detailed Embodiment: Method of Reinterpreting PTRS-DMRS Association Field, in Consideration of Multiple TRPs In the (3-1-3)th detailed embodiment of the disclosure, a method of determining the PTRS regarding each TRP by reinterpreting the PTRS-DMRS association field when the PUSCH is transmitted by the multiple TRPs is provided. The UE may determine whether the PUSCH is repeatedly transmitted by the multiple TRPs, as described with reference to the method according to the (3-1-1)th detailed embodiment of the disclosure. When the PUSCH is repeatedly transmitted by the multiple TRPs, the UE reinterprets the 2 bits of the PTRS-DMRS association field indicated by the DCI format 0_1 or 0_2 and determines the association between the PTRS port and DMRS port regarding each TRP.

Here, among the two bits, 1 MSB may be used to indicate the PTRS-DMRS association regarding the TRP 1 (or a TRP associated with a first SRI among two SRIs), and 1 LSB may be used to indicate a PTRS-DMRS association regarding the TRP 2 (or a TRP associated with a second SRI among the two SRIs). The UE may determine PTRS information for each TRP by combining 1 bit of the PTRS-DMRS association field regarding each TRP indicated by the DCI and SRI (during non-codebook-based PUSCH transmission) or TPMI (during codebook-based PUSCH transmission) in the same DCI. Detailed operations of the current detailed embodiment of the disclosure will be described through following examples.

In one example, [Case 1] maximum two PTRS ports, layer 2 non-codebook PUSCH repetitive transmission considering multiple TRPs, the base station indicates two SRIs to indicate an SRS resource selected for each TRP, wherein each SRI indicates two SRS resources. As described above, in the SRS for non-codebook, a PTRS port index associated with an SRS resource in a higher layer SRS-Resource is configured by ptrs-PortIndex. In other words, in the SRS resource in the SRS resource set for nonCodebook, the associated PTRS port index is configured by a higher layer parameter, and the UE may determine the SRS resource selected via the SRI in the DCI and the PTRS port index of the selected SRS resource. When the number of SRS resources in the SRS resource set is 4, combinations of the PTRS port indexes regarding the two SRS resources selected via the SRI are {0, 0}, {0, 1}, {1, 0}, and {1, 1} in Case 1. Then, the SRS resources are mapped to the PUSCH DMRS ports in a one-on-one manner, and accordingly, the association between the PTRS port and DMRS port becomes the same as an association between the SRS resource and PTRS port. Here, when the two DMRS ports are both associated with a same PTRS port, as in a case where the combinations of PTRS port indexes regarding the SRS resource selected by the SRI are {0, 0} and {1, 1}, the PTRS port may be indicated to be associated with one DMRS port by using the PTRS-DMRS association field. When the two DMRS ports are associated with different PTRS ports, as in a case where the combinations of PTRS port indexes regarding the SRS resource selected by the SRI are {0, 1} and {1, 0}, the association between the DMRS and PTRS may be determined without a separate bit of the PTRS-DMRS association field. By using such a relationship, the association between the PTRS port and DMRS port regarding one TRP may be determined by 1 bit and SRI for Case 1. Accordingly, 1 MSB of the PTRS-DMRS association field may be applied to determine the PTRS of the TRP 1 (or the TRP associated with the first SRI among the two SRIs), and 1 LSB may be applied to determine the PTRS of the TRP 2 (or the TRP associated with the second SRI among the two SRIs).

Figure 21:
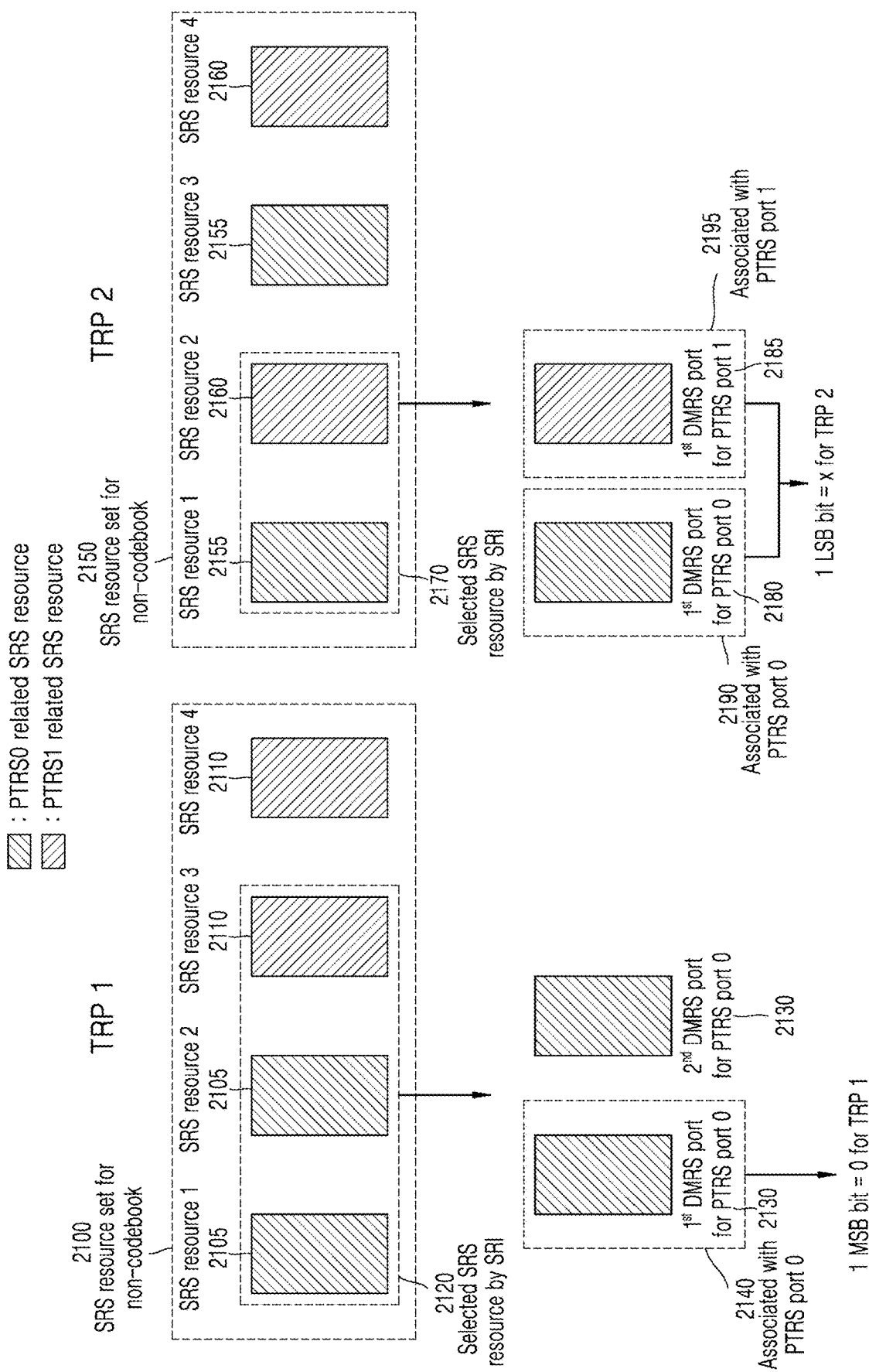
FIG. 21 illustrates an example of a method of determining a phase tracking reference signal (PTRS)-DMRS association field considering multiple TRPs, by reinterpreting the PTRS-DMRS association field regarding a case where the maximum number of PTRS ports is 2 and layer 2 non-codebook PUSCH repetitive transmission considering the multiple TRPs is performed.

FIG. 21 illustrates a diagram for describing an example of the method of determining the PTRS-DMRS association field considering the multiple TRPs by reinterpreting the PTRS-DMRS association field regarding Case 1.

The UE transmits, to the base station, an SRS resource set 2100 for non-codebook regarding the TRP 1. The SRS resource set 2100 includes an SRS resource 2105 associated with a PTRS port 0 and an SRS resource 2110 associated with a PTRS port 1. The base station indicates, to the UE, an SRI via DCI to select two SRS resources in operation 2120, from among four SRS resources, regarding the TRP 1. The two selected SRS resources are mapped to DMRSs in one-on-one manner to configure DMRS ports (operation 2130). Here, the two DMRS ports are both associated with the PTRS port 0, and the PTRS-DMRS association field is required to select a first DMRS port from among the two DMRS ports in operation 2140.

In NR Release 15/16, to indicate the PTRS-DMRS association field, for example, the PTRS-DMRS association field may be configured by the base station configuring 2 bits of the PTRS-DMRS association field to 00, and here, an LSB may be ignored. In the provided method, the PTRS port regarding the TRP 1 is supported to be determined by one bit, and an ignored bit is reduced. Accordingly, the base station configures an MSB of the PTRS-DMRS association field for the TRP 1 to 0 and indicates the same to the UE, and the UE receives the same and determines the PTRS-DMRS association regarding the TRP 1. The UE transmits, to the base station, an SRS resource set 2150 for non-codebook regarding the TRP 2, wherein the SRS resource set 2150 includes an SRS resource 2155 associated with the PTRS port 0 and an SRS resource 2160 associated with the PTRS port 1. The UE is indicated SRI via DCI to select two SRS resources in operation 2170, from among four SRS resources, regarding the TRP 2. The two selected SRS resources are mapped to DMRSs in one-on-one manner to configure DMRS ports (operations 2180 and 2185). Here, because the two DMRS ports are respectively associated with the PTRS port 0 and the PTRS port 1, the UE may associate the PTRS and DMRS in operations 2190 and 2195, without a separate PTRS-DMRS association.

Accordingly, the base station may configure an LSB of the PTRS-DMRS association field for the TRP 2 as x. Here, x may be configured by any bit and may be configured to 0 as pre-defined between the base station and the UE (or may be configured to 1). The UE may associate the PTRS port and the DMRS port by referring to the received SRI regarding the TRP 2. FIG. 21 is only an example for Case 1, and Case 1 may be differently applied depending on a method of configuring a PTRS port of an SRS resource, the number of SRS resources, and an indicated SRI.

In one example, [Case 2] maximum two PTRS ports, layer 3 non-codebook PUSCH repetitive transmission considering multiple TRPs, like Case 2, two SRIs are indicated to indicate an SRS resource selected for each TRP, wherein each SRI indicates three SRS resources. When the number of SRS resources in the SRS resource set is 4, combinations of PTRS port indexes regarding the three SRS resources selected via the SRI are {1, 0, 0}, {0, 1, 0}, {0, 0, 1}, {0, 1, 1}, {1, 0, 1}, and {1, 1, 0} in Case 2. Here, when the number of selected SRS resources associated with a PTRS port 0 or 1 is 1, a DMRS associated with a PTRS port may be determined without a separate bit of PTRS-DMRS association. In other words, when the combinations of PTRS port indexes according to the SRS resources selected via the SRI are {1, 0, 0}, {0, 1, 0}, and {0, 0, 1}, the PTRS port 1 and a corresponding DMRS port may be associated without a separate bit of PTRS-DMRS association regarding the PTRS port 1, and an associated DMRS port may be determined by indicating PTRS-DMRS association by 1 bit regarding the PTRS port 0. When the combinations of PTRS port indexes according to the SRS resources selected via the SRI are {0, 1, 1}, {1, 0, 1}, and {1, 1, 0}, the PTRS port 0 and a corresponding DMRS port may be associated without a separate bit of PTRS-DMRS association regarding the PTRS port 0, and an associated DMRS port may be determined by indicating PTRS-DMRS association by 1 bit regarding the PTRS port 1. By using such a relationship, the association between the PTRS port and DMRS port regarding one TRP may be determined by 1 bit and SRI for Case 2. Accordingly, 1 MSB of the PTRS-DMRS association field may be applied to determine the PTRS of the TRP 1 (or the TRP associated with the first SRI among the two SRIs), and 1 LSB may be applied to determine the PTRS of the TRP 2 (or the TRP associated with the second SRI among the two SRIs).

Figure 22:
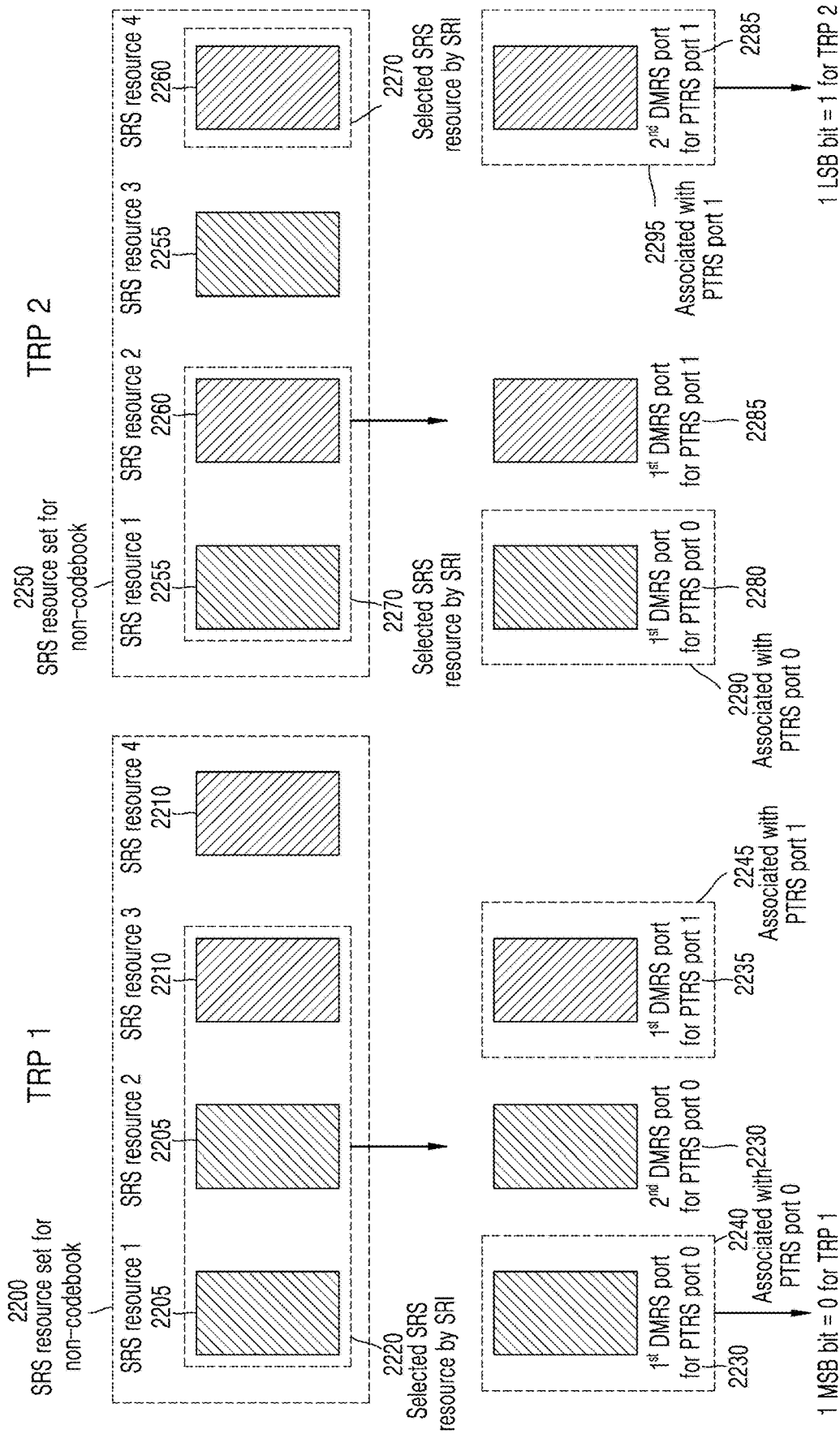
FIG. 22 illustrates an example of a method of determining a PTRS-DMRS association field considering multiple TRPs, by reinterpreting the PTRS-DMRS association field regarding a case where the maximum number of PTRS ports is 2 and layer 3 non-codebook PUSCH repetitive transmission considering the multiple TRPs is performed.

FIG. 22 illustrates an example of the method of determining the PTRS-DMRS association field considering the multiple TRPs by reinterpreting the PTRS-DMRS association field regarding Case 2. The UE transmits, to the base station, an SRS resource set 2200 for non-codebook regarding a TRP 1. The SRS resource set 2200 includes an SRS resource 2205 associated with a PTRS port 0 and an SRS resource 2210 associated with a PTRS port 1. The base station indicates, to the UE, an SRI via DCI to select three SRS resources in operation 2220, from among four SRS resources, regarding the TRP 1. The three selected SRS resources are mapped to DMRSs in one-on-one manner to configure DMRS ports (operations 2230 and 2235).

As in operations 2240 and 2245, the base station may determine DMRS ports associated with the PTRS ports 0 and 1. Here, because the number of DMRS ports associated with the PTRS port 1 is 1, PTRS and DMRS may be associated without separate PTRS-DMRS association (operation 2245). As in operation 2240, when a first DMRS port among the two DMRS ports associated with the PTRS port 0 is determined to be associated, the base station sets 1 MSB of the PTRS-DMRS association field for determining the PTRS of TRP1 to 0. The UE transmits, to the base station, an SRS resource set 2250 for non-codebook regarding the TRP 2. The SRS resource set 2250 includes an SRS resource 2255 associated with a PTRS port 0 and an SRS resource 2260 associated with a PTRS port 1. The base station indicates, to the UE, an SRI via DCI to select three SRS resources in operation 2270, from among four SRS resources, regarding the TRP 1. The three selected SRS resources are mapped to DMRSs in one-on-one manner to configure DMRS ports (operations 2280 and 2285).

As in operations 2290 and 2295, the base station may determine DMRS ports associated with the PTRS ports 0 and 1. Here, because the number of DMRS ports associated with the PTRS port 0 is 1, PTRS and DMRS may be associated without separate PTRS-DMRS association (operation 2290). As in operation 2295, when a second DMRS port among the two DMRS ports associated with the PTRS port 1 is determined to be associated, the base station sets 1 LSB of the PTRS-DMRS association field for determining the PTRS of TRP 2 to 1. FIG. 22 is only an example for Case 2, and Case 2 may be differently applied depending on a method of configuring a PTRS port of an SRS resource, the number of SRS resources, and an indicated SRI.

In one example, [Case 3] maximum two PTRS ports, layer 2 codebook PUSCH repetitive transmission considering multiple TPRs: In Case 3, the base station indicates, to the UE, an SRS resource for each TRP and a precoder for two layers, via two SRIs and two TPMIs. As described above, when a PUSCH is transmitted based on a codebook, a PTRS port associated with a corresponding layer is defined according to a PUSCH antenna port index by which the layer is transmitted.

For example, when the PUSCH is transmitted based on a partial-coherent codebook and a layer 1 is transmitted by PUSCH antenna ports 1000 and 1002, the layer 1 is associated with a PTRS port 0. When a layer 2 is transmitted by PUSCH antenna ports 1001 and 1003, the layer 2 is associated with a PTRS port 1. As such, a PUSCH antenna port by which a layer is transmitted may be indicated to the UE via a TPMI, and accordingly, the UE may identify a PTRS port associated with each layer.

When a layer 2 partial-coherent or non-coherent codebook PUSCH is transmitted by using four PUSCH antenna ports, combinations of PTRS port indexes associated with each layer according to the indicated TPMI may be, based on an NR Release 15/16 precoding matrix, {0, 1}, {0, 0}, {1, 0}, and {1, 1}. Similar to the method of determining a PTRS port regarding a layer 2 of Case 1, when two DMRS ports are both associated with a same PTRS port as in a case where the combinations of PTRS port indexes associated with each layer via the indicated TPMI are {0, 0} and {1, 1}, a PTRS port may be indicated to be associated with one DMRS port by using a PTRS-DMRS association field.

When the two DMRS ports are associated with different PTRS ports, as in a case where the combinations of PTRS port indexes associated with each layer via the indicated TPMI are {0, 1} and {1, 0}, the association between the DMRS and PTRS may be determined without a separate bit of the PTRS-DMRS association field. By using such a relationship, the association between the PTRS port and DMRS port regarding one TRP may be determined by 1 bit and TPMI for Case 3. Accordingly, 1 MSB of the PTRS-DMRS association field may be applied to determine the PTRS of the TRP 1 (or the TRP associated with the first SRI among the two SRIs), and 1 LSB may be applied to determine the PTRS of the TRP 2 (or the TRP associated with the second SRI among the two SRIs).

Figure 23:
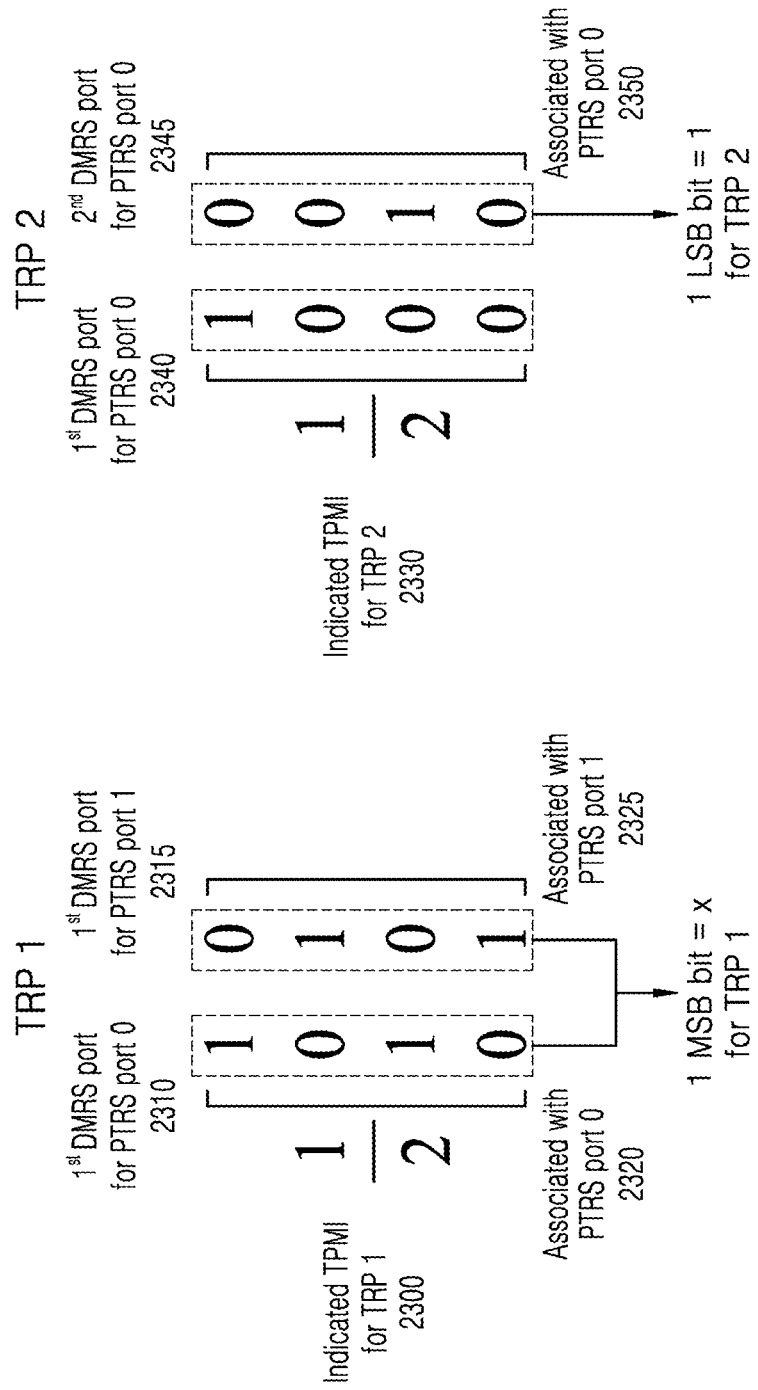
FIG. 23 illustrates an example of a method of determining a PTRS-DMRS association field considering multiple TRPs, by reinterpreting the PTRS-DMRS association field regarding a case where the maximum number of PTRS ports is 2 and layer 2 codebook PUSCH repetitive transmission considering the multiple TRPs is performed.

FIG. 23 illustrates a diagram for describing the method of determining the PTRS-DMRS association field considering the multiple TRPs by reinterpreting the PTRS-DMRS association field regarding Case 3.

The base station indicates, to the UE, a TPMI determined from a received SRS by DCI to schedule codebook-based PUSCH repetitive transmission regarding a TRP 1 (operation 2300). The indicated TPMI indicates a precoding matrix for layer 2 PUSCH transmission, and according to an example of operation 2300, a DMRS port corresponding to a first layer is associated with a PTRS port 0 because the DMRS port is transmitted by PUSCH antenna ports 1000 and 1002 (operation 2310), and a DMRS port corresponding to a second layer is associated with a PTRS port 1 because the DMRS port is transmitted by PUSCH antenna ports 1001 and 1003 (operation 2315). Because the two DMRS ports are associated with different PTRS ports, PTRS and DMRS may be associated without separate PTRS-DMRS association (operations 2320 and 2325).

Accordingly, the base station may configure one MSB of a PTRS-DMRS association field for the TRP 1 as x. Here, x may be configured by any bit and may be configured to 0 as pre-defined between the base station and the UE (or may be configured to 1). The base station indicates, to the UE, a TPMI determined from a received SRS by DCI to schedule codebook-based PUSCH repetitive transmission regarding a TRP 2 (operation 2330). The indicated TPMI indicates a precoding matrix for layer 2 PUSCH transmission, and according to an example of operation 2330, a DMRS port corresponding to a first layer is associated with a PTRS port 0 because the DMRS port is transmitted by a PUSCH antenna port 1000 (operation 2340), and a DMRS port corresponding to a second layer is associated with the PTRS port 0 because the DMRS port is transmitted by a PUSCH antenna port 1002 (operation 2345).

Because the two DMRS ports are associated with the same PTRS port, a bit for indicating one DMRS port to be associated the PTRS port, from among the two DMRS ports, is required. As in operation 2350, when the base station associates the PTRS port with a second DMRS port from among the DMRS ports associated with the PTRS port 0, the base station may configure one LSB of a PTRS-DMRS association field for the TRP 2 as 1. FIG. 23 is only an example of Case 3, and Case 3 may be differently applied depending on the number of SRS resource ports, the indicated TPMI, and the like.

In one example, [Case 4] maximum two PTRS ports, layer 3 codebook PUSCH repetitive transmission considering multiple TPRs, like Case 3, the base station indicates, to the UE, an SRS resource for each TRP and a precoder for three layers, via two SRIs and two TPMIs. When a layer 3 partial-coherent or non-coherent codebook PUSCH is transmitted by using four PUSCH antenna ports, combinations of PTRS port indexes associated with each layer according to the indicated TPMI may be, based on an NR Release 15/16 precoding matrix, {0, 1, 0} and {0, 1, 1}. When the combination of PTRS port indexes associated with each layer via the indicated TPMI is {0, 1, 0}, a DMRS port corresponding to a PTRS port 1 is associated without a separate bit of PTRS-DMRS association regarding the PRTS port 1, and an associated DMRS port may be determined by indicating PTRS-DMRS association by 1 bit regarding a PTRS port 0. When the combination of PTRS port indexes associated with each layer via the indicated TPMI is {0, 1, 1}, a DMRS port corresponding to a PTRS port 0 is associated without a separate bit of PTRS-DMRS association regarding the PRTS port 0, and an associated DMRS port may be determined by indicating PTRS-DMRS association by 1 bit regarding a PTRS port 1. By using such a relationship, the association between the PTRS port and DMRS port regarding one TRP may be determined by 1 bit and TPMI for Case 4. Accordingly, 1 MSB of the PTRS-DMRS association field may be applied to determine the PTRS of the TRP 1 (or the TRP associated with the first SRI among the two SRIs), and 1 LSB may be applied to determine the PTRS of the TRP 2 (or the TRP associated with the second SRI among the two SRIs).

Figure 24:
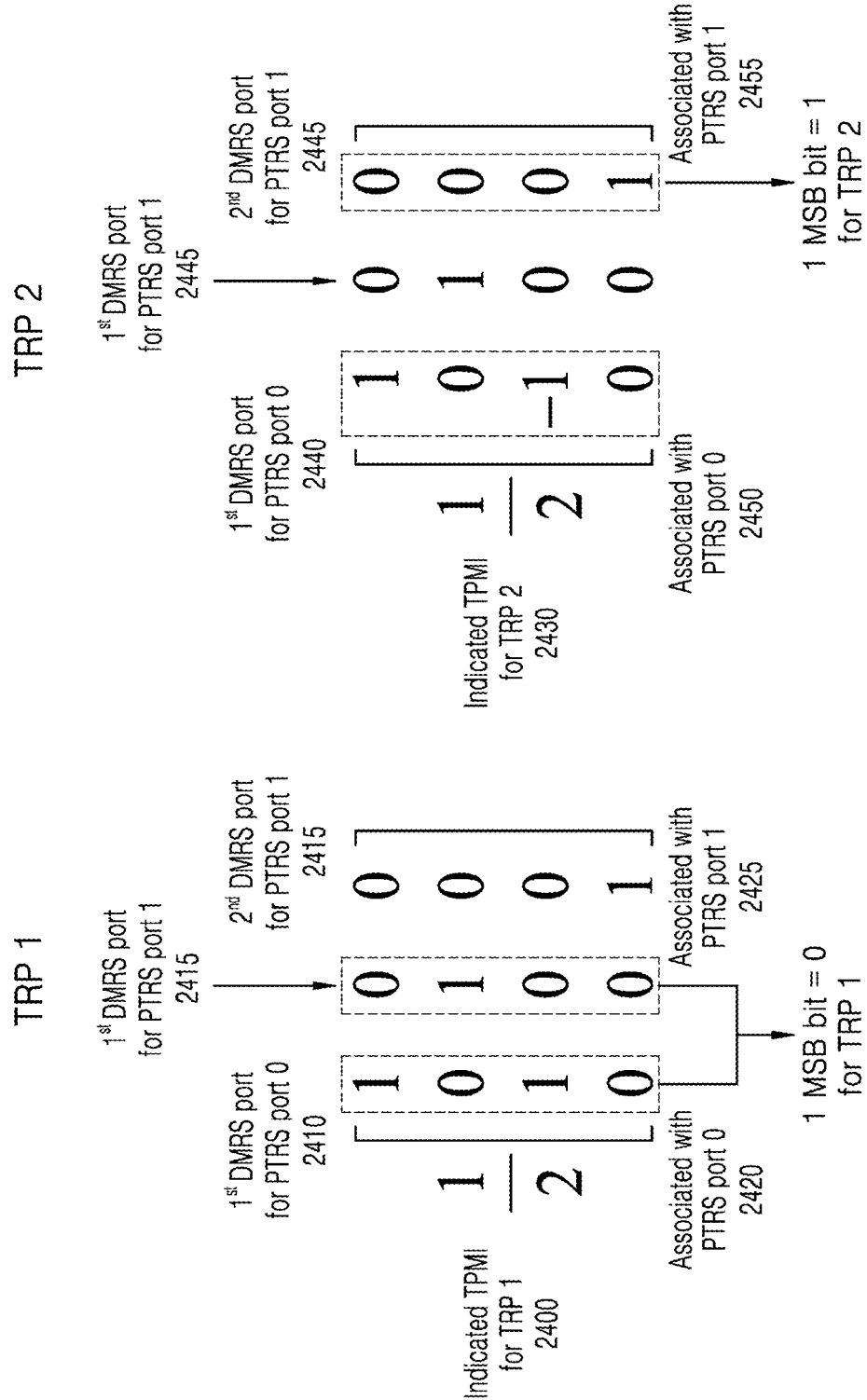
FIG. 24 illustrates an example of a method of determining a PTRS-DMRS association field considering multiple TRPs, by reinterpreting the PTRS-DMRS association field regarding a case where the maximum number of PTRS ports is 2 and layer 3 codebook PUSCH repetitive transmission considering the multiple TRPs is performed.

FIG. 24 illustrates an example of the method of determining the PTRS-DMRS association field considering the multiple TRPs by reinterpreting the PTRS-DMRS association field regarding Case 4. The base station indicates, to the UE, a TPMI determined from a received SRS by DCI to schedule codebook-based PUSCH repetitive transmission regarding a TRP 1 (operation 2400). The indicated TPMI indicates a precoding matrix for layer 3 PUSCH transmission, and according to an example of operation 2400, a DMRS port corresponding to a first layer is associated with a PTRS port 0 because the DMRS port is transmitted by PUSCH antenna ports 1000 and 1002 (operation 2410), a DMRS port corresponding to a second layer is associated with a PTRS port 1 because the DMRS port is transmitted by a PUSCH antenna port 1001 (operation 2415), and a DMRS port corresponding to a third layer is associated with the PTRS port 1 because the DMRS port is transmitted by a PUSCH antenna port 1003 (operation 2415).

Because the number of DMRS ports associated with the PTRS port 0 is 1 regarding the TRP 1, PTRS and DMRS may be associated without separate PTRS-DMRS association (operation 2420). Because the two DMRS ports are associated with the PTRS port 1 regarding the TRP 1, a bit for indicating one DMRS port to be associated the PTRS port, from among the two DMRS ports, is required. As in operation 2425, when the base station associates the PTRS port with a first DMRS port from among the DMRS ports associated with the PTRS port 1, the base station may configure one MSB of a PTRS-DMRS association field for the TRP 1 as 0. The base station indicates, to the UE, a TPMI determined from a received SRS by DCI to schedule codebook-based PUSCH repetitive transmission regarding a TRP 2 (operation 2430).

The indicated TPMI indicates a precoding matrix for layer 3 PUSCH transmission, and according to an example of operation 2430, a DMRS port corresponding to a first layer is associated with a PTRS port 0 because the DMRS port is transmitted by PUSCH antenna ports 1000 and 1002 (operation 2440), a DMRS port corresponding to a second layer is associated with a PTRS port 1 because the DMRS port is transmitted by a PUSCH antenna port 1001 (operation 2445), and a DMRS port corresponding to a third layer is associated with the PTRS port 1 because the DMRS port is transmitted by a PUSCH antenna port 1003 (operation 2445). Because the number of DMRS ports associated with the PTRS port 0 is 1 regarding the TRP 1, PTRS and DMRS may be associated without separate PTRS-DMRS association (operation 2450).

Because the two DMRS ports are associated with the PTRS port 1 regarding the TRP 1, a bit for indicating one DMRS port to be associated the PTRS port, from among the two DMRS ports, is required. As in operation 2455, when the base station associates the PTRS port with a second DMRS port from among the DMRS ports associated with the PTRS port 1, the base station may configure one LSB of a PTRS-DMRS association field for the TRP 2 as 1. FIG. 24 is only an example of Case 4, and Case 4 may be differently applied depending on the indicated TPMI and the like.

In one example, [Case 5] maximum one PTRS ports, layer 2 non-codebook or codebook PUSCH repetitive transmission considering multiple TPRs, when the number of PTRS ports is 1 and layer 2 PUSCH transmission is performed, a DMRS associated with a PTRS port 0 from among two layers indicated by SRI (non-codebook-based PUSCH transmission) or TPMI (codebook-based PUSCH transmission)

may be determined by 1 bit. Accordingly, 1 MSB of the PTRS-DMRS association field may be applied to determine the PTRS of the TRP 1 (or the TRP associated with the first SRI among the two SRIs), and 1 LSB may be applied to determine the PTRS of the TRP 2 (or the TRP associated with the second SRI among the two SRIs).

An association between a PTRS port and a DMRS port regarding two TRPs may be determined via reinterpretation considering an SRI or TPMI, without adding a bit of a PTRS-DMRS association field in DCI, regarding Cases 1 to 5 described above. However, the above-described method is unable to be applied when the maximum number of PTRS ports is 2 and a layer is 4, and when the maximum number of PTRS ports is 1 and a layer is 3 or 4.

When the method is unable to be applied, the association between the PTRS port and the DMRS port may be determined by selecting one of following options:

Option 1: When the maximum number of ports is 1, the maximum number of candidates of associable DMRS ports may be limited from 4 to 2; and/or Option 2: When the maximum number of ports is 2, an association regarding one PTRS port is determined for each TRP, and the association may be identically applied to determine two PTRS ports. For example, an association regarding a PTRS port 0 of a TRP 1 may be determined to be 1 bit and the association may be identically applied to a PTRS port 1 of the TRP 1, and an association regarding a PTRS port 0 of a TRP 2 may be determined to be 1 bit and the association may be identically applied to a PTRS port 1 of the TRP 2.

The PUSCH repetitive transmission considering the multiple TRPs may be supported to improve reliability of the PUSCH. Here, when the PUSCH is repeatedly transmitted by the multiple TRPs, the number of layers for each TRP may be limited. In NR Release 15/16, the PUSCH is transmittable on up to 4 layers, but when the PUSCH is repeatedly transmitted by the multiple TRPs, the number of layers for each TRP may be limited to a value smaller than 4. When the maximum number of PTRS ports is 2 and the number of TRP layers for PUSCH repetitive transmission transmitted by the multiple TRPs is limited to 2, an association between a PTRS port and a DMRS port may be determined as Case 1 or 3 described above.

Alternatively, because the number of layers is limited to 2, the base station and the UE may pre-define the association between the PTRS port and the DMRS port such that a PTRS port 0 is associated with a first DMRS port among the indicated DMRS ports and a PTRS port 1 is associated with a second DMRS port among the indicated DMRS ports, without a separate PTRS-DMRS association. When the maximum number of PTRS ports is 2 and the number of TRP layers for PUSCH repetitive transmission transmitted by the multiple TRPs is limited to 3, an association between a PTRS port and a DMRS port may be determined as Case 2 or 4 described above.

When the base station indicates a PTRS-DMRS association regarding one TRP via a method of reinterpreting a PTRS-DMRS association field, a PTRS-DMRS association regarding another TRP may be implicitly supported to be inferred. The base station and the UE may obtain statistic information by estimating an uplink channel between each TRP and the UE. When the base station and the UE contain same statistic information for an uplink channel and a PTRS-DMRS association field regarding a TRP 1 is indicated by DCI, the UE may statistically determine PTRS-DMRS association information regarding a TRP 2. The above operation will be described in detail via a specific example.

When the maximum number of PTRS ports is 1, a DMRS port 2 scheduled by a PTRS-DMRS association regarding a TRP 1 may be selected to be associated with the PTRS port. When the scheduled DMRS port 2 of the TRP 1 is selected to be associated with the PTRS port, it is statistically highly likely that a scheduled DMRS port 1 of a TRP 2 is selected. Here, the base station indicates, via a PTRS-DMRS association field, an association between a PTRS port and a DMRS port to be determined regarding the TRP 1. The UE may determine a DMRS port associated with the PTRS port regarding the TRP 2 to be 1, according to a statistic characteristic and the association between the PTRS port and the DMRS port of the TRP 1 determined by the indicated PTRS-DMRS association. Because the base station contains the same statistic information, the base station is aware of the association between the PTRS port and the DMRS port determined by the UE regarding the TRP 2.

(3-2)th Embodiment of the Disclosure: Method of Determining Port of PTRS Via Same PTRS-DMRS Associations for all TRPs, and Transmitting PTRS In the (3-2)th embodiment of the disclosure, a method by which the base station indicates, to the UE, the same PTRS-DMRS association for all TRPs, in consideration of multiple TRPs, and the UE transmitting the PTRS based on the PTRS-DMRS association is described. The base station may determine one PTRS-DMRS association field, in consideration of the multiple TRPs. Here, the base station may determine the PTRS-DMRS association field by selecting one of following methods.

In one embodiment of Method 1, channel gains regarding i-th layers (i=1, 2, 3, and 4) of two TRPs are added. Then, sums of channel gains regarding each layer are compared to determine a PTRS-DMRS association field such that a PTRS is associated with a layer regarding the highest sum of channel gains, and the PTRS-DMRS association field may be indicated to the UE.

In one embodiment of Method 2, the base station may select one TRP from among two TRPs, determine a PTRS-DMRS association field regarding the selected TRP, and indicate the PTRS-DMRS association field to the UE. (When selecting one TRP, the base station may select a TRP having a high average channel gain. Alternatively, the base station may select a TRP having a small average channel gain. Alternatively, the base station may randomly select a TRP.)

The UE may identify apply one PTRS-DMRS association field indicated by the base station via DCI, to determine an association between a PTRS port and a DMRS port regarding two TRPs.

Figure 25:
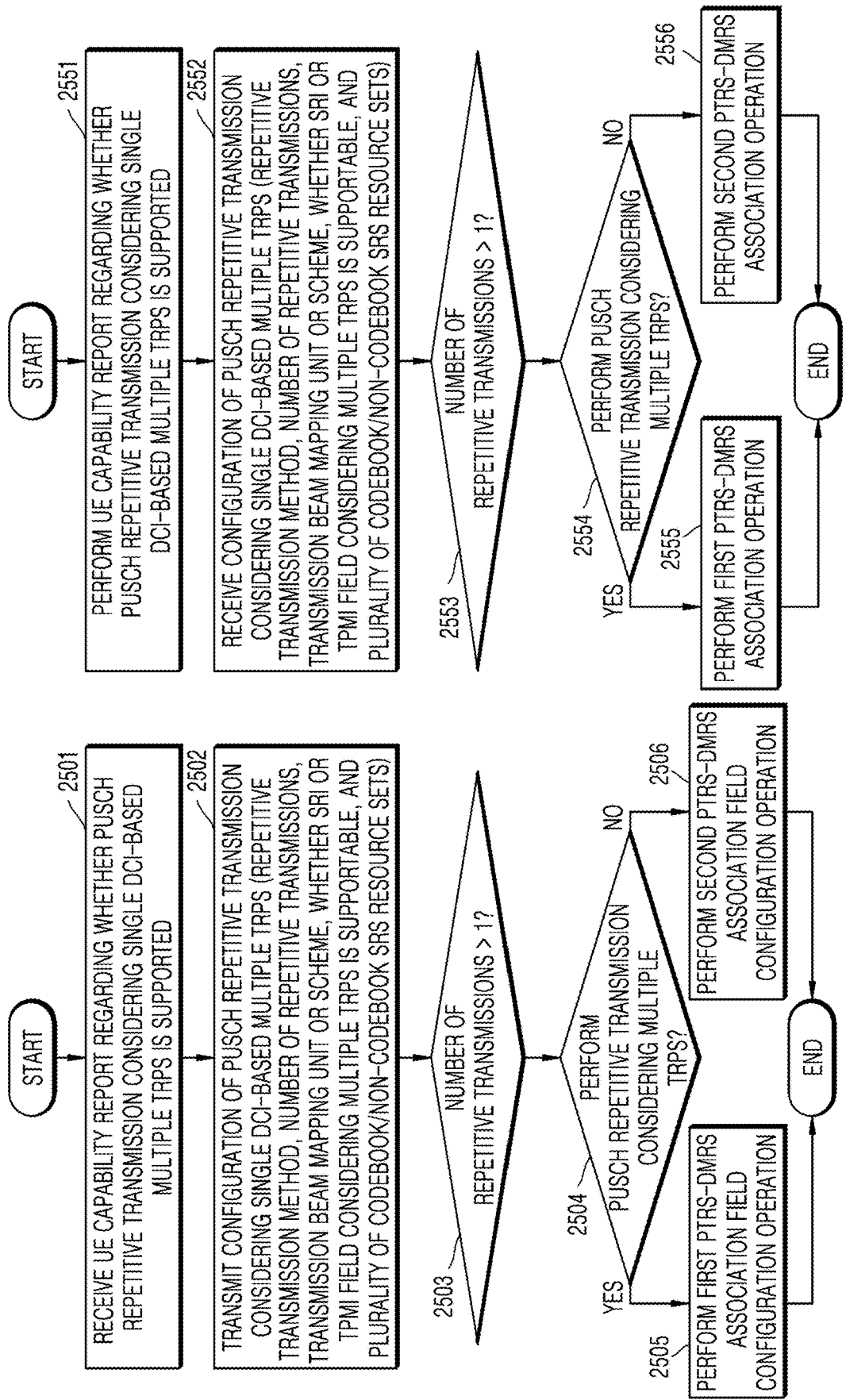
FIG. 25 illustrates a flowchart of operations of configuring a PTRS-DMRS association field regarding PUSCH repetitive transmission considering multiple TRPs, and performing PTRS-DMRS association according to an embodiment of the disclosure.

FIG. 25 illustrates a flowchart of operations of configuring a PTRS-DMRS association field regarding PUSCH repetitive transmission considering multiple TRPs, and performing PTRS-DMRS association according to an embodiment of the disclosure.

In operation 2551, the UE may perform a UE capability report regarding whether PUSCH repetitive transmission considering single DCI-based multiple TRPs is supported.

In operation 1501, the base station receives the UE capability report.

In operation 2502, the base station transmits, to the UE, a configuration of the PUSCH repetitive transmission considering the single DCI-based multiple TRPs. Here, the transmitted configuration may include a repetitive transmission method, the number of repetitive transmissions, a transmission beam mapping unit or scheme, whether an SRI or TPMI field considering multiple TRPs is supportable, and a plurality of codebook or non-codebook SRS resource sets.

In operations 2552 and 2553, the UE receives the configuration and determines whether the number of repetitive transmissions is equal to or greater than 2.

In operation 2554, when the number of repetitive transmissions is equal to or greater than 2, the UE determines whether to perform the PUSCH repetitive transmission considering the multiple TRPs, according to a higher layer configuration and DCI that has been successfully received.

In operations 2555, when it is determined to perform the PUSCH repetitive transmission considering the multiple TRPs, the UE performs a first PTRS-DMRS association operation. In operations 2556, otherwise, the UE performs a second PUSCH transmission operation. The first PTRS-DMRS association operation denotes an operation of determining an association between a PTRS and a DMRS to transmit the PTRS by multiple TRPs, as described in the third embodiment of the disclosure. The second PTRS-DMRS association operation denotes an operation of determining an association between a PTRS and a DMRS to transmit the PTRS by single TRP, as NR Release 15/16.

Operations 2503, 2504, 2505, and 2506 are performed by the base station with respect to operations 2553, 2554, 2555, and 2556.

Figure 26:
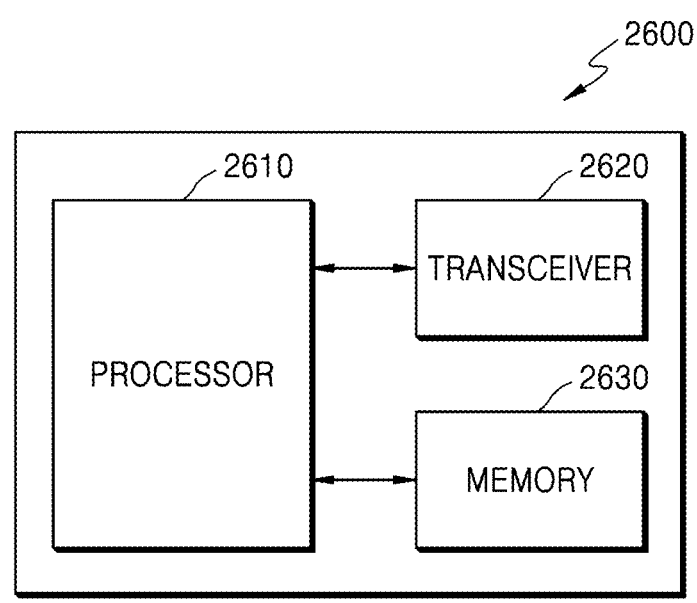
FIG. 26 illustrates a diagram of a structure of a UE in a wireless communication system according to an embodiment of the disclosure.

FIG. 26 is a diagram of a structure of a UE 2600 in a wireless communication system, according to an embodiment of the disclosure. Referring to FIG. 26, the UE 2600 may include a transceiver 2620 functioning as a terminal receiver and a terminal transmitter, a memory 2630, and a processor 2610. The transceiver 2620, memory 2630, and processor 2610 of the UE 2600 may operate according to a communication method of the UE 2600 described above. However, the components of the UE 2600 are not limited thereto. For example, the UE 2600 may include more or fewer components than those described above. In addition, the transceiver 2620, the memory 2630, and the processor 2610 may be implemented as a single chip.

The transceiver 2620 may transmit or receive a signal to or from a base station. Here, the signal may include control information and data. In this regard, the transceiver 2620 may include a RF transmitter for up-converting and amplifying a frequency of a transmitted signal, and a RF receiver for amplifying low-noise and down-converting a frequency of a received signal. However, this is only an example of the transceiver 2620 and components of the transceiver 2620 are not limited to the RF transmitter and the RF receiver.

Also, the transceiver 2620 may receive and output, to the processor 2610, a signal through a radio channel, and transmit a signal output from the processor 2610 through the radio channel.

The memory 2630 may store a program and data required for operations of the UE 2600. Also, the memory 2630 may store the control information or data included in the signal transmitted and received by the UE 2600. The memory 2630 may be a storage medium, such as read-only memory (ROM), random access memory (RAM), a hard disk, a CD-ROM, and a DVD, or a combination of storage media. Also, there may be a plurality of the memories 2630.

The processor 2610 may control a series of processes such that the UE 2600 operates according to an embodiment of the disclosure described above. For example, the processor 2610 may control the components of the UE 2600 to receive a plurality of PDSCHs simultaneously by receiving DCI including two layers. There may be a plurality of processors 2610 and the processor 2610 may execute a program stored in the memory 2630 to control the components of the UE 2600.

Figure 27:
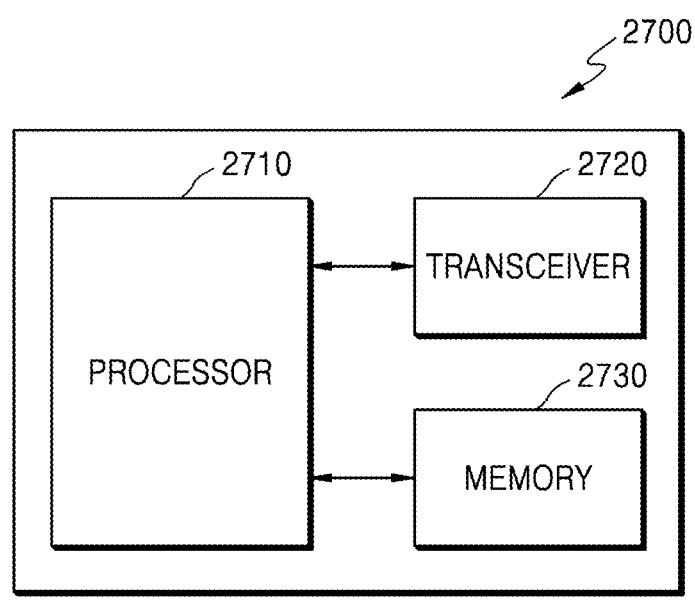
FIG. 27 illustrates a diagram of a structure of a base station in a wireless communication system according to an embodiment of the disclosure.

FIG. 27 illustrates a diagram of a structure of a base station 2700 in a wireless communication system according to an embodiment of the disclosure.

Referring to FIG. 27, the base station 2700 may include a transceiver 2720 functioning as a base station receiver and a base station transmitter, a memory 2730, and a processor 2710. The transceiver 2720, memory 2730, and processor 2710 of the base station 2700 may operate according to a communication method of the base station 2700 described above. However, the components of the base station 2700 are not limited thereto. For example, the base station 2700 may include more or fewer components than those described above. In addition, the transceiver 2720, the memory 2730, and the processor 2710 may be implemented as a single chip.

The transceiver 2720 may transmit or receive a signal to or from a UE. Here, the signal may include control information and data. In this regard, the transceiver 2720 may include a RF transmitter for up-converting and amplifying a frequency of a transmitted signal, and a RF receiver for amplifying low-noise and down-converting a frequency of a received signal. However, this is only an example of the transceiver 2720 and components of the transceiver 2720 are not limited to the RF transmitter and the RF receiver.

Also, the transceiver 2720 may receive and output, to the processor 2710, a signal through a radio channel, and transmit a signal output from the processor 2710 through the radio channel.

The memory 2730 may store a program and data required for operations of the base station 2700. Also, the memory 2730 may store the control information or data included in the signal transmitted and received by the base station 2700. The memory 2730 may be a storage medium, such as read-only memory (ROM), random access memory (RAM), a hard disk, a CD-ROM, and a DVD, or a combination of storage media. Also, there may be a plurality of the memories 2730.

The processor 2710 may control a series of processes such that the base station 2700 operates according to an embodiment of the disclosure described above. For example, the processor 2710 may control each component of the base station 2700 to configure and transmit two layers of DCI including assignment information for a plurality of PDSCHs. There may be a plurality of processors 2710 and the processor 2710 may execute a program stored in the memory 2730 to control the components of the base station 2700.

The methods according to the embodiments of the disclosure described in the claims or the detailed description of the disclosure may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments of the disclosure described in the claims or the detailed description of the disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory including a combination of some or all of the above-mentioned memories. In addition, there may be a plurality of memories.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according to the embodiments of the disclosure. Another storage device on the communication network may also be connected to the apparatus performing the embodiments of the disclosure.

In the specific embodiments of the disclosure described above, elements included in the disclosure are expressed in a singular or plural form according to the specific embodiments of the disclosure. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, the embodiments of the disclosure described with reference to the present specification and the drawings are merely illustrative of specific examples to easily facilitate description and understanding of the disclosure, and are not intended to limit the scope of the disclosure. In other words, it will be apparent to one of ordinary skill in the art that other modifications based on the technical ideas of the disclosure are feasible. Also, the embodiments of the disclosure may be combined with each other as required. For example, a portion of one embodiment of the disclosure and a portion of another embodiment of the disclosure may be combined with each other to enable a base station and a UE to operate. For example, portions of a first embodiment of the disclosure and a second embodiment of the disclosure may be combined with each other to enable a base station and a UE to operate. Also, the embodiments of the disclosure are provided based on a FDD LTE system, but other modifications based on technical ideas of the embodiments of the disclosure may be implemented on other systems, such as a TDD LTE system, a 5G or NR system, and the like.

Meanwhile, in a drawing for describing a method of the disclosure, an order of the description does not necessarily correspond to an order of execution, and the order may be changed or executed in parallel.

Alternatively, in the drawing for describing the method of the disclosure, some components may be omitted and only some components may be included within a range that does not depart from the essence of the disclosure.

Further, the method of the disclosure may be performed in a combination of some or all of content included in each embodiment of the disclosure within a range that does not depart from the essence of the disclosure.

According to various embodiments of the disclosure, provided are a method of transmitting and receiving an uplink phase tracking reference signal to a multi-transmission/reception point in a network cooperative communication system, and an apparatus for performing the method. Accordingly, it is possible to obtain a more improved performance gain.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a user equipment (UE) for transmitting a physical uplink shared channel (PUSCH), the method comprising:
receiving sounding reference signal (SRS) configuration information comprising at least a first SRS resource set and a second SRS resource set;
receiving downlink control information (DCI) scheduling the PUSCH,
wherein the DCI includes phase tracking reference signal-demodulation reference signal (PTRS-DMRS) association information, a first SRS resource indicator (SRI) field, and a second SRI field,
wherein a most significant bit (MSB) of the PTRS-DMRS association information indicates a first association between a PTRS port and a DMRS port corresponding to the first SRI field, and
wherein a least significant bit (LSB) of the PTRS-DMRS association information indicates a second association between a PTRS port and a DMRS port corresponding to the second SRI field; and
transmitting PTRSs for the PUSCH based on the first association between the PTRS port and the DMRS port corresponding to the first SRI field and the second association between the PTRS port and the DMRS port corresponding to the second SRI field.

2. The method of claim 1, wherein, in case that a maximum number of PTRS ports is 1, each bit of the PTRS-DMRS association information indicates one of two DMRS ports among a maximum number of DMRS ports.

3. The method of claim 1, wherein, in case that a maximum number of PTRS ports is 2, each bit of the PTRS-DMRS association information indicates one of DMRS ports associated with a same PTRS port.

4. The method of claim 1, further comprising:
identifying an actual number of PTRS ports for each SRS resource set based on the first SRI field and the second SRI field.

5. The method of claim 1, further comprising:
identifying an actual number of PTRS ports based on at least one transmission precoding matrix indicator (TPMI) information, wherein the DCI further comprises the at least one TPMI information.

6. The method of claim 1, wherein the first SRI field is associated with the first SRS resource set, and the second SRI field is associated with the second SRS resource set.

7. The method of claim 1, wherein the DCI further comprises additional PTRS-DMRS association information.

8. The method of claim 1, wherein transmitting the PUSCH includes a non-codebook based PUSCH transmission.

9. The method of claim 1, wherein transmitting the PUSCH includes a codebook based PUSCH transmission.

10. A user equipment (UE) configured to transmit a physical uplink shared channel (PUSCH), the UE comprising:
a transceiver; and
at least one processor coupled with the transceiver, the at least one processor configured to:
receive sounding reference signal (SRS) configuration information comprising at least a first SRS resource set and a second SRS resource set, receive downlink control information (DCI) scheduling the PUSCH,
wherein the DCI includes phase tracking reference signal-demodulation reference signal (PTRS-DMRS) association information, a first SRS resource indicator (SRI) field, and a second SRI field,
wherein a most significant bit (MSB) of the PTRS-DMRS association information indicates a first association between a PTRS port and a DMRS port corresponding to the first SRI field, and
wherein a least significant bit (LSB) of the PTRS-DMRS association information indicates a second association between a PTRS port and a DMRS port corresponding to the second SRI field, and
transmit PTRSs for the PUSCH based on the first association between the PTRS port and the DMRS port corresponding to the first SRI field and the second association between the PTRS port and the DMRS port corresponding to the second SRI field.

11. A method performed by a base station for receiving a physical uplink shared channel (PUSCH), the method comprising:
transmitting, to a user equipment (UE), sounding reference signal (SRS) configuration information comprising at least a first SRS resource set and a second SRS resource set;
transmitting, to the UE, downlink control information (DCI) scheduling the PUSCH,
wherein the DCI includes phase tracking reference signal-demodulation reference signal (PTRS-DMRS) association information, a first SRS resource indicator (SRI) field, and a second SRI field,
wherein a most significant bit (MSB) of the PTRS-DMRS association information indicates a first association between a PTRS port and a DMRS port corresponding to the first SRI field, and
wherein a least significant bit (LSB) of the PTRS-DMRS association information indicates a second association between a PTRS port and a DMRS port corresponding to the second SRI field; and
receiving, from the UE, PTRSs for the PUSCH based on the first association between the PTRS port and the DMRS port corresponding to the first SRI field and the second association between the PTRS port and the DMRS port corresponding to the second SRI field.

12. The method of claim 11, wherein, in case that a maximum number of PTRS ports is 1, each bit of the PTRS-DMRS association information indicates one of two DMRS ports among a maximum number of DMRS ports.

13. The method of claim 11, wherein, in case that a maximum number of PTRS ports is 2, each bit of the PTRS-DMRS association information indicates one of DMRS ports associated with a same PTRS port.

14. The method of claim 11, wherein an actual number of PTRS ports for each SRS resource set is identified at the UE based on the first SRI field and the second SRI field.

15. The method of claim 11, wherein an actual number of PTRS ports is identified at the UE based on at least one transmission precoding matrix indicator (TPMI) information, wherein the DCI further comprises the at least one TPMI information.

16. The method of claim 11, wherein the first SRI field is associated with the first SRS resource set, and the second SRI field is associated with the second SRS resource set.

17. The method of claim 11, wherein the DCI further comprises additional PTRS-DMRS association information.

18. The method of claim 11, wherein receiving the PUSCH includes a non-codebook based PUSCH reception.

19. The method of claim 11, wherein receiving the PUSCH includes a codebook based PUSCH reception.

20. A base station configured to receive a physical uplink shared channel (PUSCH), the base station comprising:
a transceiver; and
at least one processor coupled with the transceiver, the at least one processor configured to:
transmit, to a user equipment (UE), sounding reference signal (SRS) configuration information comprising at least a first SRS resource set and a second SRS resource set,
transmit, to the UE, downlink control information (DCI) scheduling the PUSCH,
wherein the DCI includes phase tracking reference signal-demodulation reference signal (PTRS-DMRS) association information, a first SRS resource indicator (SRI) field, and a second SRI field,
wherein a most significant bit (MSB) of the PTRS-DMRS association information indicates a first association between a PTRS port and a DMRS port corresponding to the first SRI field, and
wherein a least significant bit (LSB) of the PTRS-DMRS association information indicates a second association between a PTRS port and a DMRS port corresponding to the second SRI field, and
receive, from the UE, PTRSs for the PUSCH based on the first association between the PTRS port and the DMRS port corresponding to the first SRI field and the second association between the PTRS port and the DMRS port corresponding to the second SRI field.

* * * * *